(12) United States Patent (10) Patent No.: US 7,664,086 B2
Wada et al. (45) Date of Patent: *Feb. 16, 2010

(54) PARTNER NODE MIGRATION CONTROL UNIT AND METHOD

(75) Inventors: Hiromi Wada, Neyagawa (JP); Takashi Yozawa, Mino (JP); Tatsuya Ohnishi, Kawanishi (JP)

(73) Assignee: Panasonic Corporation, Osaka (JP)

(*) Notice: Subject to any disclaimer, the term of this patent is extended or adjusted under 35 U.S.C. 154(b) by 172 days.

This patent is subject to a terminal disclaimer.

(21) Appl. No.: 11/517,519

(22) Filed: Sep. 7, 2006

(65) Prior Publication Data

US 2007/0019612 A1 Jan. 25, 2007

Related U.S. Application Data

(62) Division of application No. 10/194,481, filed on Jul. 12, 2002, now Pat. No. 7,130,290, which is a division of application No. 09/137,133, filed on Aug. 19, 1998, now Pat. No. 6,456,621, which is a division of application No. 08/635,027, filed on Apr. 19, 1996, now Pat. No. 5,845,079, which is a division of application No. 08/014,766, filed on Feb. 8, 1993, now Pat. No. 5,517,618.

(30) Foreign Application Priority Data

| Feb. 10, 1992 | (JP) | ..................................... 4-23506 |
| Sep. 16, 1992 | (JP) | .................................... 4-246855 |
| Nov. 10, 1992 | (JP) | .................................... 4-299531 |

(51) Int. Cl.
*H04Q 7/24* (2006.01)
(52) U.S. Cl. ..................................................... 370/338
(58) Field of Classification Search ....................... None
See application file for complete search history.

(56) References Cited

U.S. PATENT DOCUMENTS 4,814,763 A 3/1989 Nelson et al.

(Continued)

FOREIGN PATENT DOCUMENTS

EP 0 347 938 12/1989

(Continued)

OTHER PUBLICATIONS

Vuong et al, Issues in Internetworking Wireless Data Networks for Mobile Computing, IEEE, 5 pages, 1995.*

(Continued)

*Primary Examiner*—Frank Duong

(57) ABSTRACT

Disclosed is a migration communication control device constructed to control a continuous communication between a mobile node and a node unaffected the mobile node's migration. The migration communication control device comprises a first migration control unit, a second migration control unit on the mobile node, and a third migration control unit on the partner node. The first migration control unit comprises a packet transfer unit and an address post unit. The packet transfer unit receives a packet which was destined for an outdated address of the mobile node, generates a conversion packet which holds an updated address instead of the outdated address, and then transmits the conversion packet, while an address post unit transmits an address post message which indicates the updated address to the third migration control unit. The second migration control unit comprises a migration post unit and a packet resumption unit. The migration post unit transmits to the first migration control unit a migration post message which indicates the updated address when the mobile node migrates to another network while a packet resumption unit receives the conversion packet from both the first migration control unit and the third migration control unit and resumes an original packet from the conversion packet. The third migration control unit comprises a packet conversion unit which converts a destination address of a packet into the updated address, then transmits it to the mobile node.

7 Claims, 45 Drawing Sheets

U.S. PATENT DOCUMENTS

| | | | |
|---|---|---|---|
| 4,833,701 | A | 5/1989 | Comroe et al. |
| 5,095,480 | A | 3/1992 | Fenner et al. |
| 5,159,592 | A | 10/1992 | Perkins |
| 5,168,498 | A | 12/1992 | Adams et al. |
| 5,181,200 | A | 1/1993 | Harrison |
| 5,315,636 | A | 5/1994 | Patel |
| 5,317,623 | A | 5/1994 | Sakamoto et al. |
| 5,325,524 | A | 6/1994 | Black et al. |
| 5,365,451 | A | 11/1994 | Wang et al. |
| 5,442,633 | A | 8/1995 | Perkins et al. |
| 5,452,447 | A | 9/1995 | Nelson et al. |
| 5,845,079 | A | 12/1998 | Wada et al. |
| 6,456,621 | B1 | 9/2002 | Wada et al. |

FOREIGN PATENT DOCUMENTS

| | | |
|---|---|---|
| EP | 0 433 256 | 6/1991 |
| EP | 0 366 342 | 10/1998 |
| GB | 2 236 393 | 4/1991 |
| JP | 62-136137 | 6/1987 |
| JP | 01-129550 | 5/1989 |
| JP | 01-154635 | 6/1989 |
| WO | 8601918 | 3/1986 |

OTHER PUBLICATIONS

Wada et al, Packet Forwarding for Mobile Hosts, Internet Draft, pp. 1-ii, Nov. 1992.

Ioannidis, J. et al., IP Based Protocols for Mobile Internetworking, Sep. 1991, Department of Computer Science, Columbia University.

Teraoka et al.; Location Transparent Inter-Object Communication in the Muse Operating System, 90-Arc-82, Apr. 20, 1990.

Wada et al., Migration Transparent Communication Method Based on Packets Forwarding, Technical Report of IEICE, SSE92-67, IN92-58, Sep. 1992 with verified partial translation.

Johnson, "Mobile Host Internetworking Using IP Loose Source Routing", Carnegie Mellon University, 18 Pages, Feb. 1993.

Teraoka, F. et al., A Network Architecture Providing Host Migration Transparency, Sep. 1991.

Teraoka, F. et al., VIP: Virtual Internet Protocol, Sony Computer Science Laboratory, Jul. 5, 1991.

Anonymous, Transparent Migration of Data Links from Active to Standby Components . . . , Abstract, Derwent Info. 1993, Derwent Publications Ltd., London No. 90-311754.

Teraoka, Host Migration in Virtual Internet Protocol, Sony Computer Science Laboratory, Inc., pp. 1-10, 1992.

Teraoka et al., Design Implementation, and Evaluation of Virtual Internet Protocol, IEEE pp. 170-177, 1992.

Perkins, Simplified Routing for Mobile Computers Using TCP/IP, IEEE, pp. 7-13, 1992.

Myles, et al.,Comparing Four IP Based Mobile Host Protocol, pp. 1-7, 1993.

Myles, et al., Comparison of Mobile Host Protocols for IP, pp. 1-12, 1993.

* cited by examiner

FIG. 10a

| address before migration | address after migration |
|---|---|
| address α | address β |

FIG. 10b

| address before migration | address after migration |
|---|---|
| address α | address β |
| address X | address Y |
| | |

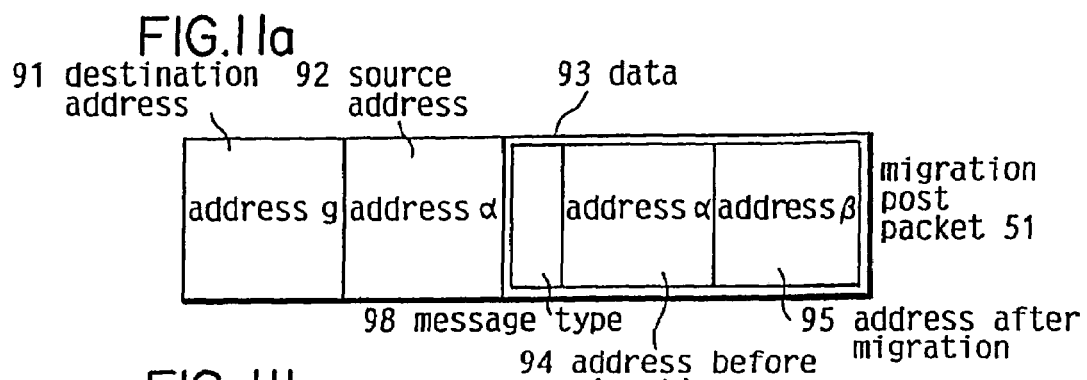
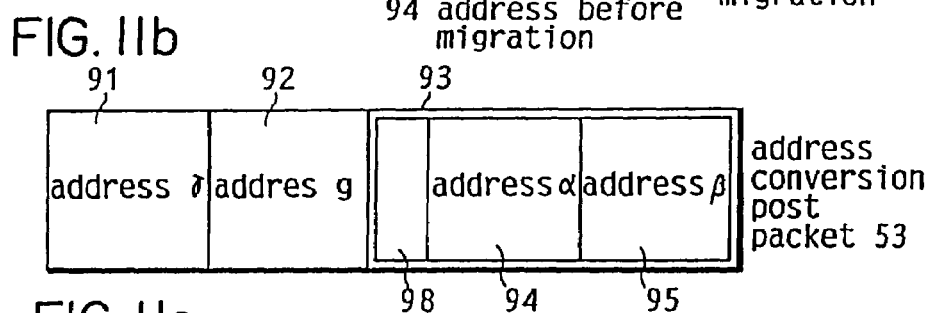
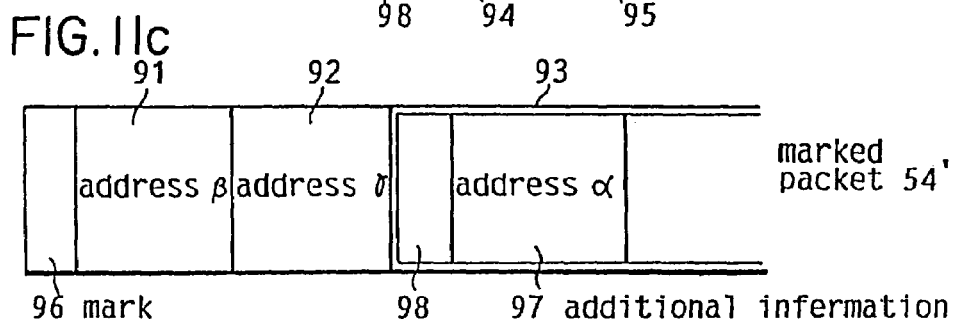
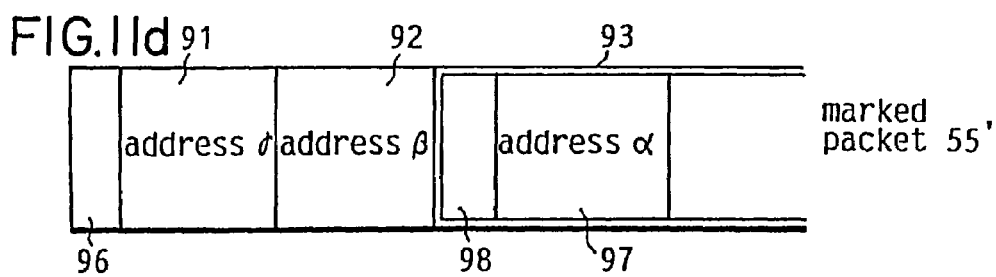
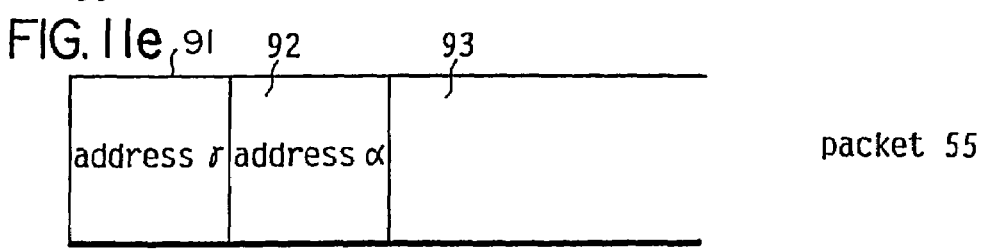
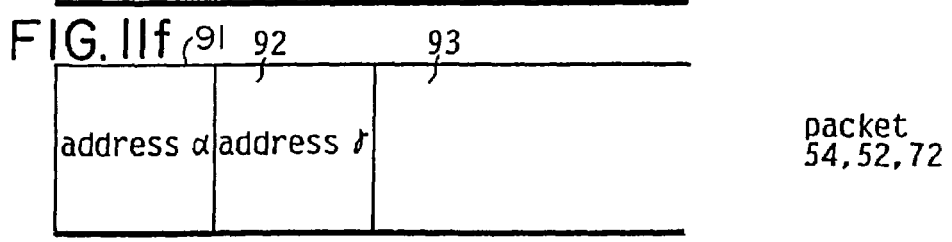

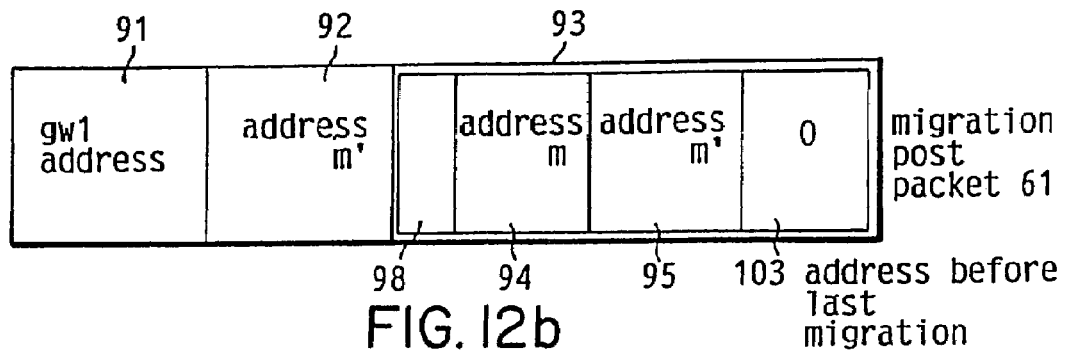
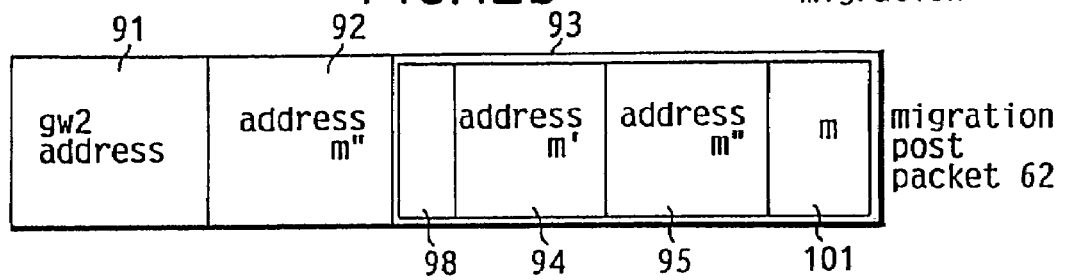
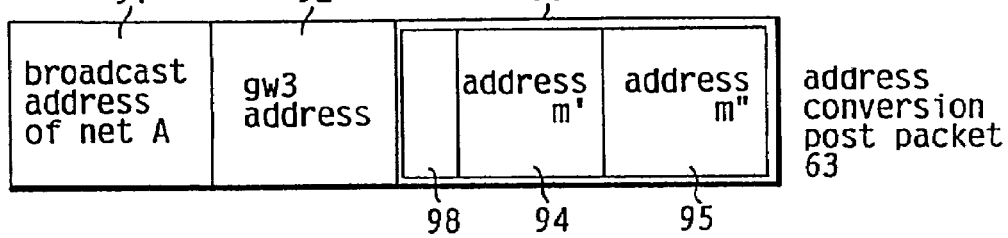
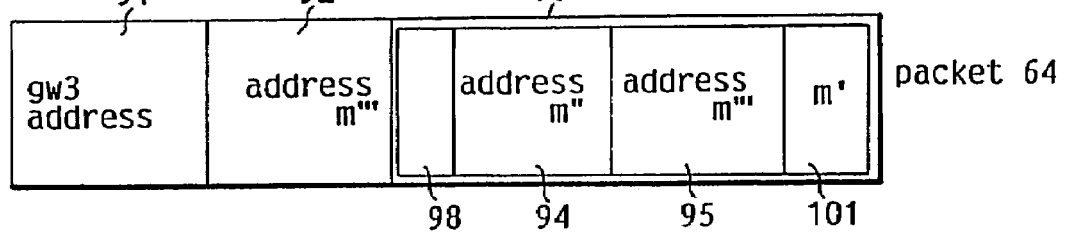
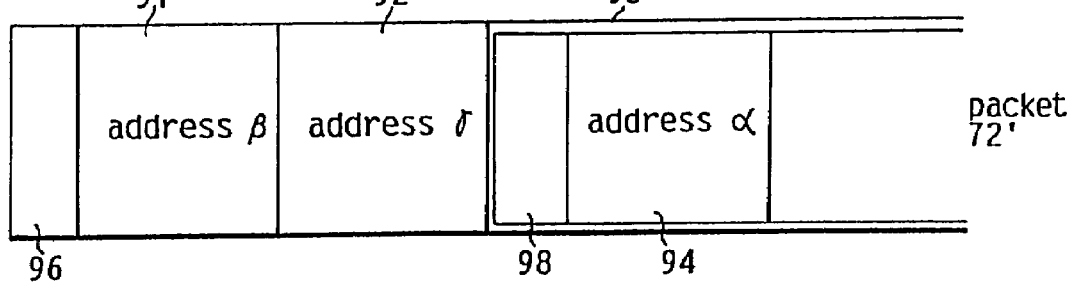

migration from network A to network B  FIG. 13a

| gateway | address correspondence | address before last migration |
|---|---|---|
| gw1 | m → m' | 0 |
| gw2 | m → m' | 0 |
| gw3 | — | — |
| gw4 | — | — | migration from network B to network C  FIG. 13b

| gateway | address correspondence | address before last migration |
|---|---|---|
| gw1 | m → m'' | 0 |
| gw2 | m → m'' <br> m' → m'' | 0 <br> m |
| gw3 | m' → m'' | m |
| gw4 | — | — | migration from network C to network D  FIG. 13c

| gateway | address correspondence | address before last migration |
|---|---|---|
| gw1 | m → m''' | 0 |
| gw2 | m → m''' <br> m' → m''' | 0 <br> m |
| gw3 | m' → m''' <br> m'' → m''' | m <br> m' |
| gw4 | m'' → m''' | m' | migration from network A to network B  FIG. 14A

| migration communication control device | content of hold unit ||
|---|---|---|
| | address correspondence | address before last migration |
| S1 | m → m' | 0 |
| S2 | — | — |
| S3 | — | — |
| S4 | — | — | migration from network B to network C  FIG. 14B

| migration communication control device | content of hold unit ||
|---|---|---|
| | address correspondence | address before last migration |
| S1 | m → m" | 0 |
| S2 | m' → m" | m |
| S3 | — | — |
| S4 | — | — | migration from network C to network D  FIG. 14C

| migration communication control device | content of hold unit ||
|---|---|---|
| | address correspondence | address before last migration |
| S1 | m → m'" | 0 |
| S2 | m' → m'" | m |
| S3 | m" → m'" | m' |
| S4 | — | — |

FIG. 17

| MH's home address | MH's current temporary address | autonomous flag F | current broadcast address |
|---|---|---|---|
| α | β or γ | 1 | Bba or Cba |

FIG. 19

| MH's home address | temporary address | temporary address after migration | autonomous flag F |
|---|---|---|---|
| α | β | γ | 1 |

FIG. 21

| home addres | broadcast address of home network | current temporary address | broadcast address |
|---|---|---|---|
| α | Aba | β or γ | Bba or Cba |

FIG. 23

| MH's home address | MH's temporary address |
|---|---|
| α | β or γ |

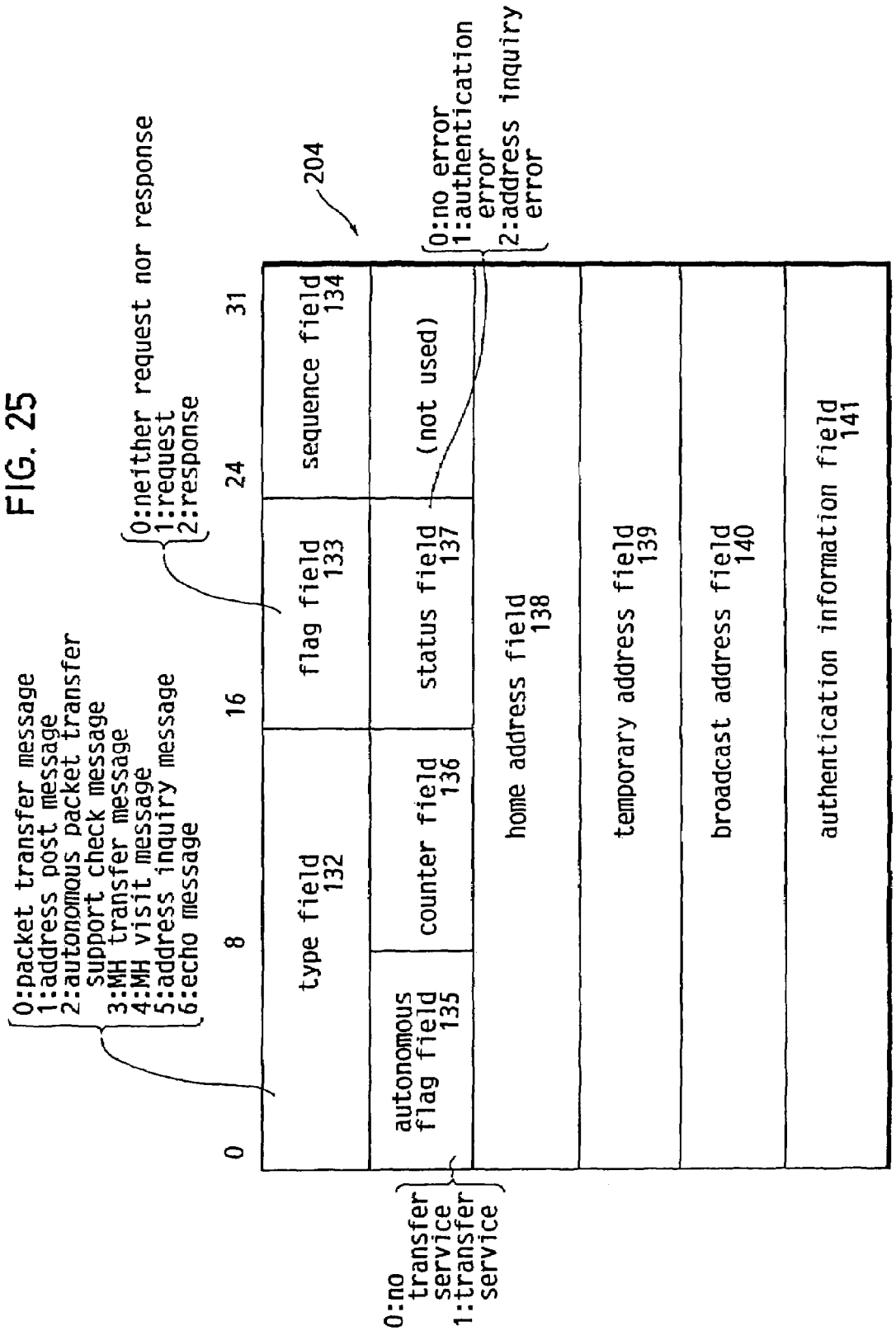

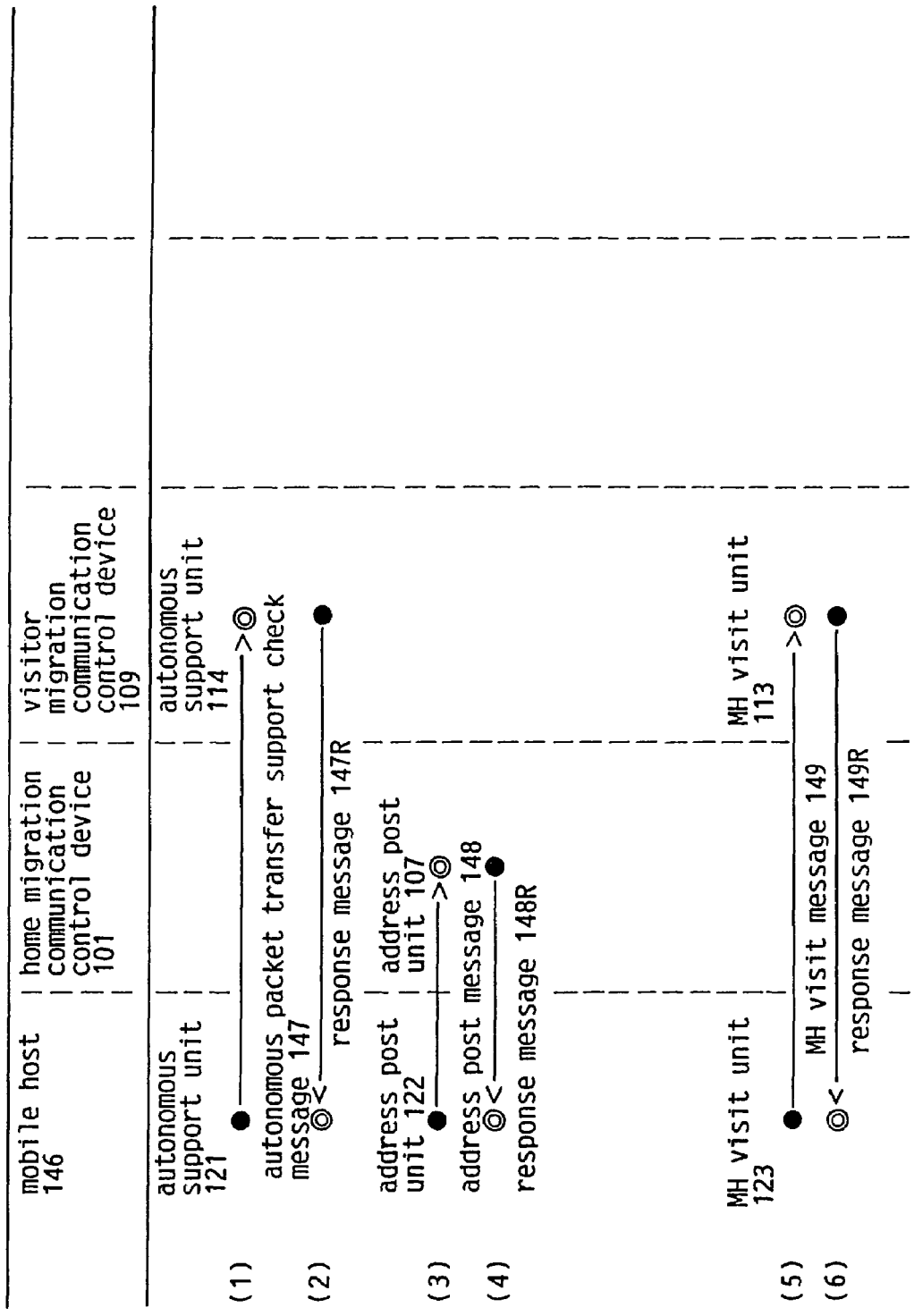
FIG. 27 migration from network A to network B

FIG. 29

| | address hold unit 119(146) | | | home MH host list 102(101) | | | | visitor MH list 110(109) | | | visitor MH list 110'(109') | | | address hold unit 128(151) | |
|---|---|---|---|---|---|---|---|---|---|---|---|---|---|---|---|
| | home address | broadcast address of home network | current temporary address | current broadcast address | MH's home address | MH's current temporary address | autonomous flagF | current broadcast address | MH's home address | MH's temporary address | temporary address after migration | autonomous flagF | MH's home address | MH's temporary address | temporary address after migration | autonomous flagF | MH's home address | MH's temporary address |
| address after obtainment of β | α | Aba | β | — | α | α | | — | | | | | | | | | | |
| (1) | α | Aba | β | Bba | α | β | | | | | | | | | | | | |
| (2) | | | | | α | β | 1 | Bba | | | | | | | | | | |
| (3) | | | | | | | | | | | | | | | | | | |
| (4) | | | | | | | | | α | β | | | | | | | | |
| (5) | | | | | | | | | α | β | β | — | | | | | | |
| (6) | | | | | | | | | | | | | | | | | | |

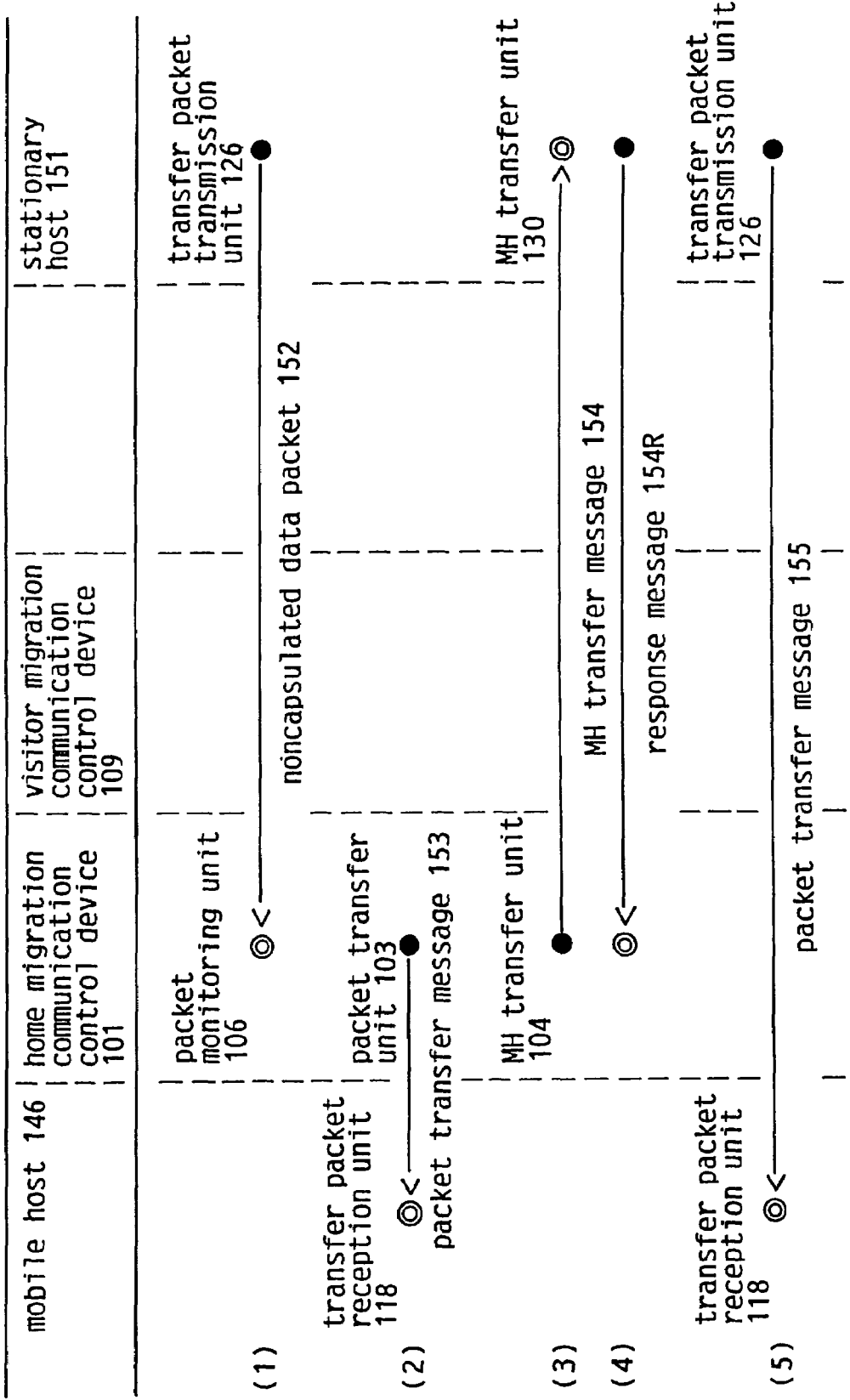

(1) noncapsulated data packet 152

(2) data packet including message 153 and noncapsulated data packet (3) data packet including message 154

(4) data packet including response message 154R (5) data packet including message 155 and noncapsulated data packet

FIG. 33

| address before communication | address hold unit 119(146) | | | | home MH list hold unit 102(101) | | | | visitor MH list hold unit 110(109) | | | | visitor MH list hold unit 110'(109') | | | | address hold unit 128(151) | |
|---|---|---|---|---|---|---|---|---|---|---|---|---|---|---|---|---|---|---|
| | home address | broadcast address of home network | current temporary address | current broadcast address | MH's home address | MH's current temporary address | autonomous flagF | current broadcast address | MH's home address | MH's temporary address | temporary address after migration | autonomous flagF | MH's home address | MH's temporary address | temporary address after migration | autonomous flagF | MH's home address | MH's temporary address |
| (1) | α | Aba | β | Bba | α | β | 1 | Bba | α | β | β | — | | | | — | — | — |
| (2) | | | | | | | | | | | | | | | | | | |
| (3) | | | | | | | | | | | | | | | | | α | β |
| (4) | | | | | | | | | | | | | | | | | | |
| (5) | | | | | | | | | | | | | | | | | | |

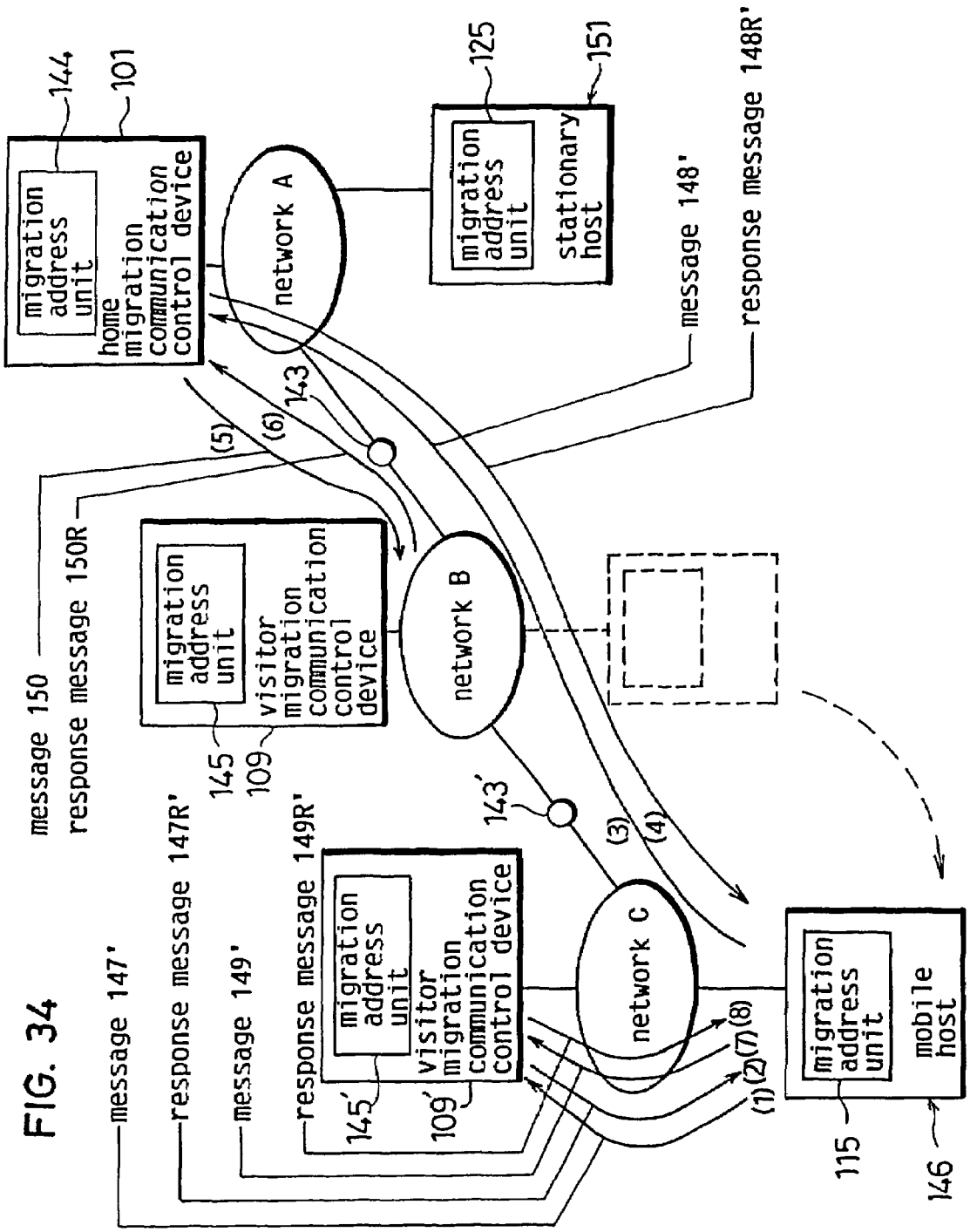

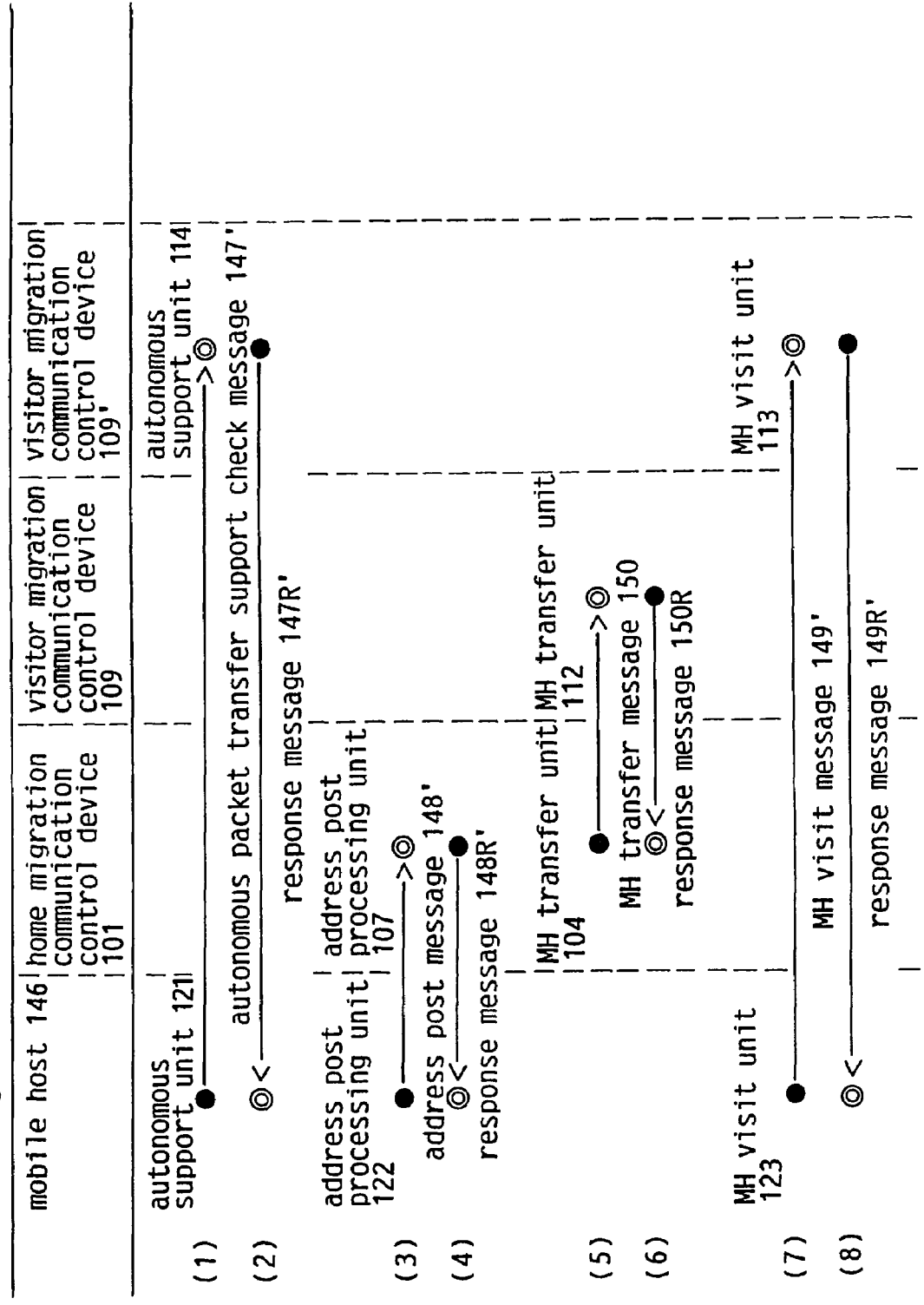
FIG. 35  migration from network B to network C

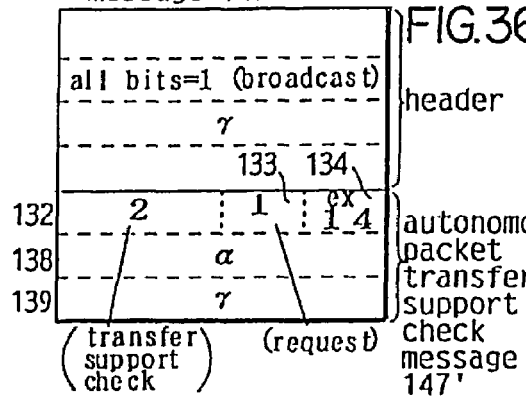
(1) data packet including message 147'
FIG. 36A
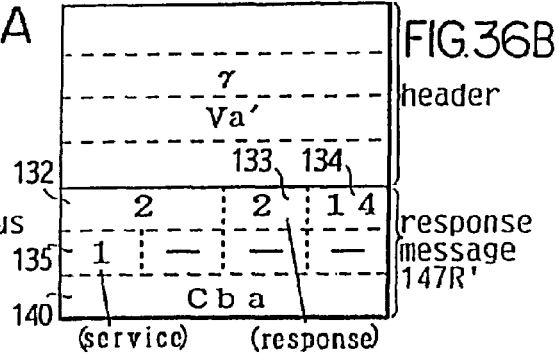
(2) data packet including response message 147R'
FIG. 36B
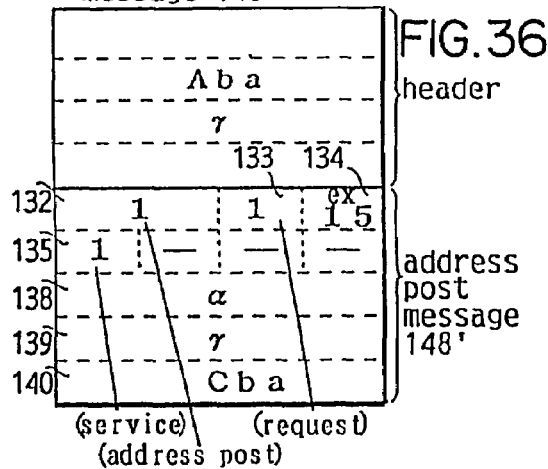
(3) data packet including message 148'
FIG. 36C
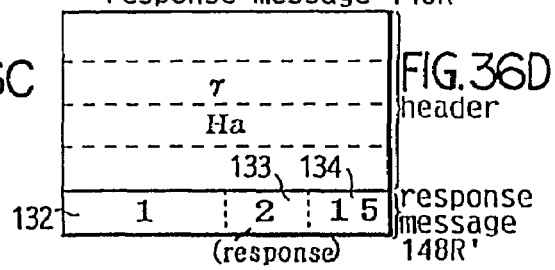
(4) data packet including response message 148R'
FIG. 36D
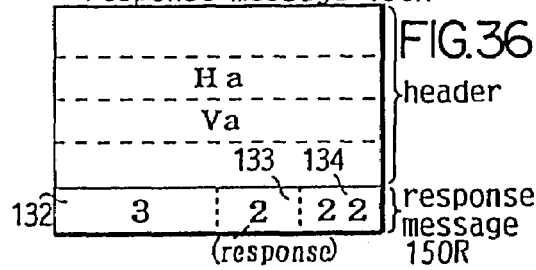
(6) data packet including response message 150R
FIG. 36F
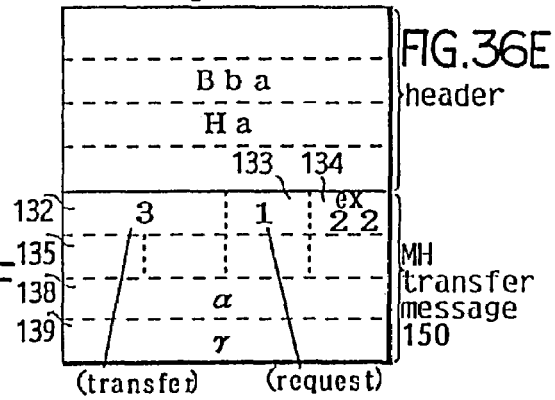
(5) data packet including message 150
FIG. 36E
(7) data packet including message 149'
FIG. 36G
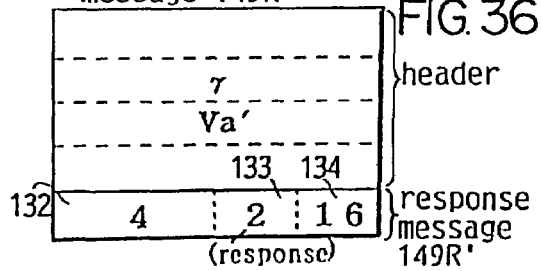
(8) data packet including message 149R'
FIG. 36H
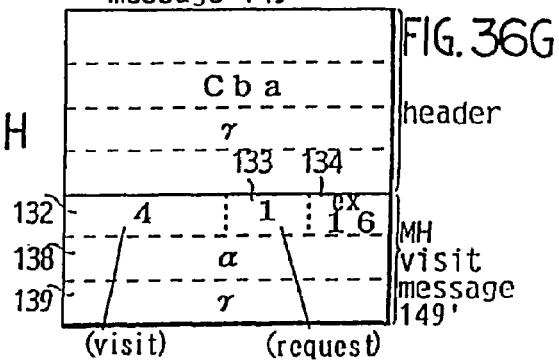

FIG. 37

| address after obtainment of γ | address hold unit 119(146) | | | | home MH host list 102(101) | | | | visitor MH list 110(109) | | | | visitor MH list 110'(109') | | | | address hold unit 128(151) | |
|---|---|---|---|---|---|---|---|---|---|---|---|---|---|---|---|---|---|---|
| | home address of home network | broadcast address of home network | current temporary address | current broadcast address | MH's home address | MH's current temporary address | autonomous flagF | current broadcast address | MH's home address | temporary address | temporary address after migration | autonomous flagF | MH's home address | temporary address | temporary address after migration | autonomous flagF | MH's home address | MH's temporary address |
| (1) | α | Aba | | | | | | | | | | | | | | | | |
| (2) | α | Aba | γ | Bba | α | β | 1 | Bba | α | β | | | | | | | α | β |
| (3) | | | γ | Cba | α | γ | 1 | Cba | | | | | | | | | | |
| (4) | | | | | | | | | | | | | | | | | | |
| (5) | | | | | | | | | α | β | | | | | | | | |
| (6) | | | | | | | | | | β | γ | | | | | | | |
| (7) | | | | | | | | | | | | | α | γ | γ | | | |
| (8) | | | | | | | | | | | | | | | | | | |

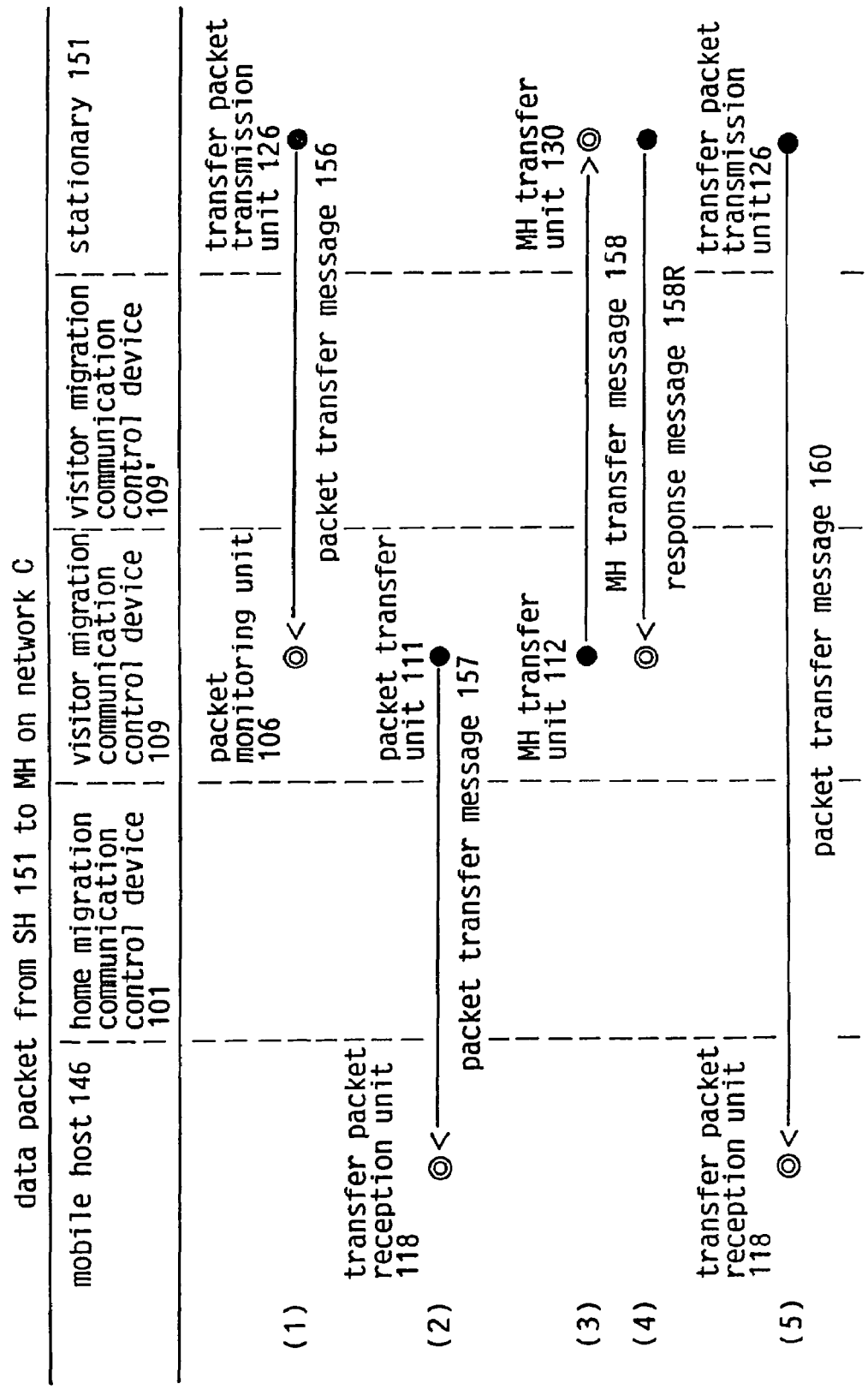

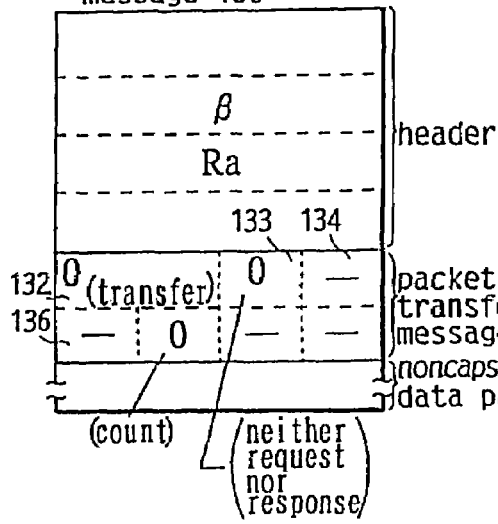
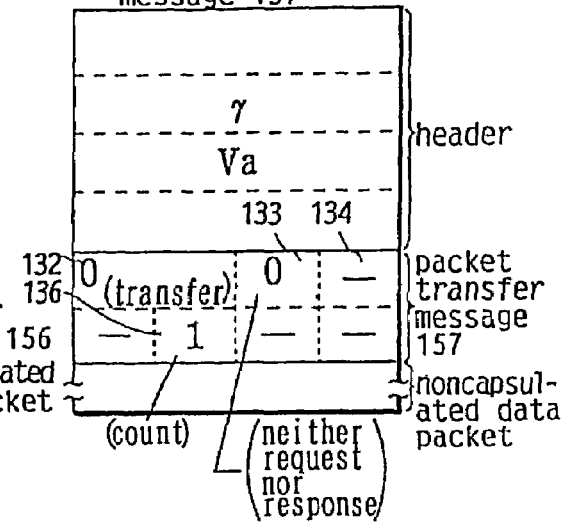
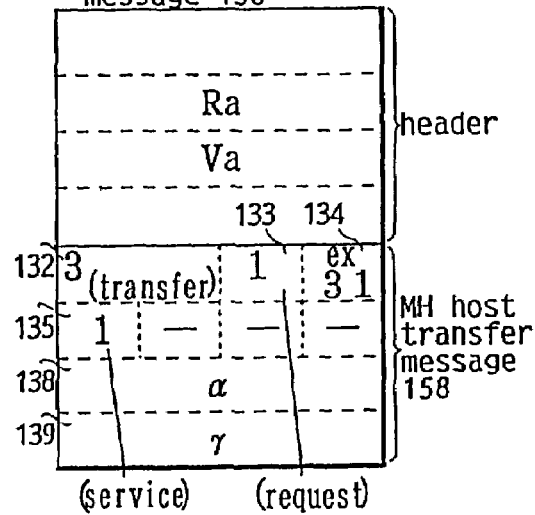
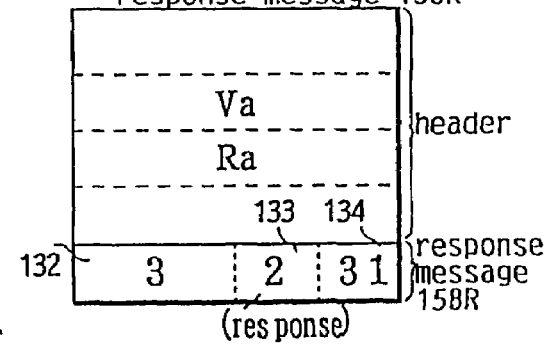
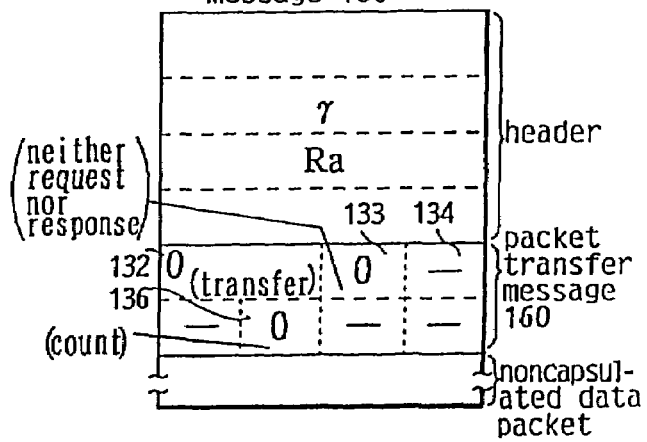

FIG. 41

| address before communi- cation | address hold unit 119 | | | home MH list hold unit 102 | | | | visitor MH list hold unit 110 | | | visitor MH list hold unit | | | address hold unit 128 | |
|---|---|---|---|---|---|---|---|---|---|---|---|---|---|---|---|
| | home add- ress | broad- cast add- ress of home net- work | cur- rent temp- orary add- ress | cur- rent broad- cast add- ress | MH's home add- ress | MH's cur- rent temp- orary add- ress | auton- omous flagF | cur- rent broad- cast add- ress | MH's home add- ress | temp- orary add- ress | temp- orary add- ress after migr- ation | auton- omous flagF | MH's home add- ress | MH's temp- orary add- ress |
| (1) | α | Aba | γ | Cba | α | γ | 1 | Cba | | | | | | |
| (2) | | | | | | | | | α | β | γ | 1 | α | β |
| (3) | | | | | | | | | | | | | | |
| (4) | | | | | | | | | α | γ | γ | — | α | γ |
| (5) | | | | | | | | | | | | | | |

PARTNER NODE MIGRATION CONTROL UNIT AND METHOD

RELATED APPLICATIONS

This is a divisional of U.S. Ser. No. 10/194,481 filed on Jul. 12, 2002, now U.S. Pat. No. 7,130,290, which is a divisional of U.S. Ser. No. 09/137,133, filed on Aug. 19, 1998, now U.S. Pat. No. 6,456,621, which is a divisional application of U.S. Ser. No. 08/635,027, filed on Apr. 19, 1996 and issued as U.S. Pat. No. 5,845,079 which is a division of U.S. Ser. No. 08/014,766, filed on Feb. 8, 1993 and issued as U.S. Pat. No. 5,517,618 on May 14, 1996.

BACKGROUND OF THE INVENTION (1) Field of the Invention

The present invention relates to a migration communication control device that controls a communication between a mobile node and a corresponding node to enable them to communicate continuously when the former migrates by managing addresses assigned to the former each time it migrates across networks.

(2) Description of the Related Art

Recent progress in the field of electronic technology makes it possible to assemble smaller and lighter portable computers. These portable computers referred to as mobile nodes are designed so that they can migrate across networks: they are unplugged from a network and plugged in another and communicate with a stationary node. Thus, each of them is assigned a specific address to prove its identity. The address, in general, includes location information as to which network the mobile nodes are currently plugged in, and for this reason, a new address is assigned each time they migrate.

For example, the address composed of a network address unit for specifying a network in which the mobile node is currently plugged in and a node address unit for proving the mobile node's identity in the network, or the address used in a conventional network architecture such as Internet Protocol (details of which are in Internet Protocol, RFC791, Jon Postel, September, 1981), they must be changed every time the mobile nodes migrate.

However, once the mobile node migrates to another network, a communication with the stationary node will be terminated. This is because a packet is transmitted to its old address only to be wasted.

Thus, to enable the mobile node and stationary node to communicate continuously when the former migrates, it is necessary to control the communication by managing the steadily changing address.

To date, two address managing methods have been proposed: one by Sony Computer Science Laboratory Inc. and one by the Department of Computer Science at Columbia University.

Sony Computer Science Laboratory Inc. proposed a method using VIP (Virtual Internet Protocol), details of which are on "VIP: Lower Layer Internet Protocol", Fumio Teraoka, Yasuhiko Yokote, Mario Tokoro, Proceed of Data Processing Convention: Multimedia Communication and Distributed Processing.

In this method, each mobile node is assigned a VIP (Virtual Internet Protocol) address and a PIP (Physical Internet Protocol) address. The former is an unchanged address used in a communication application for packet transmission and reception; and the latter is an address changed for every migration to specify an update physical location of the mobile node. Data related to both addresses are held in a cache of a gateway. Under these conditions, the stationary node transmits a packet to the mobile node to the VIP address thereof, and the packet is converted into another packet addressed to the PIP address when it passes the gateway, thence transmitted to the mobile node via the gateways placed in a route onwards. These gateways collect data related to a correlation between the VIP and PIP addresses from the header of the packet upon the receipt thereof, thus updates data in the cache, and hence are able to convert other packets addressed to the VIP addresses into the packets addressed to the PIP addresses based on the correlation entered in the cache.

In this method, in short, the use of the address constituting with the VIP and PIP addresses enables the mobile node and the stationary node to communicate continuously when the former migrates.

The Department of Computer Science at Columbia University proposed a method using an Internet Protocol address of which network address unit does not specify the network which the mobile node is currently plugged in but declares itself to be the mobile node, hence a certain value is given as the network address unit to all the mobile nodes. As well, the method uses an "MSS(Mobile Support Station) installed at each network to manage the IP addresses and control a packet" route to the mobile node. The MSS is designed so that it collects data related to the update physical location of the mobile by referring other MSSs.

Given these conditions, when the stationary node transmits a packet to the mobile node when it migrates, it first transmits the packet to a first MSS installed in its network; thence the first MSS transfers the packet to a second MSS installed in a network which the mobile node is currently plugged in; and finally the second MSS transfers the packet to the mobile node.

In this method, in short, the use of the MSS enables the mobile node and the stationary node to continue the communication when the former migrates.

In the first method, however, all the nodes must be constructed so that they understand both the VIP and PIP addresses, causing them to extend a scale functionally, otherwise making it impossible to apply this method to apparatuses employed in existing networks. In addition, the communication via the gateways reduces communication efficiency compared with direct packet transmission, because the gateways check whether they have received the packet addressed to the VIP address or the PIP address each time they receive it, as well as whether or not to collect the data therefrom to update those in the cache.

In the second method, each network must have the MSS, and the communication via the MSSs makes it impossible to transmit the packet directly, thereby reducing the communication efficiency.

SUMMARY OF THE INVENTION

The present invention therefore has an object to provide a migration communication control device that is available to any apparatus employed in existing networks. Also the present invention has another object to provide a migration communication control device that enables the mobile node and stationary node to communicate continuously when the former migrates by transmitting and receiving the packet directly besides transferring the packet as has been done when the mobile node migrates across the networks.

The above objects are fulfilled by a migration communication control device constructed to control a communication between a mobile node and a partner node, the mobile node migrating across networks and obtaining an address assigned on each network while the partner node being a communication partner of the mobile node, comprising a first migration control unit, a second migration control unit, a third migration control unit, the second migration control unit being placed on the mobile node and the third migration control unit being placed on the partner node, wherein the first migration control unit comprises a packet transfer unit' for receiving a packet which was destined for an outdated address of the mobile node, the outdated address assigned when the mobile node migrated to a network to which the first migration control unit is attached, generating a conversion packet which holds an updated address instead of the outdated address, and transmitting the conversion packet which holds an updated address instead of the outdated address, and transmitting the conversion packet; and an address post unit for transmitting an address post message which indicates the updated address of the mobile node to the third migration control unit, the third migration control unit transmitting the packet received by the packet transfer unit, and the second migration control unit comprises a migration post unit for transmitting to the first migration control unit a migration post message which indicates the updated address of the mobile node when the mobile node migrates to another network; and a packet resumption unit for receiving the conversion packet from both the first migration control unit and the third migration control unit and resuming an original packet from the conversion packet, and the third migration control unit comprises a packet conversion unit for converting a destination address of a packet, the packet to be transmitted to the mobile node, into the updated address indicated by the address post message, the address post message sent by the first migration control unit, and transmitting it to the mobile node.

The migration post unit in the second migration control unit may transmit an identification key included in the migration post message, the identification key being employed to identify the mobile node.

The identification key may be an address of the mobile node assigned at one network before the network to which the mobile node is currently attached.

The identification key may be an address of the mobile node assigned before its initial migration.

The second migration control unit may be constructed to transmit to the third migration control unit the packet which has the same format as the resumed packet.

The first migration control unit may further comprise an address hold unit for holding the outdated address and the updated address by corresponding them with each other; and an address comparison unit for comparing the destination address of the received packet with the outdated address, wherein the packet transfer unit generates the conversion packet and transmits it when the address comparison unit detects that the destination address of the received packet coincides with the outdated address.

The first migration control unit may further comprise an address hold unit for holding the outdated address and the updated address by corresponding them with each other; and an address comparison unit for comparing the destination address of the packet received by the packet transfer unit with the outdated address, wherein the address post unit transmits the address post message which indicates the updated address of the mobile node to the third migration control unit, the third migration control unit transmitting the packet received by the packet transfer unit, when the address comparison unit detects that the destination address of the packet coincides with the outdated address.

The second migration control unit may further comprise an address hold unit for holding the outdated address and the updated address by corresponding them with each other; and an address comparison unit for comparing the updated address with the destination address of the packet received from one of the first migration control unit and the third migration control unit, wherein the packet resumption unit resumes the original packet from the conversion packet when the address comparison unit detects that the updated address coincides with the destination address of the packet received from one of the first migration control unit and the third migration control unit.

The third migration control unit may further comprise an address hold unit for holding the outdated address and the updated address of the mobile node by corresponding them with each other; and an address comparison unit for comparing the outdated address in the address hold unit with the destination address of the packet to be transmitted to the mobile node, wherein the packet conversion unit converts the destination address of the packet to be transmitted to the mobile node into the updated address which corresponds to the outdated address in the address hold unit when the address comparison unit detects the outdated address in the address hold unit coincides with the destination address of the packet.

There may be a plurality of the first migration control units, and the second migration control unit transmits the migration post message to at least one of the first migration control units.

The migration post unit in the second migration control unit may transmit the migration post message to the first migration control unit which is attached to the network to which the mobile node was attached before its migration, each of the first migration control units has a migration post unit for transmitting to one of the other first migration control units a migration post message to post the same address as the updated address indicated by the migration post message received from the second migration control unit, and each of the first migration control units has a migration post unit for transmitting a migration post; message from one of the other first migration control units to another first migration control unit to post the same address as the updated address indicated by the received migration post message.

Each of the first migration control units and the second migration control unit may further comprise a pointer hold unit for holding pointers related to the first migration control unit to which the migration post message is transmitted, and wherein the migration post unit in each of the first migration control units and the migration post unit in the second migration control unit transmit the migration post message to each of the addresses related to each of the pointers.

Each of the pointers may be a broadcast address of the network to which one of the first migration control units is attached.

Each of the pointers may be an address which is assigned to one of the first migration control units uniquely.

Each of the pointers may be the address of the mobile node which is assigned when the mobile node is attached to the same network as is the first migration control unit, and the migration post unit in the first migration control unit and the migration post unit in the second migration control unit obtain the broadcast address of the network to which each of the first migration control units is attached with referring to the address of the mobile node, and transmits the migration post message to the obtained broadcast address.

The pointer hold unit in the second migration control unit may hold a pointer related to a first migration control unit for the latest migration, which is the first migration control unit being attached to one network before the network to which the mobile node is currently attached, and the pointer hold unit in the first migration control unit holds a pointer related to another first migration control unit attached to the same network as was the mobile node attached before migrating to the network to which the first migration control unit is attached.

The second migration control unit may further transmit to the first migration control unit the pointer by sending thereto the migration post message, the pointer to be held by the first migration control unit.

The first migration control unit may store into the pointer hold unit the pointer when it receives from the second migration control unit the migration post message by corresponding the pointer with the updated address indicated by the received migration post message.

Each of the first migration control units may further comprise an address hold unit for holding the outdated address and the updated address by corresponding them with each other, wherein a migration post message unit stores into the address hold unit the outdated address and the updated address by corresponding them with each other when it receives from the second migration control unit the migration post message, while converts the updated address in the address hold unit into the updated address indicated by the migration post message when it receives from the first migration control unit the migration post message and the outdated address indicated by the migration post message coincides with one of the updated addresses in the address hold unit.

The first migration control unit may be placed on a gateway, which connects networks.

The first migration control unit may be placed on the network as an individual node.

The migration post unit in the second migration control unit may transmit the migration post message to a home migration control unit, the home migration control unit being the first migration control unit which is attached to a network where the mobile node left for its initial migration, and the home migration control unit may further comprise a home migration post unit for transmitting a migration post message to a first migration control unit for the latest migration, the first migration control unit for the latest migration being the first migration control unit which is attached to the network where the mobile node left for the latest migration, to post the same updated address as is indicated by the migration post message received from the second migration control unit.

The first migration control unit may further comprise a migration post unit for transmitting the migration post message indicating the updated address of the mobile node to one of the other first migration control units when the conversion packet destined for the outdated address of the mobile node was sent therefrom to the first migration control unit.

The migration post unit in the second migration control unit may transmit to the home migration control unit the migration post message where a home address and the updated address are corresponded with each other, the home address assigned when the mobile node is attached to the same network as is the home migration control unit, and each of the packet transfer unit and the address post unit in the home migration control unit may transmit the conversion packet and the address post message respectively with referring to the above home address and the updated address.

The second migration control unit may further comprise an outdated address post unit for transmitting to the first migration control unit for the latest migration an outdated address post message where the outdated address and the home address are corresponded with each other, the outdated address being assigned to the mobile node before the latest migration, the home migration post unit in the home migration control unit may transmit to the said first migration control unit for the latest migration the migration post message where the above home address and the updated address are corresponded with each other, and the packet transfer unit and the address post unit in the first migration control unit for the latest migration may transmit the conversion packet and the address post message respectively in accordance with the outdated address and the updated address, the outdated address and the updated address being corresponded with each other via the home address.

The outdated address post unit in the second migration control unit may transmit the above outdated address post message at a migration of the mobile node preceding the latest migration, and each of the migration post units in the second migration control unit and the home migration post unit in the home migration control unit may transmit the above migration post message at the latest migration of the mobile node.

The second migration control unit may further comprise a home migration control unit pointer hold unit for holding a pointer related to the home migration control unit, the migration post unit in the second migration control unit transmits the migration post message to the address related to the pointer, the home migration control unit may further comprise a pointer hold unit for the latest migration for holding a pointer related to the first migration control unit for the latest migration, and the home migration post unit in the home migration control unit may transmit the migration post message to the address related to the pointer.

Each of the above pointers may be the broadcast address of the network to which each of the first migration control units is attached.

Each of the above pointers may be the address assigned to each of the first migration control units uniquely.

The second migration control unit may further comprise a pointer obtainment unit for requesting to the first migration control unit for the latest migration the pointer related to the first migration control unit for the latest migration, and the migration post unit in the second migration control unit may post the obtained pointer to the home migration control unit together with the updated address by sending thereto the migration post message.

The migration post unit in the second migration control unit may post to the home migration control unit the pointer at the migration of the mobile node preceding the latest migration, while the migration post unit may post the above updated address at the latest migration of the mobile node.

The first migration control unit may further comprise an address post suppressing unit for suppressing transmission of the address post message from the address post unit to the third migration control unit, and the address post suppressing unit may suppress transmission of the address post message when none of the first migration control units is attached to the same network as is the mobile node.

The second migration control unit may further comprise a detect unit for detecting whether or not the first migration control unit is attached to the network to which the mobile node migrates, the migration post unit in the second migration control unit may transmit to the home migration control unit the migration post message which includes the detecting result of the above detect unit together with the updated address, the home migration post unit in the home migration control unit may transmit to the first migration control unit for the latest migration the migration post message which includes the detecting result of the above detect unit together with the updated address, and the address post suppressing unit in each of the home migration control unit and the first migration control unit for the latest migration may suppress the transmission of the address post message in accordance with the detecting result of the above detect unit.

The first migration control unit may further comprise a packet transfer suppressing unit for suppressing transfer of the packet conducted by the packet transfer unit.

The first migration control unit may further comprise an address post suppressing unit for suppressing transmission of the address post message from the address post unit to the third migration control unit, and the address post suppressing unit in the first migration control unit being attached to a network to which the mobile node is not attached, may suppress the transmission of the address post message when the packet transfer suppressing unit in the first migration control unit for the latest migration suppresses transfer of the packet.

The second migration control unit may further comprise a detect unit for detecting whether or not the packet transfer suppressing unit in the first migration control unit suppresses the transfer of the packet, the first migration control unit being attached to the network to which the mobile node migrates, and the migration post unit in the second migration control unit transmits to the home migration control unit the migration post message which includes the detecting result of the above detect unit together with the updated address, the home migration post unit in the home migration control unit may transmit to the first migration control unit for the latest migration the migration post message which includes the detecting result of the detect unit together with the updated address, and the address post suppressing unit in each of the home migration control unit and the first migration control unit for the latest migration may suppress the transmission of the address post message in accordance with the detecting result of the above detect unit.

The packet transfer suppressing unit in the first migration control unit for the latest migration may suppress the transfer of the packet conducted by the packet transfer unit, when the packet transfer suppressing unit in the first migration control unit being attached to the network to which the mobile node migrates suppresses the transfer of the packet.

The above objects are finally fulfilled by a partner node migration control unit in a migration communication control device, the migration communication control device being constructed to control a communication between a mobile node which migrates across networks and obtains an address assigned on each network and a partner node which is a communication partner of the mobile node, being placed on the mobile node and comprising an address post message receiving unit for receiving an address post message which indicates an updated address of the mobile node from a packet transfer migration control unit, the packet transfer migration control unit or address post processing unit transmitting an address post message which indicates the updated address of the mobile node to the partner node or general node; and a packet conversion unit for converting a destination address of a packet, the packet to be transmitted to the mobile node, into the updated address indicated by the address post message, and transmitting it to the mobile node.

The above objects may further be fulfilled by a mobile node migration control unit in a migration communication control device, the migration communication control device being constructed to control a communication between a mobile node which migrates across networks and obtains an address assigned on each network and a partner node which is a communication partner of the mobile node, being placed on the mobile node and comprising a migration post unit for transmitting to a packet transfer migration control unit a migration post message which indicates an updated address of the mobile node when the mobile node migrates to another network, the packet transfer migration control unit for receiving a packet which was transmitted by the partner node to an outdated address of the mobile node, the outdated address assigned when the mobile node migrated to a network to which the migration control unit for packet transfer is attached, generating a conversion packet which holds the updated address instead of the outdated address, and transmitting the conversion packet; and a packet resumption unit for receiving the conversion packet from both the packet transfer migration control unit and the mobile node, and resuming an original packet from the conversion packet.

The above objects are finally fulfilled by a partner node migration control unit in a migration communication control device, the migration communication control device being constructed to control a communication between a mobile node which migrates across networks and obtains an address assigned on each network and a partner node which is a communication partner of the mobile node, being placed on the mobile node and comprising an address post message receiving unit for receiving an address post message which indicates an updated address of the mobile node from a packet transfer migration control unit, the packet transfer migration control unit or address post processing unit transmitting an address post message which indicates the updated address of the mobile node to the partner node or general node; and a packet conversion unit for converting a destination address of a packet, the packet to be transmitted to the mobile node, into the updated address indicated by the address post message, and transmitting it to the mobile node.

According to the above construction, the migration communication control device of the present invention transfers and converts the packet using the address assigned to the mobile node each time it migrates across networks, obviating particular addresses or devices such as the VIP address used conventionally. For this reason, the migration communication control device of the present invention can be applied to the existing partner node and mobile node so that they can communicate continuously by transferring the packet. Moreover, it is advantageous that the migration communication control device of the present invention is not necessarily applied to all the nodes to enhance communication efficiency; the present invention can be applied only to where necessary on the existing networks. More precisely, when any existing partner node communicates with the mobile node when it migrates, the packet can be transmitted directly from the mobile nodes to the existing partner node; and it can be transferred via the first migration control unit from the existing partner node to the mobile node, thereby enhancing communication efficiency.

Furthermore, when the partner node employs the migration communication control device of the present invention, communication efficiency is further enhanced thanks to the direct packet transmission and reception made possible by posting the update address of the mobile node from the first migration control unit to the third migration control unit.

Also, the devices such as MSS or a gateway employing the VIP are not necessarily installed at every network to which the mobile node migrates. To be precise, according to the present invention, the continuous communication is implemented even when the mobile node migrates to a network at which no special devices including above ones are installed.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIGS. 10a and 10b are illustrations showing (a) data in a data hold unit 1 in the mobile node (b) data in a data hold unit 1 in the migration communication control devices each employed as the gateway, the stationary node, and the individual node;

FIGS. 11a-11f If are illustrations showing a format of a packet in the first embodiment of the present invention;

FIGS. 12a-12e are illustrations showing a format of a packet in the first embodiment of the present invention;

FIGS. 13a-13c are illustrations showing a content of the data hold unit 1 in the migration communication control device employed as the gateway;

FIGS. 14a-14c are illustrations showing a content of the data hold unit 1 in the migration communication control device employed as the individual node;

FIG. 17 is an illustration showing a content of a home mobile host list hold unit in the second embodiment of the present invention;

FIG. 19 is an illustration showing a content of a visitor mobile host list hold unit in the second embodiment of the present invention;

FIG. 21 is an illustration showing a content of an address hold unit in the migration address unit in the second embodiment of the present invention;

FIG. 23 is an illustration showing a content of the address hold unit in the migration address unit in the second embodiment of the present invention;

FIGS. 24a-14c are illustrations showing a format of a data packet in the second embodiment of the present invention;

FIG. 25 is an illustration showing a format of a packet transfer message in the second embodiment of the present invention;

FIG. 27 is an illustration showing a communication sequence in FIG. 26;

FIG. 29 is an illustration showing a change in the content of each hold unit in FIG. 26;

FIG. 31 is an illustration showing a communication sequence in FIG. 30;

FIG. 33 is an illustration showing a change in the address hold unit in each device in FIG. 33;

FIG. 34 is an illustration showing a flow of a data packet transmitted between devices at an operation example in the second embodiment of the present invention;

FIG. 35 is an illustration showing the communication sequence in FIG. 34;

FIGS. 36a-36h are illustrations showing a construction of each data packet in FIG. 34;

FIG. 37 is an illustration showing a change in the address hold unit in each device in FIG. 34;

FIG. 39 is an illustration showing a communication sequence in FIG. 38;

FIGS. 40a-40e are illustrations showing a construction of each data packet in FIG. 38;

FIG. 41 is an illustration showing a change in the address hold unit in each device in FIG. 38;

DESCRIPTION OF THE PREFERRED EMBODIMENT

Embodiment 1

A construction of a migration communication control device in a first embodiment of the present invention is described hereunder with referring to FIGs. Hereinafter, the mobile node and partner node in the related art as well as in the summary of the invention are referred to as a mobile host and a stationary host, respectively.

Figure 1:
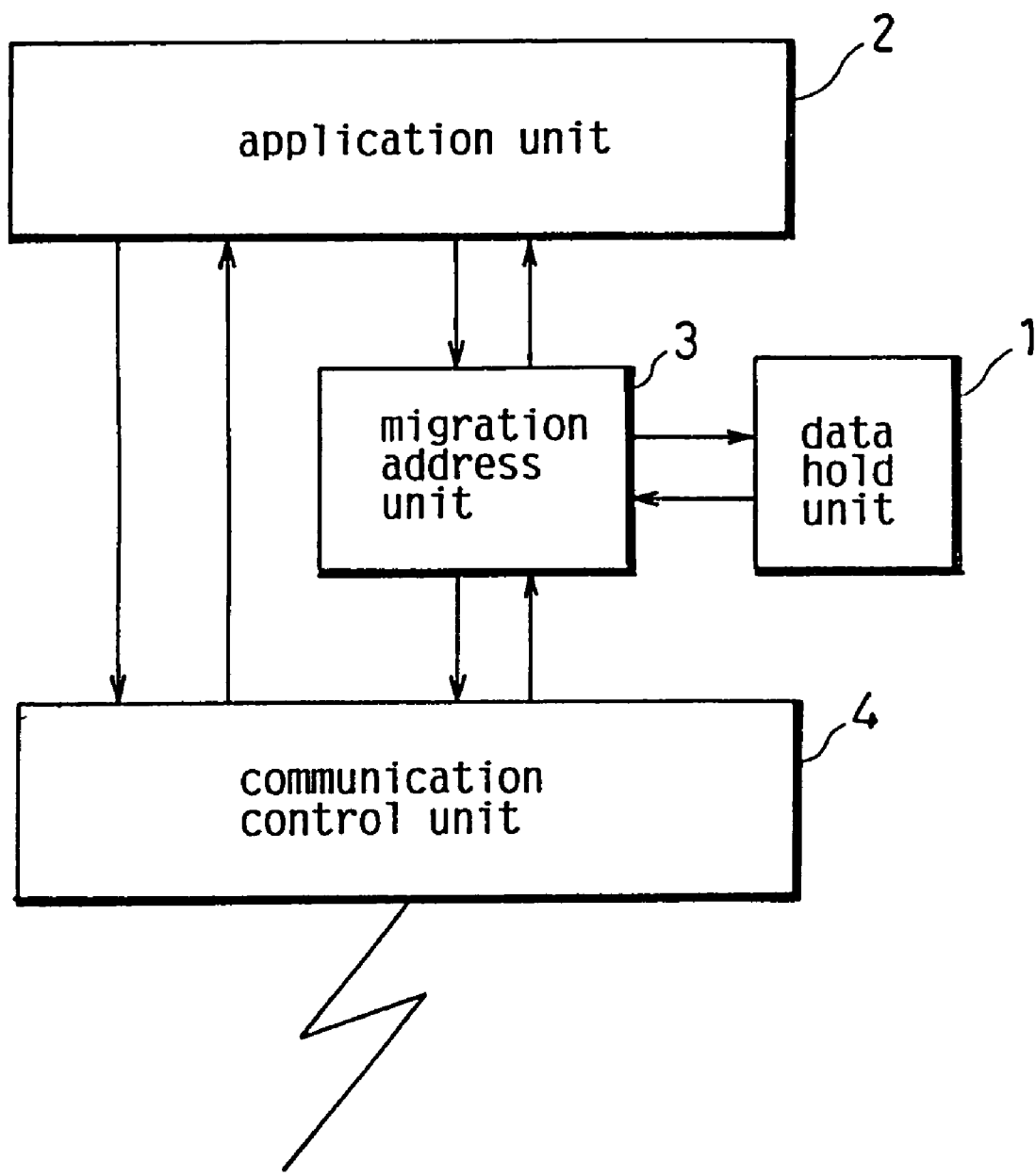
FIG. 1 is a block diagram depicting a construction of a migration communication control device in a first embodiment of the present invention.

FIG. 1 is an illustration showing the construction of the migration communication control device comprising a data hold unit 1, an application unit 2, a migration address unit 3, and a communication control unit 4.

The data hold unit 1 holds a couple of addresses of a mobile host by corresponding them. Each of the addresses in the data hold unit 1 is assigned before and after a migration of the mobile host.

The application unit 2 checks a connection as well as monitors a timer. The unit 2 is relevant for a higher layer in OSI model, which includes an application layer. For example, the unit 2 operates as TCP at TCP/IP (Transmission Control Protocol/Internet Protocol) or a layer which is higher than TCP.

The migration address unit 3 processes a migration address with referring to data in the data hold unit 1. The concrete operation of the migration address unit 3 varies depending on a type of the migration communication control device comprising the unit 3, and this will be described in detail later.

The communication control unit 4 controls the communication. The unit 4 is relevant for a lower layer in the OSI model. For example, the unit 4 operates as a layer which is lower than IP at TCP.

The application unit 2 and the communication control unit 4 are the same units as ones implemented on a general host. Besides the unit 2 and 4, the migration communication device in the first embodiment of the present invention includes the data hold unit 1 and the migration address unit 3; thereby implements an operation unique to this case. That is, the data hold unit 1 and the migration address processing unit 3 are attached to the mobile host which migrates across networks, or a stationary host which is attached to a network fixedly (for example, a gateway or a server); otherwise, they operate alone. Each device comprising the unit 1 and 3 supports a continuous communication unaffected by migration of the mobile host besides providing its own function.

Figure 2:
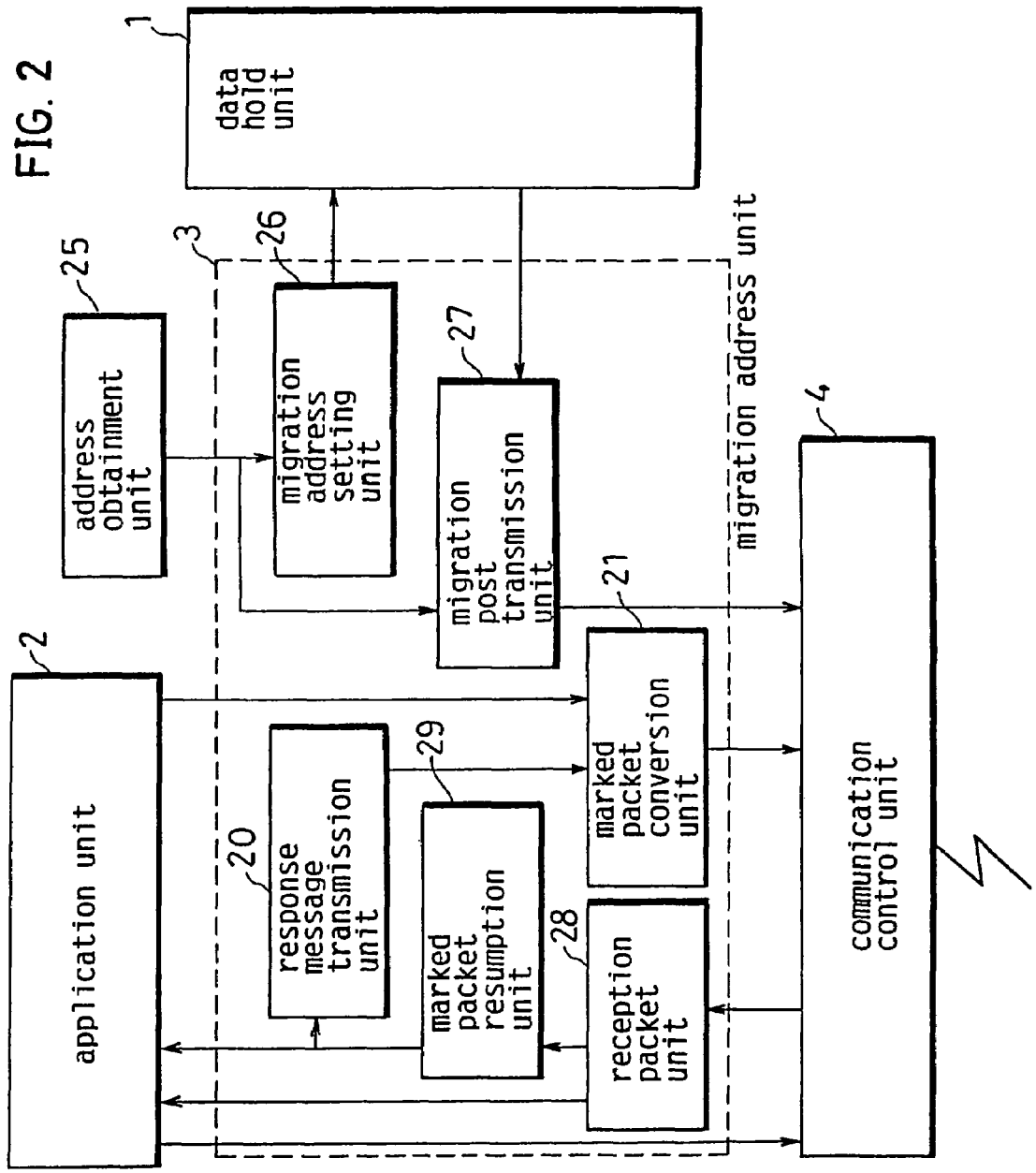
FIG. 2 is a block diagram depicting a detailed construction of the migration communication control device employed as a mobile node in the first embodiment of the present invention.
Figure 3:
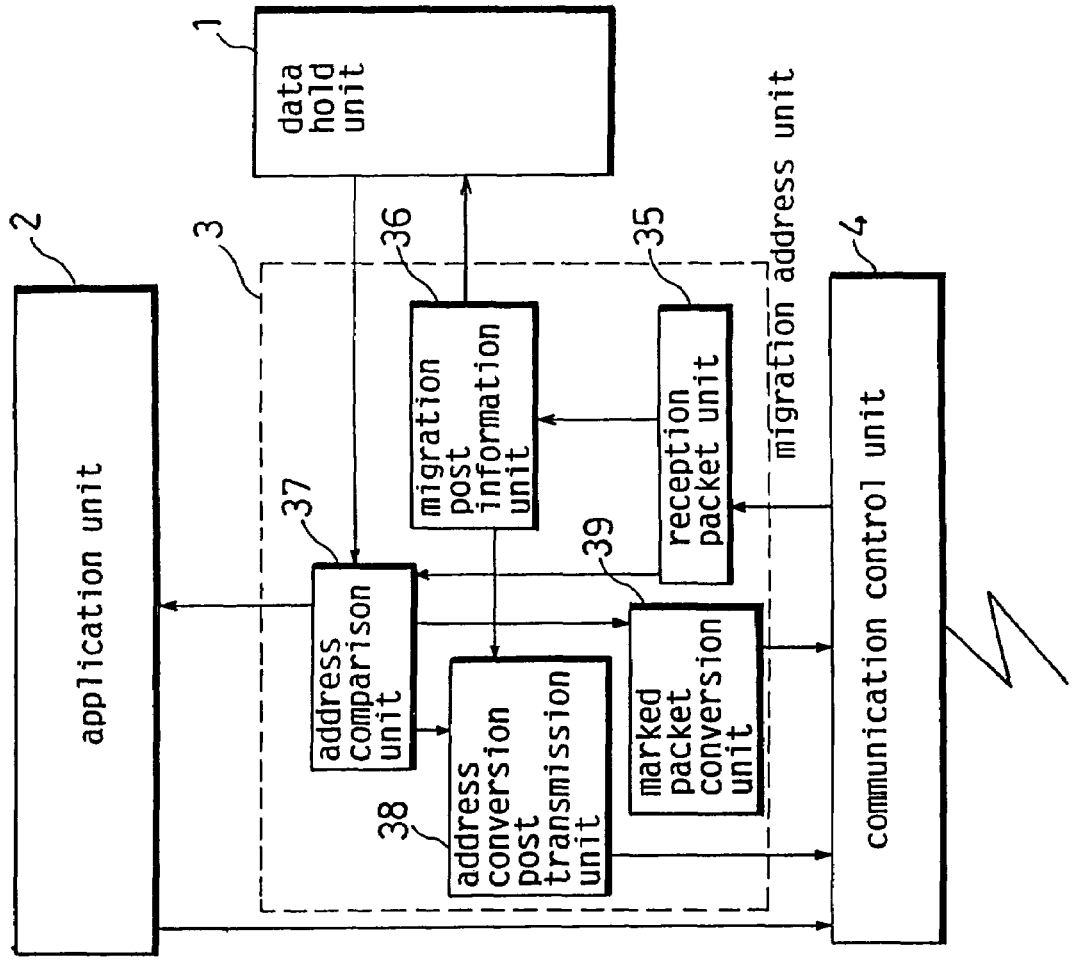
FIG. 3 is a block diagram depicting a detailed construction of the migration communication control device employed as a gateway in the first embodiment of the present invention.
Figure 4:
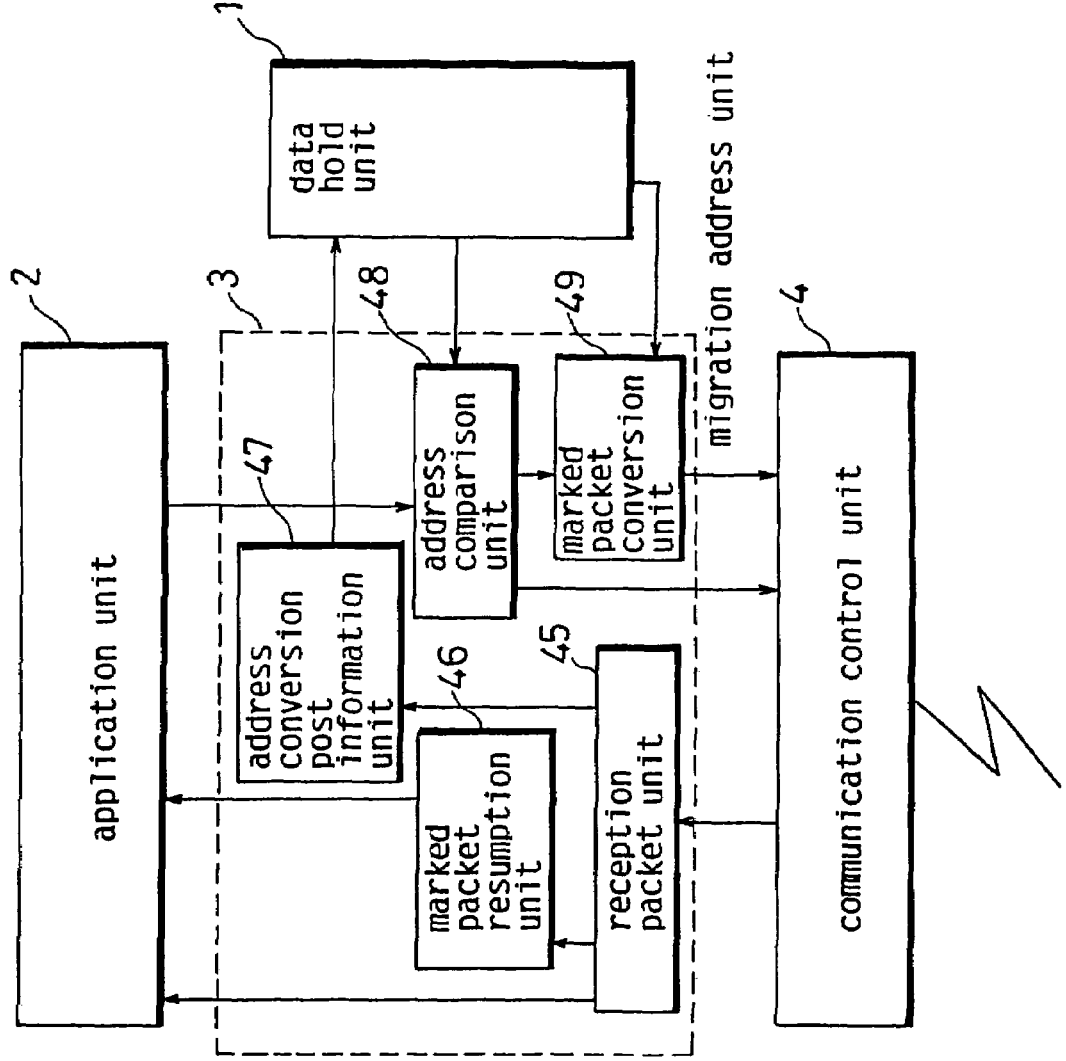
FIG. 4 is a block diagram showing a detailed construction of the migration communication control device employed as a stationary node in the first embodiment of the present invention.
Figure 5:
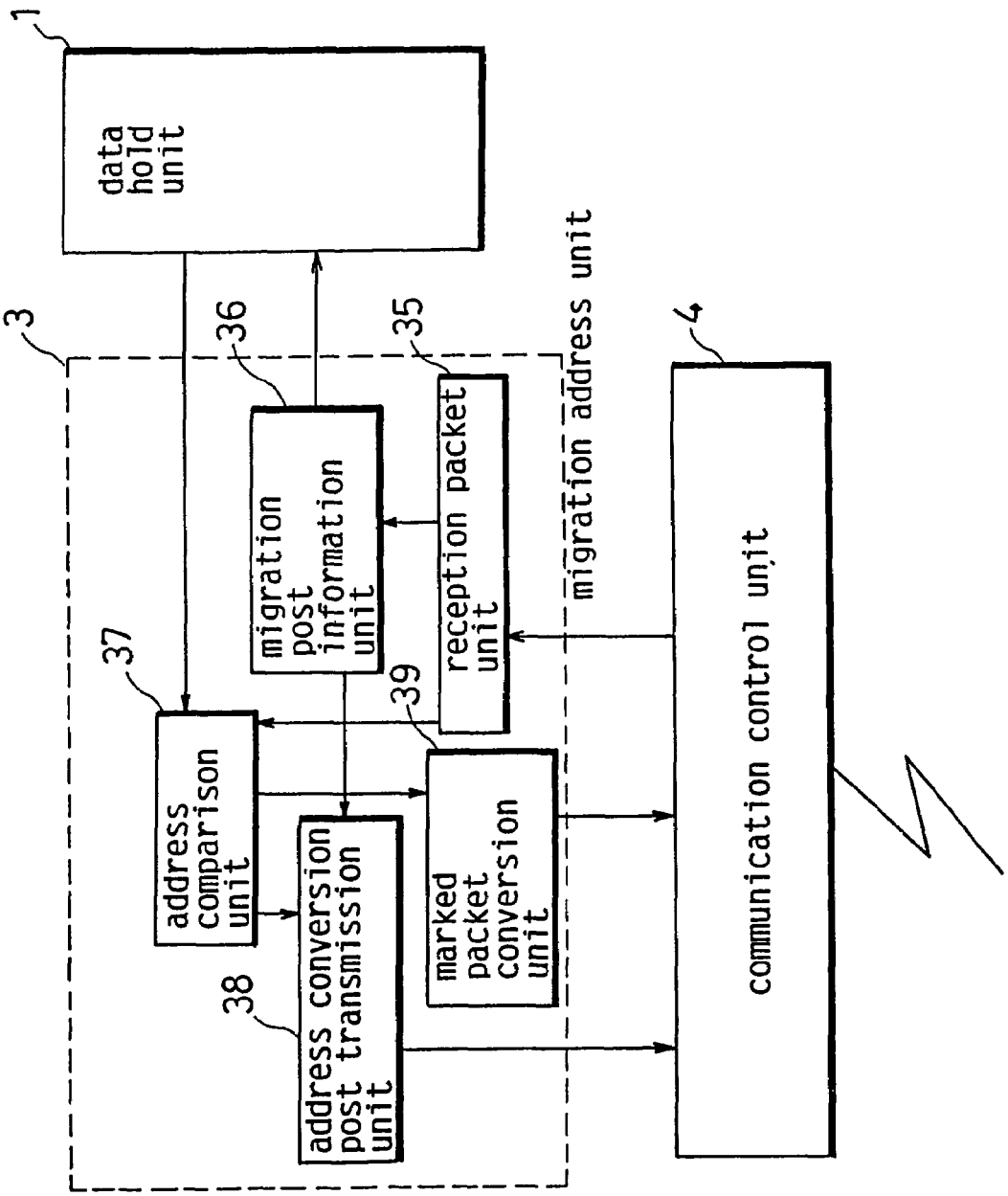
FIG. 5 is a block diagram showing a detailed construction of the migration communication control device employed as an individual node in the first embodiment of the present invention.

The data hold unit 1 and the mobile address unit 3, which are included in the devices attached to the network, are described in FIGS. 2, 3, 4, 5. FIG. 2 shows a migration communication control device where the unit 1 and the unit 3 are attached to the mobile host which migrates across networks; FIG. 3 shows a migration communication control device where the unit 1 and the unit 3 are attached to a gateway which connects the networks; FIG. 4 shows a migration communication control device where the unit 1 and the unit 3 are attached to the stationary host, which is the communication partner of the mobile host; and FIG. 5 shows a migration communication control device attached to the network itself.

The migration communication control device in FIG. 2 (hereinafter referred to as a mobile host) further includes the application unit 2, the communication control unit 4, and an address obtainment unit 25, besides the data hold unit 1 and the migration address unit 3.

Each of the application unit 2 and the communication control unit 4 operates as the above; while the unit 2 together with the unit 4 operate as a conventional stationary host.

The address obtainment unit 25 obtains an address of the mobile host assigned when it has migrated to another network. Although other options can be considered, such as employing a manual setting by an operator or communicating with a server computer which administrates addresses of the network, it is supposed here that the address it obtained in accordance with an instruction of a system administrator or the operator. The address obtainment unit 25 is also possessed by a general host and will not be described in detail.

The addresses held in the data hold unit 1 are obtained by the address obtainment unit 25.

The migration address unit 3 (enclosed with a broken line) consists of a response message transmission unit 20, a marked packet conversion unit 21, a migration address setting unit 26, a migration post transmission unit 27, a reception packet unit 28, and a marked packet resumption unit 29.

The response message transmission unit 20 transmits the packet which responds to the received packet if the response is needed.

The marked packet conversion unit 21 converts a packet received from the response message transmission unit 20 as well as the application unit 2 into a marked packet by converting the address of the received packet and marking the packet.

The migration address setting unit 26 stores the address obtained by the address obtainment unit 25 into the data hold unit 1. The address obtained by the unit 25 is the address of the mobile host assigned after the migration, and the unit 26 stores it into unit 1 by corresponding it to the address of the mobile host assigned before the migration.

The migration post transmission unit 27 posts via the communication control unit 4 that the address obtained by the unit 25 is held in the data hold unit 1 together with the correspondence between a couple addresses each of which assigned before and after the migration.

The reception packet unit 28 detects whether or not the received packet is marked, and sends the unmarked packet to the application unit 2 while sending the marked packet to the marketed packet resumption unit 29.

The marked packet resumption unit 29 resumes the marked packet.

The migration communication control device in FIG. 3 (hereinafter referred to as a gateway) further includes the application unit 2 and the communication control unit 4 besides the data hold unit 1 and the migration address unit 3 (enclosed with a broken line).

Each of the application unit 2 and the communication control unit 4 operates described the above, and the unit 2 together with the unit 4 operate as a conventional gateway.

The data hold unit 1 holds the correspondence between a couple of the addresses of the mobile host each of which assigned before and after migration.

The migration address unit 3 consists of a reception packet unit 35, a migration post information unit 36, an address comparison unit 37, an address conversion post transmission unit 38, and a marked packet conversion unit 39.

The reception packet unit 35 detects whether or not the received packet is the packet comprising a migration post message, which is transmitted by the mobile host. The unit 35 then sends the migration post message to the migration post information unit 36 while sending the other packets to the address comparison unit 37.

In accordance with the migration post message received from the reception packet unit 35, the migration post information unit 36 stores in the data hold unit 1 the correspondence between a couple of the addresses of the mobile host each of which assigned before and after the migration. The unit 36 also sends the migration post message to the address conversion post transmission unit 38.

The address comparison unit 37 detects whether or not the destination address of the packet received from the reception packet unit 35 coincides with the address of the mobile host assigned before migration, which is held in the data hold unit 1. When they coincide with each other, the unit 37 further sends to the marked packet conversion unit 39 the address assigned after the migration, which corresponds to the address which coincides with the destination address, as well as the packet received from the reception packet unit 35. On the other hand, when they do not coincided with each other, the unit 37 implements a function of a gateway by sending the packet to the application unit 2.

The address conversion post transmission unit 38 transmits to the destination address of the above packet received from the reception packet unit 35 an address conversion post message to inform that the address of the mobile host changes when the address comparison unit 37 detects a coincidence. Also the unit 38 transmits the address conversion post message to the network which satisfies the following two conditions: (1) the network where the address assigned before the migration, which is held in the data hold unit 1, is other than 0 (2) the migration communication control device employs as the gateway is not attached to the network. When the address conversion post message is transmitted to the network, which satisfies the above conditions, its destination address is a broadcast address of the network. The broadcast address consists of a network part and a host part, and every bit of the host part is 1.

The marked packet conversion unit 39 generates a marked packet when the address comparison unit 37 detects a coincidence. The unit 39 generates it by marking a general packet after converting the destination address of the packet. Then, the unit 39 transmits it.

The migration communication control device in FIG. 4 (hereinafter referred to as a stationary host) further includes the application unit 2 and the communication control unit 4 besides the data hold unit 1 and the migration address unit 3 (enclosed with a broken line).

Each of the application unit 2 and the communication control unit 4 operates as described the above, and the unit 2 together with the unit 4 operate as a conventional stationary host (not migrate).

The data hold unit 1 holds the correspondence between a couple of the addresses of the mobile host each of which assigned before and after the migration.

The migration address unit 3 consists of a reception packet unit 45, a marked packet resumption unit 46, an address conversion post information unit 47, an address comparison unit 48, and a marked packet conversion unit 49.

The reception packet unit 45 detects whether the received packet is the packet comprising the address conversion post message, the marked packet, or the other packets. The address conversion post message is transmitted by the gateway. Then the unit 45 sends the address conversion post message to the address conversion post information unit 47, the marked packet to the marked packet resumption unit 46, and the other packets to the application unit 2.

The marked packet resumption unit 46 resumes the unmarked packet from the marked packet, which is received from the reception packet unit 45.

The address conversion post information unit 47 obtains from the packet comprising the address conversions post message, which is received from the reception packet unit 45, the correspondence between the address of the mobile host assigned before the migration and the one assigned after the migration, and stores it into the data hold unit 1.

The address comparison unit 48 detects whether or not destination address of the packet received from the application unit 2 coincides with the address of the mobile host assigned before migration, which is held in the data hold unit 1. When they coincide with each other, the unit 48 further sends to the marked packet conversion unit 49 the address assigned after the migration, which corresponds to the address which coincides with the destination address, as well as the packet received from the application unit 2. On the other hand, when they do not coincided with each other, the unit 48 sends the packet to the communication control unit 4.

The marked packet conversion unit 49 generates a marked packet when the address comparison unit 37 detects a coincidence. The unit 49 generates it by marking a general packet after converting the destination address of the packet. Then, the unit 49 transmits it.

The migration communication control device in FIG. 5, which is attached to the network by itself, consists of the data hold unit 1, the migration address unit 3 (enclosed with a broken line), and the communication control unit 4.

The data hold unit 1 holds the correspondence between couple of the addresses of the mobile host each of which assigned before and after the migration.

The migration address unit 3 consists of the reception packet unit 35, the migration post information unit 36, the address comparison unit 37, the address conversion post transmission unit 38, and the marked packet conversion unit 39. The units integrating the migration address unit 3 operate substantially same as equivalent units integrating the gateway in FIG. 3 except the following.

In FIG. 3 the address conversion post transmission unit 38 transmits the address conversion post message to the network satisfying both of the two conditions, which are described in the above; whereas, the address conversion post transmission unit 38 in FIG. 5 transmits the address conversion post message to the broadcast address of the network as long as the network satisfies the first condition, that is it transmits the address conversion post message to the network when the address assigned before the migration, which is held in the data hold unit 1, is other than 0.

Figure 6:
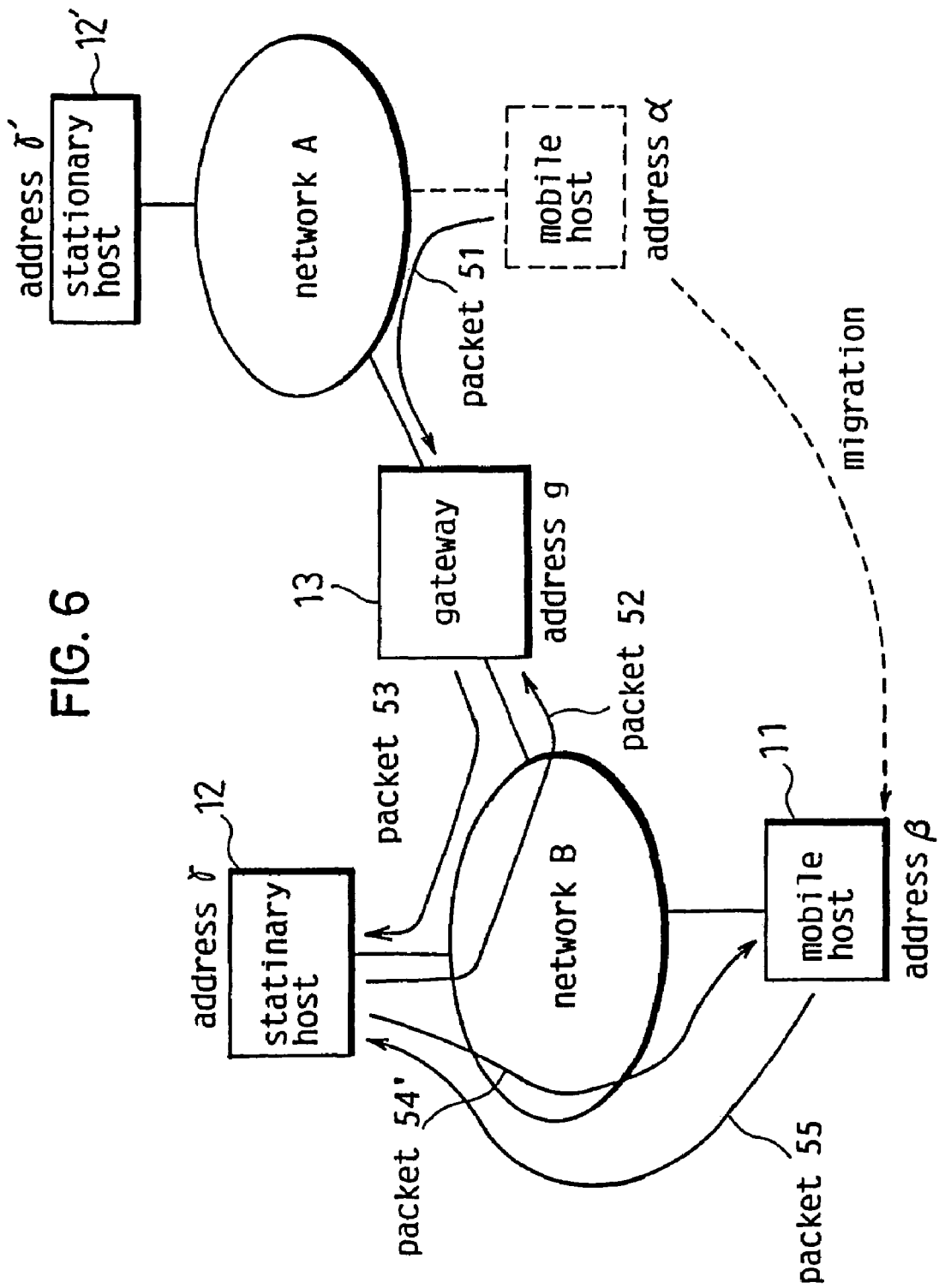
FIG. 6 is an illustration showing a first example of a network to which the migration communication control devices in FIGS. 2, 3, 4 are attached.

FIG. 6 shows a first example of a network to which the migration communication control device as the mobile host in FIG. 2, the migration communication control device as the gateway in FIG. 3, and migration communication control device as the stationary host in FIG. 4 are attached. In the figure numeral 11 denotes a mobile host in FIG. 2, which migrates from a network A to a network B and obtains an address α assigned on the network A as well as an address β assigned on the network B.

Numeral 12 denotes a stationary host in FIG. 3, which is attached to the network B and obtains an address γ assigned thereon.

Numeral 12' denotes a stationary host in FIG. 3, which is attached to the network A and obtains an address γ' assigned thereon.

Numeral 13 denotes a gateway in FIG. 3, which has an address g. The gateway 13 is attached to both the network A and the network B.

The address on each network is assigned by a system administrator.

Figure 7A:
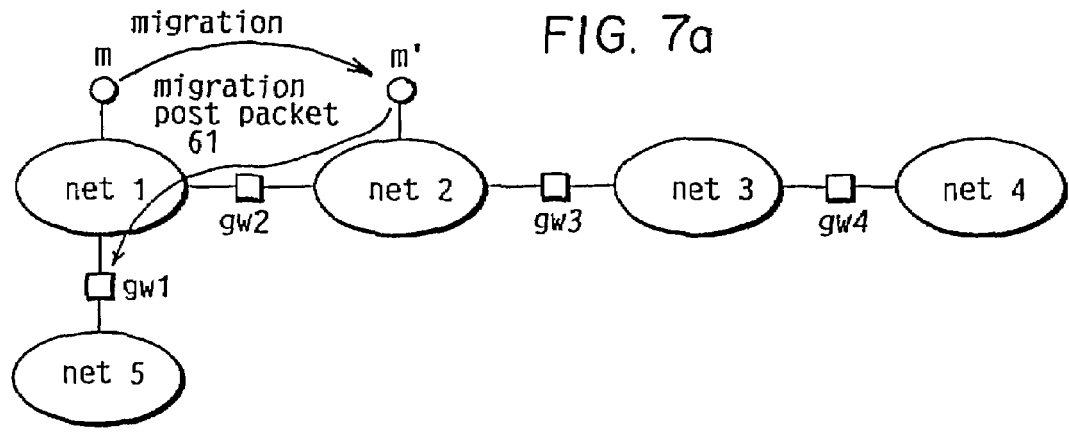
FIGS. 7a, 7b, and 7c are illustrations showing a second example of the network to which the migration communication control devices in FIGS. 2, 3, 4 are attached.
Figure 7B:
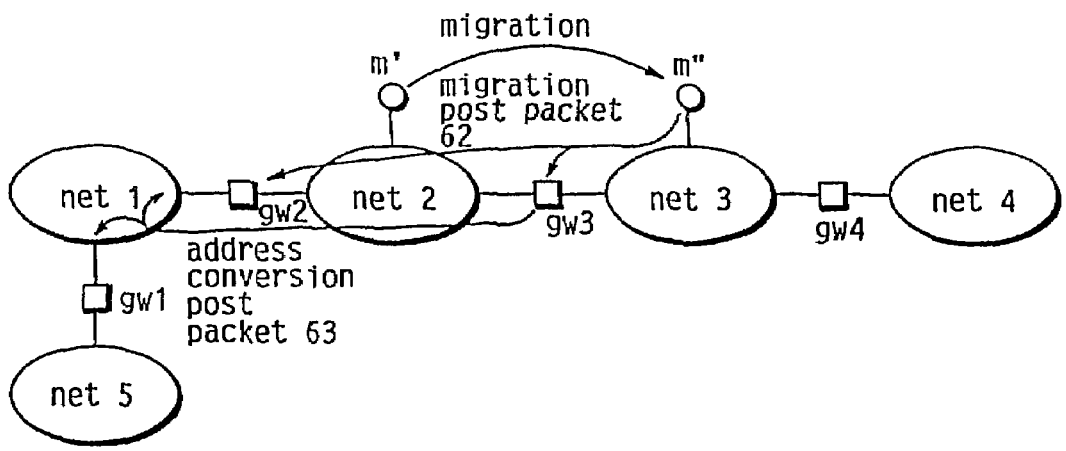
Figure 7C:
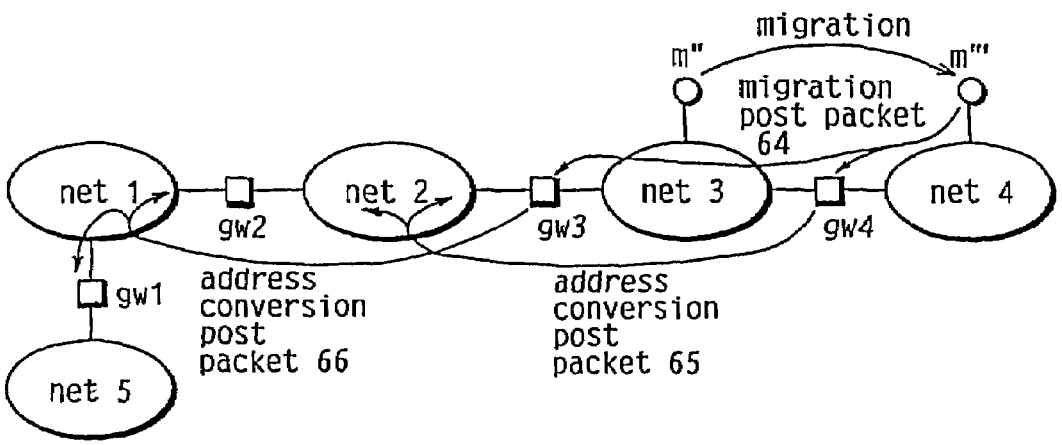

FIGS. 7a-7C show a second example of a network to which the mobile host in FIG. 2, the gateway in FIG. 3, and the stationary host in FIG. 4 are attached. The stationary host is not illustrated in FIGS. 7a-7c since its location does not affect the communication with the mobile host.

In the figure the mobile host 11 migrates across network 1-4, and obtains an address m, m', m", m'" assigned on each network respectively.

The network 5 as well as each of the network 1-4 (hereinafter referred to as the net 5, and the net 1-4 respectively) are connected with each other by a gateway 14, as shown in the figure.

A gateway 1-4 (hereinafter referred to as gw 1-gw 4) is the migration communication control device employed as the gateway in FIG. 3.

Figure 8:
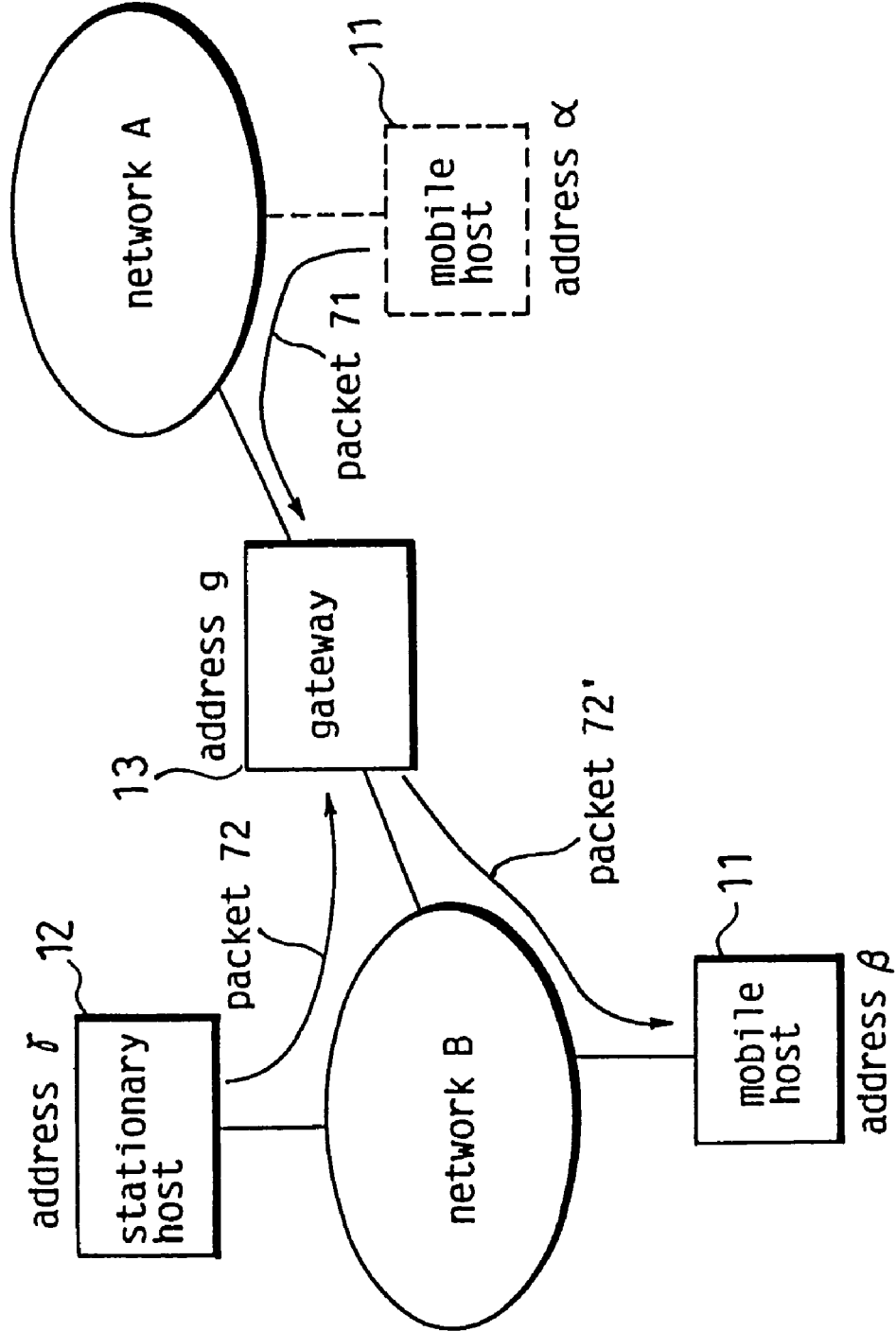
FIG. 8 is an illustration showing a third example of the network to which the migration communication control devices in FIGS. 2, 3, 4 are attached.

FIG. 8 shows a third example of the network to which the mobile host in FIG. 2, the gateway in FIG. 3, and the stationary host in FIG. 4 are attached. Construction of this network is substantially same as the second example of the network in FIG. 6 although operation thereof is different from the second example, which will be described later.

Figure 9A:
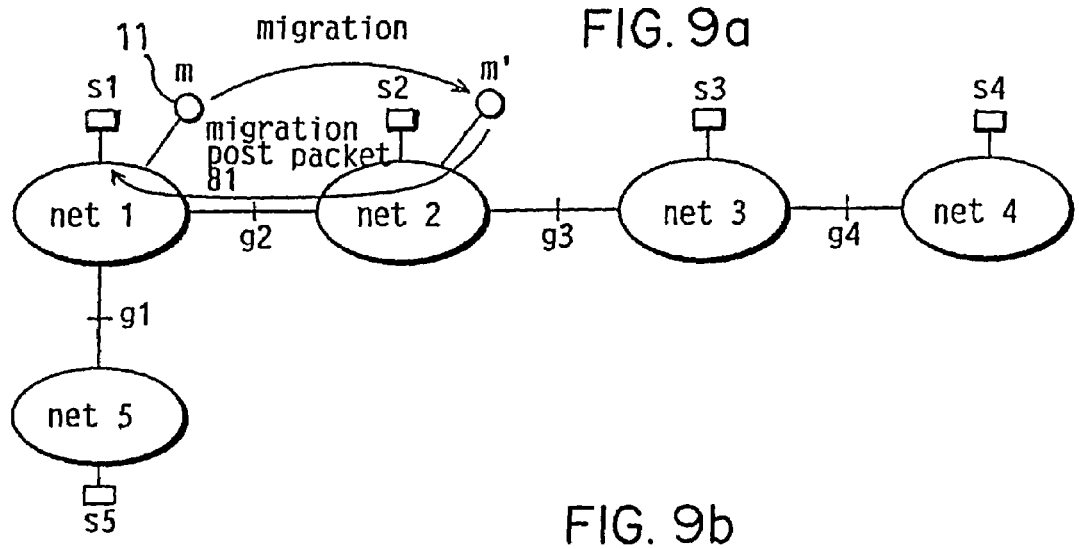
FIGS. 9a, 9b, and 9c are illustrations showing a fourth example of the network to which the migration communication control devices in FIGS. 2, 3, 4 are attached.
Figure 9B:
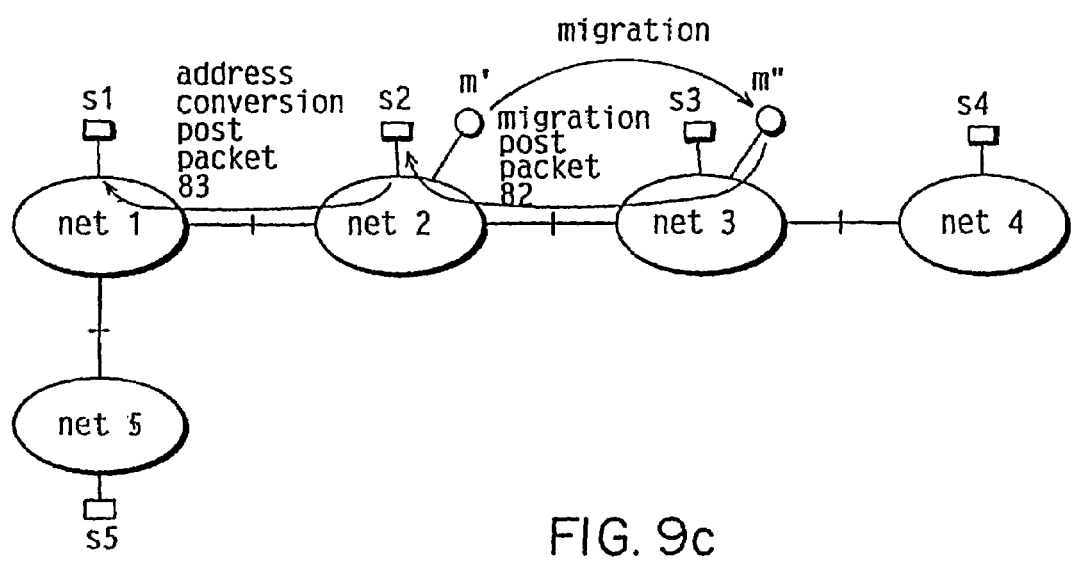
Figure 9C:
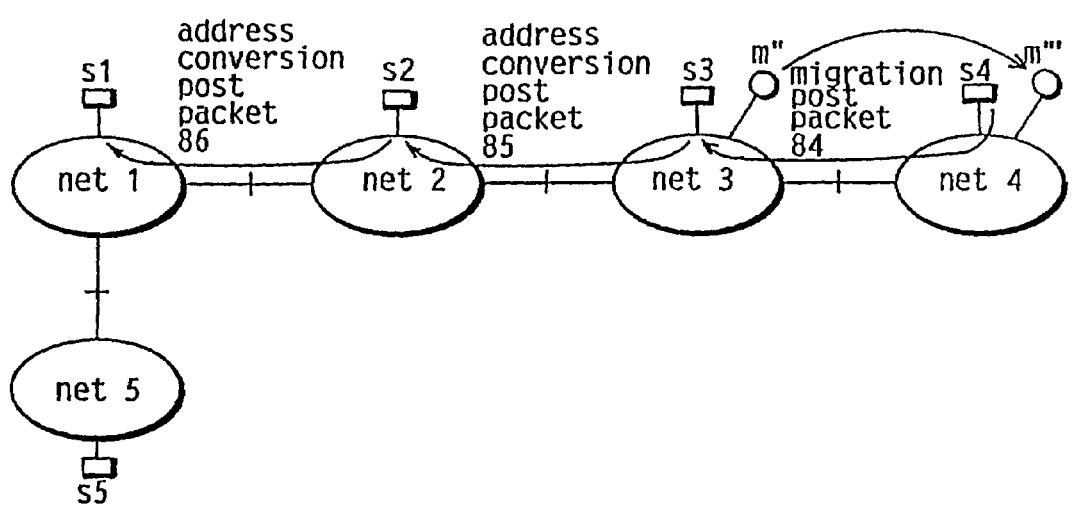

FIGS. 9a-9c show a fourth example of the network to which the mobile host in FIG. 2, the migration communication control device in FIG. 5, the stationary host in FIG. 4 are attached. The migration communication control device as the stationary host will not be described here.

In the figure, numeral 11 denotes the mobile host which migrates across the network 1-4 and obtains the address m, m', m", m'" assigned on each network respectively.

The network 5 as well as each of the network 1-4 (hereinafter referred to as the net 5, and the net 1-4 respectively) are connected with each other by a gw 1-4, as shown in the figure.

Each of the migration communication control unit 1-4 (hereinafter referred to as S1-S4) is relevant for the one in the FIG. 5.

An address used in the first embodiment of the present invention is described hereunder. Each address consists of a network part, which is assigned on each network and shared by every host attached to that network, as well as a host part, which is assigned to each host uniquely.

A broadcast address is a special kind of address, which can be divided into two types. The first one is the broadcast address used as the destination address in transmitting a packet from a network to another network, such as the broadcast address where every bit of the host part is 1. When the first type of the broadcast address is used as the destination address of the packet, the packet is transferred by the gateway to the network directed by the network part of the broadcast address. The other one is used in transmitting a packet within a network, such as the broadcast address where every bit of both the host part and the network part is 1. When the second type of the broadcast address is used as the destination address of the packet, the packet is transmitted to all the devices attached to the network, which includes the broadcast address. However, the gateway does not transfer the packet to any other network.

Operations of the migration communication control device in the first embodiment of the present invention are described hereunder with referring to drawings.

(Operation Example in FIG. 6)

In FIG. 6, when the mobile host migrates from the network A to the network B, the migration communication control device is operated as follows.

In a first operation, the mobile host and the gateway operate when the mobile host migrates across networks.

In a second operation, the stationary host transmits a packet to an address of the mobile host which was assigned before the migration.

In a third operation, the stationary host transmits the packet to an address of the mobile host which has been assigned after the migration.

In a fourth operation, the mobile host receives the packet which is transmitted by the stationary host.

In a fifth operation, the mobile host sends a response message to the stationary host.

(First Operation in FIG. 6)

In FIG. 6 the mobile host 11 attached to the network A (enclosed with a broken line) migrates to the network B to complete ongoing communication with the stationary host 12, which is attached to the network B. When migrating to the network B, the address obtainment unit 25 in the mobile host 11 (FIG. 2) obtains the address β assigned on the network B.

Immediately after obtaining the address β, the address obtainment unit 25 gives the address β to the migration address setting unit 26 and the migration post transmission unit 27. The migration address setting unit 26 stores the address β into the data hold unit 1 by corresponding it to the address α, which is the address assigned before the migration. FIG. 10 (a) shows the content of the data hold unit 1. The migration post transmission unit 27 gives to the gateway 13 via the communication control unit 4 a packet comprising migration post message and the correspondence between the address α and the address β, so that the gateway 13 will know that the mobile host 11 has migrated to the network B. The mobile host 11 can transmit the packet both before and after the migration. In FIG. 6 a packet 51 is transmitted before the migration, and its format is shown in FIG. 11(a). As shown in FIG. 11(a), the packet 51 consists of a destination address 91, a source address 92, and data 93. The data 93 further comprise a message type 98, an address before migration 94, and an address after migration 95.

Receiving from the communication control unit 4 the packet 51, the gateway 13 sends it to the reception packet unit 35, the unit 4 and the unit 35 being in FIG. 3. From the message type 98 in FIG. 11(a), the gateway 13 identifies the packet 51 with the migration post message, and gives the packet 51 to the migration post information unit 36. The migration post information unit 36 obtains from the data 93 in the data packet 51 the address before migration α and the address after the migration β; then stores them into the data hold unit 1 by corresponding them with each other. The content of the data in the data hold unit 1 is shown in FIG. 10(b).

Additionally, the destination address 91 of the packet in FIG. 11(a), can be the broadcast address of the network A, where the network part names the network A and every bit of the host part is 1. When the broadcast address is employed, every stationary host attached to the network A, including the gateway 13, receives the correspondence of the addresses each of which assigned before and after the migration. In this case communication control unit 4 in the stationary host 12' receives the data packet 51, and gives it to the reception packet unit 45, the unit 4 and the unit 45 in FIG. 4. From the message type 98 in FIG. 11(a), the reception packet unit 45 identifies the packet 51 with the migration post message, and gives the packet 51 to the address conversion post information unit 47. The unit 47 obtains from the data 93 in the data packet 51 the address before migration α and the address after the migration β and stores them into the data hold unit 1 by corresponding them with each other. Once those addresses are stored in the data hold unit 1, the stationary host 12' can transmit a packet to the address assigned after the migration instead of transmitting it to the address before the migration, the same to other stationary hosts attached to the network A.

(Second Operation in FIG. 6)

In the second operation, the stationary host 12 transmits a packet to the address assigned before the migration after the mobile host 11 migrates to the network B and obtains the address β assigned on the network B. It is supposed that the mobile host 11 transmits the packet 51, which comprises the migration post message, to the gateway 13 rather than to the broadcast address of the network A.

The stationary host 12, which is not notified that the mobile host 11 has migrated to the network B, transmits the packet to the address α of the mobile host, which was assigned before the migration. A packet 52 in FIG. 6 is transmitted by the stationary host 12 to the address α of the mobile host 11, and its format is shown in FIG. 11(f). The packet 52 is received by the gateway 13. Because the gateway 13 is located between the source address of the packet 52 and the address of the mobile host α assigned before the migration, and also it is attached to the network A, to which the mobile host 11 was attached before the migration.

The gateway 13 employs its devices in FIG. 3 to implement its functions including reception of the packet. That is, the communication control unit 4 in the gateway 13 receives the packet 52, and sends it to the reception packet unit 35 in the migration address unit 3. The reception packet unit 35 identifies the packet 52 with a general packet and gives it to the address comparison unit 37. The unit 37 compares the destination address α of the packet 52 with the address before the migration, which is held in the data hold unit 1; then detects whether or not they are coincide with each other. When the destination address of the received packet does not coincide with the address assigned before the migration, the address comparison unit 37 sends the packet to the application unit 2. On the other hand, when they coincide with each other, the address comparison unit 37 obtains from the data hold unit 1 the address β of the mobile host assigned after the migration, which corresponds to the address α; then sends it both to the address conversion post transmission unit 38 and the marked packet conversion unit 39.

As is described the above, the packet 52 is transmitted to the address α of the mobile host 11 by the stationary host 12. Therefore, the address conversion post transmission unit 38 notifies the stationary host 12 that the address of the mobile host 11 has changed by transmitting thereto the packet 53. FIG. 11(b) shows the packet 53. Simultaneously, the marked packet conversion unit 39 converts the packet 52 into the packet 53 by rewriting the destination address of the packet 52 to the address β assigned after the migration, returning thereto the previous destination address of the packet 52 as additional information, and marking to show that its destination address has changed; then sends the packet to the communication control unit 4. Thereby, the packet 52, which is converted into the marked packet 52' is transferred from the address α of the mobile host 11 assigned before the migration to the address β assigned after the migration. FIG. 12(e) shows the packet 52'.

Receiving the packet 53 from the communication control unit 4 in the stationary host 12, it sends its packet 53 to the reception packet unit 45, the unit 4 and the unit 45 being in FIG. 4. From the message type 98 in FIG. 11(b), the reception packet unit 45 identifies the packet 53 with the address conversion post message, and gives the packet 53 to the address conversion post information unit 47. The address conversion post information unit 47 obtains from the data 93 in the data packet 53 the address before migration α and the address after the migration β; then stores them into the data hold unit 1 by corresponding them with each other. Thereby, the stationary host 12 obtains the address of the mobile host 11 assigned after the migration, so that a direct communication between the stationary host 12 and the mobile host 11 is implemented.

In the second operation the migration communication control device comprising the units in FIG. 4 is employed as the stationary host 12. However, a conventional stationary host, which is not constructed as the migration communication control device can also be communication partner of the mobile host if it is attached to a network. Therefore, hereunder a communication between the mobile host 11 and the convention stationary host is described.

When the conventional stationary host transmits—a packet to the address of the mobile host 11 assigned before the migration after the mobile host 11 has migrated to another network, the gateway 13 transfers the packet to the address of the mobile host 11 assigned after the migration as well as sends to the stationary host the packet 53 comprising the address conversion post message in FIG. 11(c). This operation is same as the above.

However, when receiving the packet, 53, the stationary host disposes it since it does not support the address conversion post message and judges the packet 53 is not a required packet. Thus, the conventional stationary host cannot utilize the packet 53 to detect the address of the mobile host assigned after the migration nor hold the correspondence of the addresses each assigned before and after the migration.

Therefore, the stationary host gives the packet only to the address of the mobile host 11 assigned before the migration. Then, the gateway transfers the packet to the address of the mobile host 11 assigned after the migration, and the mobile host 11 receives the packet. The message from the mobile host 11, such as the response message, is transmitted to the stationary host directly, so that it is received by the stationary host without fail.

Thus, the conventional stationary host transmits a packet to the mobile host indirectly and receives a packet from the mobile host directly. Continuous communication unaffected by the mobile host's migration can be implemented, even when the conventional stationary host is employed.

(Third Operation in FIG. 6)

In the third operation, the stationary host 12 transmits the packet to the address β of the mobile host 11 assigned after the migration with referring to the correspondence of the addresses each assigned before and after the migration, which is held in the data hold unit 1. The third operation is described hereunder with referring to FIG. 4.

The stationary host 12 employs its devices in FIG. 4 to implement conversion of the destination address and the transmission of the packet, both of which integrate the third operation. That is, application unit 2 sends to the address comparison unit 48 the packet 54, whose destination address is the address α of the mobile host 11 assigned before the migration. FIG. 11(f) shows a format of the packet 54. Then, the comparison unit 48 obtains the destination address of the packet 54 and detects whether or not it coincides with the address before the migration, which is held in the data hold unit 1.

The comparison unit 48 sends the packet 54 to the communication control unit 4 when the above addresses do not coincide with each other while it sends the packet 54 to the marked packet conversion unit 49 when the above addresses coincide with each other. In the third operation the coincidence is detected since the corresponded between the address a and the address β is stored in the data hold unit 1. Therefore, the packet 54 is sent to the marked packet conversion unit 49. Then the marked packet conversion unit 49 obtains from the data hold unit 1 the address β of the mobile host assigned after the migration, which corresponds to the address a as well as converts the packet 54 into the packet 54' by converting the destination address α into the address β returning thereto the original destination address α as additional information, and marking the packet 54 to show that its destination address has changed; then sends the packet 54' to the communication control unit 4. FIG. 11(c) shows a format of the packet 54'. Since the destination address of the packet 54' is an updated address of the mobile host 11, the packet 54' is given to the mobile host 11 without fail.

(Fourth Operation in FIG. 6)

In the fourth operation, the mobile host 11 receives the marked packet 54' and obtains the original unmarked packet 54 by resuming the packet 54'. This operation is described hereunder with referring to FIG. 2.

The mobile host 11 employs its devices in FIG. 2 to implement its operation. That is, the communication control unit 4 receives the packet 54' and sends it to the reception packet unit 28. The reception packet unit 28 detects that the received packet 54' is marked, and sends it to the marked packet resumption unit 29. The unit 29 obtains the original destination address α, which is held in the additional information 97, and replaces the current destination β address of the packet 54' with the address α. Then it sends the packet 54' to the application unit 2. Thus, the mobile host 11 can receive the packet destined for its outdated address.

(Fifth Operation in FIG. 6)

In the fifth operation, the mobile host 11 sends to the stationary host 12 a packet comprising a response message (hereinafter referred to as a response packet) or a packet excluding the response message (hereinafter referred to as a non-response packet). A type of the received packet determines whether or not it is responded with the response packet.

When the packet 54 is responded with a response packet, the mobile host 11 employs its devices in FIG. 2 to send the response packet. That is, the response message transmission unit 20 builds the response packet, and sends it to the marked packet conversion unit 21 together with the destination address a of the packet 54'.

The mobile host 12 also employs its devices to send the non-response packet 55. That is, the application unit 2 gives the address α assigned before the migration and the non-response packet to the marked packet conversion unit 21. The unit 21 sends the received packet to the stationary host 12 via the communication control unit 4 without marking it. FIG. 11(e) shows the packet sent by the unit 21 to the stationary host 12.

The communication control unit 4 in the stationary host 4 receives the packet 55, and gives it to the reception packet unit 45. The unit 45 detects that the packet 55 is the non-response packet, so that it gives the packet 55 to the application unit 2. Thus, the stationary host and the mobile host implement a continuous communication unaffected by mobile host's migration. Although the migration communication control device is employed as the stationary host 12 in this embodiment, the conventional host can also be employed to transmit the non-response packet.

In the above, the unmarked response packet and the unmarked non-response packet are sent to the mobile stationary host 12. On the other hand, hereunder the operation of the mobile host 11 at conversion of the response packet and the non-response packet into the marked ones is described. This will be employed effectively in a communication between mobile hosts.

Receiving the unmarked packet from the application unit 2, the marked packet conversion unit 21 generates a packet 55' where the destination address and the source address are the address γ of the stationary host 12 and the address β assigned after the migration respectively. Also in generating the packet 55', the application unit 2 gives to the received packet the address α assigned before the migration as additional information as well as marks the received packet to indicate that the destination address has converted. FIG. 11 (d) shows a format of the packet 55'. Then the application unit 2 sends the packet 55' to the stationary host 12 via the communication control unit 4.

The communication control unit 4 in the stationary host 12 receives the packet 55', and sends it to the reception packet unit 45. Detecting the packet 55' is the marked packet, the reception packet unit 45 sends it to the marked packet resumption unit 46. The unit 46 resumes the packet 55' into the packet 55 by unmarking it and replacing the source address thereof with the address α assigned before the migration, which is held as the additional information. A format of the packet 55 is shown in FIG. 11(e). Thus, the stationary host and the mobile host implement a continuous communication unaffected by mobile host's migration.

(Operation Example in FIGS. 7a-7c)

In FIGS. 7a-7c, when the mobile host migrates across the network 1, 2, 3, and 4, and obtains a temporary address assigned on each network, the newest address of the mobile host is transmitted to the stationary host, which operates as communication partner.

(Migration from Network 1 to Network 2)

The address of the mobile host is m when it is attached to the network 1. When migrating from the network 1 to the network 2, the mobile host 11 replaces its address with m' assigned on the network 2. Then the mobile host 11 notifies the migration communication control device attached to the network 1 that it has migrated to the network 2 by sending thereto a packet comprising a migration post message. In FIGS. 7a-7c, the migration communication control device gw 1, gw 2 attached to the network 1 receive the migration post packet 61, and store it into its own data hold unit 1. The operation in FIGS. 7a-7c is substantially same as the operation in FIG. 6 except that in FIGS. 7a-7c the packet 61 holds the address of the mobile host assigned before the last migration besides the correspondence of the addresses each assigned before and after the current migration. The address assigned before the last migration makes the gws prepare for further migration of the mobile host, which will be described later. A format of the packet 61 is shown in FIG. 12a. Since the migration from the network 1 to the network 2 is the first migration in FIGS. 7a-7c, the packet 61 holds 0 at the address assigned before the last migration.

The gw 1 and the gw 2 store in the data hold unit 1 the correspondence of the addresses each assigned before and after the migration, as well as the address assigned before the last migration. As shown in FIG. 13(a), m-m' and 0 are stored in the data hold unit 1 of each of the gw 1 and the gw 2.

Then, the gw 1 and the gw 2 detects from 0 at the address assigned before the last migration that no migration had been conducted before the current migration.

The broadcast address of the network 1 can be employed as the destination address of the migration post packet 61. If the packet is destined for the broadcast address, every host attached to the network 1, which includes the gw 1 and the gw 2, will hold the correspondence of the addresses each of which assigned before and after the migration as well as the address assigned before the last migration. Thereby, the hosts attached to the network 1 can communicated with the mobile host directly.

(Migration from Network 2 to Network 3)

When migrating from the network 2 to the network 3, the mobile host 11 obtains m" at the address assigned after the migration. Then the mobile host 11 notifies the gw 2 and a gw 3, both of which are attached to the network 2, that the mobile host 11 has migrated to the network 3 by transmitting thereto a packet comprising the migration post message, referred to as a packet 62 in FIG. 7b. FIG. 12b shows a format of the packet 62, which is transmitted to the gw 2. The broadcast address of the network 2 can be employed as the destination address of the packet 62. When the packet 62 is transmitted to the broadcast address of the network 2, every host attached to the network 2, which includes the gw 2 and the gw 3, holds the correspondence of the addresses each assigned before and after the migration.

The gw 2 employs its devices in FIG. 3 to process the packet 62. That is, receiving the packet 62, the gw 2 sends it to the migration post information unit 36 via the communication control unit 4 and the reception packet unit 35, then refers to the data hold unit 1 where m→m' and 0 are still held at the address correspondence and at the address assigned before the last migration respectively. The migration post information post unit 36 obtains from the packet 62 m'-m" as the newly assigned correspondence between the addresses each of which assigned before and after the current migration, the migration from the network 2 to the network 3. Then, it detects whether or not the address m' coincides with the address held in the data hold unit 1 as the address assigned after the last migration. Since the unit 36 detects the coincidence, it replaces the address in' in the unit 1 with the address m' as well as replaces the correspondence m-m' with the correspondence m-m".

Also the migration post information unit 36 sends to the data hold unit 1 the address m assigned before the last migration together with the address correspondence m'-m" obtained from the current migration. Now the data hold unit 1 in the gw 2 holds the address m at the address assigned before the last migration and the address correspondence m'-m" at the correspondence of the addresses each of which assigned before and after the migration as well as the address 0 at the address assigned before the last migration as well as the address correspondence m-m' at the correspondence of the addresses each of which assigned before and after the migration. After updating as well as adding the addresses in the data hold unit 1, the migration post information unit 36 sends to the address conversions post transmission unit 38 m'-m" I as the newly obtained correspondence of the addresses before and after the current migration.

The address conversion post transmission unit 38 detects the network satisfying the following conditions with referring to the data hold unit 1 and then transmits the address conversion post message to the broadcast address of the detected network. That is, the address conversion post message is transmitted to the network where the address assigned before the migration, which is held in the data hold unit 1, is other than 0 as well as the migration communication control device employed as the gateway is not attached. Although in the migration from the network 2 to the network 3, the data hold unit 1 holds m at the address assigned before the last migration, the gw 2 is attached to the network 1; therefore, the unit 38 does not transmit the address conversion post to the network 1.

The packet 62 is also received by gw 3. When receiving the packet 62, the gw 3 employs its own devices in FIG. 3 to process the packet 62, which is substantially same as does the gw 2 except the following. That is, the address conversion post transmission unit 38 of the gw 3 detects that the gw 3 is not attached to the network 1. Also it is detected that the mobile host 11, attached to the network 1, has the address m as the address assigned before the last migration. Therefore, the unit 38 of the gw 3 transmits to the broadcast address of the network 1 a packet comprising the address conversion post message, which is referred to as a packet 63. FIG. 12(c) shows the packet 63.

The packet 63 is received by the gw 2, the gw 1, both of which are attached to the network 1. Although it is also received by the stationary host 11, this will not be described here. Obtaining the current address correspondence m'-m" from the packet 63, where m' coincides with the address which has been held in the hold unit 1 at the address obtained after the migration, the gw 1 changes the m-m' in the data hold unit 1 into the m-m" I by replacing m' with m" as the address assigned after migration.

On the other hand, the data hold unit 1 of the gw 2 had gained from the packet 62 the above information before receiving the packet 63. Therefore the content of the unit 1 of the gw 2 does not change across reception of the packet 63. This is because the gws of the present invention locate on a gateway, which connects a couple of networks. Due to its location, each gw receives packets from two networks. However, actually the packet 62 is destined for the network 2 and the packet 63 is destined for the network 1. Therefore, even though the gw 2, which are attached to both the network 1 and the network 2, receives both the packet 62 and 63 by the gw 2, this will not cause any problem in the communication between the stationary host 12 and the mobile host 11.

FIG. 13(b) shows the content of the data hold unit 1 in each of the gws.

(Migration from Network 3 to Network 4)

When migrating from the network 3 to the network 4, the mobile host 11 obtains m'" as the address assigned after the migration. Then the mobile host 11 sends to the gw 3 and a gw 4, both of which are attached to the network 3, a packet comprising the migration post message. The packet received by the gw 3 is referred to as a packet 64. The broadcast address of the network 3 can be employed as the destination address of the packet 64. When the packet 64 is destined for the broadcast address of the network 3, every host attached to the network 2, which includes the gw 3 and the gw 4, obtains from the packet the correspondence of the addresses each of which assigned before and after the migration from the network 3 to the network 4.

The gw 3 employs its devices in FIG. 3 to process the packet 64. That is, receiving the packet 64, the gw 3 converts the content of the data hold unit 1 by replacing the address correspondence m-m" with m-m'", newly holding m'-m'" obtained from the packet 64 as well as the address m' assigned before the last migration. Then, the address conversion post transmission unit 38 of the gw 3 transmits the address conversion post message to the network satisfying the following condition. That is, the address conversion post message is transmitted to the network where the address assigned before the migration, which is held in the data hold unit 1, is other than 0 as well as the gw 3 it self is not attached. The packet including the address conversion post message is referred to a packet 65, and the packet is transmitted to the broadcast address of the network 1. FIG. 7(c) shows the packet 65.

The packet 64 is also received by gw 4. When receiving the packet 64, the gw 4 renews the content of the data hold unit 1 by replacing m'-m" with m'-m'" as well as newly holding the address m' as the address assigned before the last migration. Further, the address conversion post transmission unit 38 of the gw 4 detects that the gw 4 is not attached to the network 2 which has the address other then 0 at the address assigned before the last migration; therefore, the unit 38 of the gw 4 transmits a packet comprising the address conversion post message, which is referred to as a packet 66, to the broadcast address of the network 2. FIG. 7(*c*) shows the packet 66.

Receiving the packet 65, 65, the gw 2 and the gw 1 renew the content of its data hold unit 1, which is substantially the same as the above.

The gw 3 and the gw 2 receives the same information twice since the former receives the packet 64 and 65 while the latter receives the packet 65 and 66. This is because gws of the present invention locate on a gateway and receives packets from a couple of networks, which is described the above.

FIG. 13(*c*) shows the content of the data hold unit 1 in each of the gws. Thus, according to the gws of the present invention, the packet transmitted to any of the addresses m, m', m" is transferred by the gws to the updated address of the mobile host, the gws also notify the stationary host of the updated address.

For example, when the stationary host is not notified of the updated address of the mobile host and transmits a packet to the address m', the packet is received by the gw 2 and the gw 3, both of which are attached to the network 2. Then, the gw 2 and the gw 3 transfers the packet to the updated address of the mobile host as well as notifies the stationary host of the updated address. Thereby, the stationary host obtains the updated address of the mobile host, so that it will be able to communicate with the mobile host directly. The packet destined for the address m' is received by both the gw 2 and the gw 3, since they are attached to the network 2. Thus, the mobile host receives the same packet twice, once from the gw 2 and the other time from the gw 3, and the stationary host receives the same message twice; however, the repeated packet or the message can be simply ignored, so that this will not cause any problem in the communication between the stationary host and the mobile host. The repeated packet or the message is observed when the two gws are attached to each network in FIGS. 7*a*-7*c*; whereas it is not observed when only one migration communication control device is attached to each network, which will be described later at the operation in FIGS. 9*a*-9*c*.

(Operation Example in FIG. 8)

In FIG. 6, FIGS. 7*a*-7*c*, the stationary host transmits the data packet to the outdated address after the mobile host notifies the gws that it has migrated to another network. Then the gws transmit the address conversion post message to the stationary host. However, in FIG. 8 the gws convert the destination address of the data packet from the outdated address into the updated address assigned after the migration instead of transmitting the address conversion post message.

A packet 71, 72 in FIG. 8 are substantially same as the packet 51, 52 in FIG. 6. The operation conducted before the packet 72 is transmitted by the stationary host 12 and is received by the gateway 13 is substantially same as the first operation in FIG. 6. The operation which follows reception of the packet 72 is described hereunder with referring to FIG. 3.

The gate way 13 employs its units in FIG. 3 to process the packet 72. The communication control unit 4 receives the packet 72 and gives it to the reception packet unit 35 in the migration address unit 3. Detecting that the packet 72 is a general packet, the reception packet unit 35 sends it to the address comparison unit 37. The address comparison unit 37 detects whether or not the destination address of the packet 72 coincides with the address in the data hold unit 1 at the address assigned before the migration.

When no coincidence is found, the address comparison unit 37 gives the packet 72 to the application unit 2. On the other hand, a coincidence is found, the address assigned after the migration, which corresponds with the address identical to the destination address of the packet 72, is obtained from the data hold unit 1, and is sent to the marked packet conversion unit 39 together with the packet 72. The marked packet conversion unit 39 generates a packet 72' where the destination address of the packet 72 is replaced with the address assigned after the migration, which is sent by the address comparison unit 37, the destination address of the packet 72 is added as additional address, and a mark is set to indicate that the destination address has converted. Than the packet 72' is sent to the communication control unit 4. FIG. 12*e* shows a format of the packet 72', where identical numerals denote the same units in FIGS. 11*a*-11*f*. The packet 72' is sent to the mobile host 11 without fail since its destination address is the updated address thereof.

(Operation Example in FIGS. 9*a*-9*c*)

In FIGS. 9*a*-9*c*, the mobile host migrates across network 1, 2, 3, and 4. In FIGS. 7*a*-7*c* the gw 1-gw 4 are employed as the migration communication control devices; whereas in FIGS. 9*a*-9*c* the gw 1-gw 4 are employed simply as gateways to connect networks, and also another migration communication control device is attached to each network. The operation of the migration communication control device, which is connected to the network alone, at processing the migration post message or the address conversion post message is substantially same as one of the gw 1-gw 4 in FIGS. 7*a*-7*c*. The flow of the migration post message and the address migration post message are mainly described hereunder.

(Migration from Network 1 to Network 2)

When migrating from the network 1 to the network 2, the mobile host 11 sends a packet comprising the migration post message to the migration communication control device, which is attached to the network 1. In FIG. 9(*a*) a migration post packet 81 is transmitted to a migration communication control device S1, which is attached to the network 1. The destination address of the packet 81 can be the broadcast address of the network 1.

The device S1 processes the packet 81 by employing its devices in FIG. 3. Receiving the packet 81, the device S1 stores into the data hold unit 1 the correspondence of the addresses each assigned before and after the migration as well as the address assigned before the last migration. The migration post information unit 36 transmits the packet 81 to the address conversion post transmission unit 38; however, since the unit 38 detects that the address assigned before the last migration is 0, it does not transmit the address conversion post message to any network. The content of the data hold unit 1 in the S1-S4 are shown in FIG. 14(*a*).

(Migration from Network 2 to Network 3)

When migrating from the network 2 to the network 3, the mobile host 11 notifies the S2, which is attached to the network 2, that it has migrated to the network 3 by transmitting thereto the packet comprising the migration post message, which is referred to as a packet 82 in FIG. 9(*b*).

The S2 employs its devices in FIG. 3 to process the packet 82. That is, it converts the content of the data hold unit 1 by renewing and adding new information, and finally holds in the unit 1 the address m'-m" at the correspondence of the addresses each of which assigned before and after the migration as well as the address m assigned before the last migration. Then, the migration post information unit 36 gives the newly obtained correspondence m'-m" to the address conversion post transmission unit 38.

The address conversion post transmission unit 38 detects whether or not the address assigned before the last migration, which is held in the data hold unit 1, is 0. If the address is not 0, the unit 38 transmits the address conversion post message to the broadcast address of the network which includes the detected address. In FIG. 9(b) the address m is held at the address assigned before the last migration, so that the unit 38 transmits the packet 83 to the broadcast address of the network 1.

When receiving the packet 83, the migration communication control device S1, which is attached to the network 1, renews the content of the data hold unit 1 by newly holding the address correspondence m-m" as well as the address 0 at the address assigned before the last migration. Detecting 0 at the address assigned before the last migration, the address conversion post transmission unit 38 does not transmit the address conversion post to any network. The content of the data hold unit 1 in the S1-S4 are shown in FIG. 14(b).

(Migration from Network 3 to Network 4)

When migrating from the network 3 to the network 4, the mobile host 11 notifies the communication migration control device S3, which is attached to the network 3, that it has migrated to the network 4 by transmitting thereto a packet comprising the migration post message, referred to as a packet 84 in FIG. 9(c).

The migration communication control device S3 employs its devices in FIG. 3 to process the packet 84. That is, it newly holds into the data hold unit 1 the address correspondence m"-m'" as well as the address m' assigned before the last migration. Then, the address conversion post transmission unit 38 in the S3 transmits a packet comprising the address conversion post message, referred to a packet 85 in FIG. 9(c), to the broadcast address of the network 2 since the address m' is held at the address assigned before the last migration in the data host unit 1.

When receiving the packet 85, the migration communication control device S2 employs its devices in FIG. 3 to process it. That is, it newly holds into the data hold unit 1 the address correspondence m'-m" as well as the address m assigned before the last migration. Then, the address conversion post transmission unit 38 in the S2 transmits a packet comprising the address conversion post; message, referred to a packet 86 in FIG. 9(c), to the broadcast address of the network 2 since the address m is held at the address assigned before the last migration in the data hold unit 1.

When receiving the packet 86, the migration communication control device S1 employs its devices in FIG. 3 to process it. That is, it newly holds into the data hold unit 1 the address correspondence m-m'" as well as the address 0 at the address assigned before the last migration. The address conversion post transmission unit 38 in the S1 does transmit the address conversion post since 0 is detected at the address assigned before the last migration. The content of the data hold unit 1 in each of the S1-S4 are shown in FIG. 14(c) Thus, according to the migration communication control device S1-S4 of the present invention, the S1-S4 are notified of the updated address of the mobile host at every migration, so that the packet transmitted to any of the addresses m, m', m" is transferred thereby to the updated address of the mobile host. The S1-S4 also notify the stationary host of the updated address of the mobile host.

The operation in FIGS. 9a-9c differs from the operation in FIGS. 7a-7c in that each network has just one communication migration control device (one of the S1-S4), so that the migration post and the address conversion transmitted to S1-S4 are not duplicated.

In the format shown in FIGS. 11a-11f and 12a-12e, the mark 96 or the message type 93 indicates kind of packet. That is, mark 96 indicates whether or not the packet is marked while the message type 93 indicates whether it is the packet comprising the migration post message, the packet comprising the address conversion post message, and the general packet. Further, a protocol type can also be employed to indicate which migration communication control device is employed. For example, when TCP/IP is employed, the protocol number at the IP header thereof distinguishes the packet employed in the embodiment from other packets. That is, when the protocol number in the packet is identical with the one, which has been assigned to the protocol number field, the packet is the one employed in the embodiment.

In the first embodiment of the present invention, a nonvolatile storage can be employed as the data hold unit 1 of the mobile host. If so, the communication can be resumed even after the host or the gateway is turned off as well as after the system is reset.

Also even when the stationary host employs the nonvolatile storage as the data hold unit 1, it can resume the communication, which has interrupted by the switch off or the system reset, rather fast since it obtains from another host the updated address of the mobile host instead of receiving from the gateway the address conversion post message which shows the updated address.

For example, it is supposed in FIGS. 7a-7c that the mobile host 11 migrates from the network 1 to the network 4. The data hold unit 1 of the migration communication device holds the address correspondence m-m'" since it has communicated with the mobile host, which is attached to the network 4, at least once. According to the migration communication control device in the embodiment described above, the packet is transferred from the outdated address to the updated address of the mobile host and the stationary host is notified of the updated address; therefore, even when the address information in the data hold unit is lost by switch off thereof, the stationary host will obtain the updated address. Restart of the communication can also be implemented by employing a specific host such as a server. That is, the server may be constructed to obtain the updated address of the mobile host at every migration, and give it to the stationary host whenever requested. In this case a packet comprising the address inquiry should be generated beforehand.

Also in the fifth operation in FIG. 6, the mobile host 11 employs the application unit 2 and sends to the marked packet conversion unit 21 the address assigned before the migration when transmitting the non-response address to the stationary host after it has migrated to another network. Instead of sending the non-response address, the application unit 2 can transmit a connection identifier to the marked packet conversion unit 21. In this case the data hold unit of the migration communication control device, employed as the mobile host, holds a correspondence between the connection identifier and the address that had been assigned when the connection was established instead of holding the correspondence between the correspondence of the addresses each assigned before and after the migration. Then, the unit 21 obtains the source address of the packet by detecting the address which corresponds to the identifier, which is held in the data hold unit 1.

As is described the above, the mobile host can employ the broadcast address of the network when transmitting the migration post to the migration communication control devices. When the broadcast address is employed, every host attached to the network, to which the migration communication control device is also attached, obtains the updated address of the mobile host. This implements a direct communication between the mobile host and the stationary host, which improves efficiency of the communication.

The address assigned before the last migration, which is held in the hold unit 1, can be replaced with the broadcast address assigned to the network to which the mobile host is attached before the last migration. If the broadcast address is employed, the gateway employed as the migration communication control device (gws) or the migration communication control device (Ss) needs to include the broadcast address in the address conversion post message. In this case both devices can obtain the broadcast address from the data hold unit; therefore, the operation thereof at requesting the broadcast address will be eliminated.

When storage capacity of the data hold unit 1 is limited, the data hold unit 1 holds only the useful data by disposing the unuseful data, which is least recently retrieved therefrom by the address comparison unit.

Embodiment 2

Figure 15:
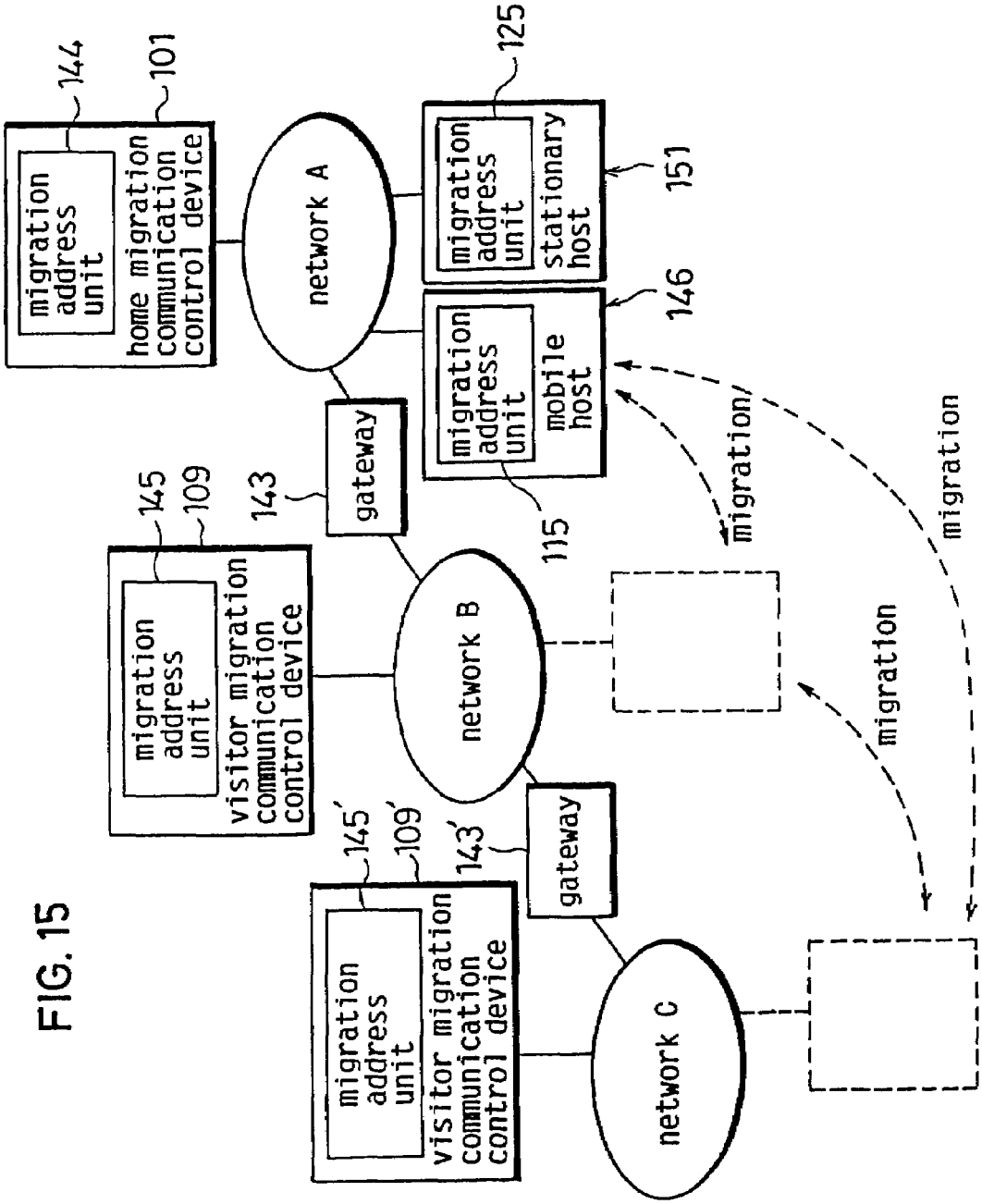
FIG. 15 is an illustration showing an example of a network to which the migration communication control device is attached in a second embodiment of the present invention.

In FIG. 15 network A, B, and C are connected in a line via gateways 143 and 143', the gateway 143 placing between the network A and B while the gateway 143' placing between the network B and C.

A home migration communication control device 101 including a migration address unit 144 is attached to the network A; a visitor migration communication control device 109 including a migration address unit 145 is attached to the network B; and a visitor migration communication control device 109' including a migration address unit 145' is attached to the network C. A mobile host 146 including a migration address unit 115 is attached to the network A as its home network, and a stationary host 151 including a migration address unit 125 is also attached to the network A.

The mobile host 146 migrates across the network A, B, and C. It has a home address a assigned when it is attached to the network A, as well as other addresses assigned depending on where it migrates, such as a temporary address β on the network B and a temporary address γ on the network C.

Also each of the home migration communication control device 101, the visitor migration communication control device 109, 109' which are identical in its construction and the stationary host 151 has an address Ha, Va, Va', and Sa respectively assigned on the network.

Detailed function of the above devices 101, 109, 109', 146, and 151 is described hereunder, in which like components are labeled with like reference numerals.

[Home Migration Communication Control Device 101]

When the mobile host 146 migrates from the home network to another network, it is assigned the temporary address. However if the stationary host 151 is not notified of that migration, it transmits an original data packet (hereinafter referred to as a noncapsulated data packet) to the home address α of the mobile host 146. When the noncapsulated data packet is destined for the outdated address of the home mobile host 146, the home migration communication control device 101 transfers that noncapsulated data packet from there to the updated address, that is the temporary address β or γ of the mobile host. Then, the device 101 posts to the stationary host 151 the temporary address β or γ here, so that the stationary host 151 will be able to communicate directly with the mobile host. The device 101 also posts the same information to the visitor migration communication control device 109, 109', so that the devices 109, 109' will implement the same function with the home migration communication control device 101.

Figure 16:
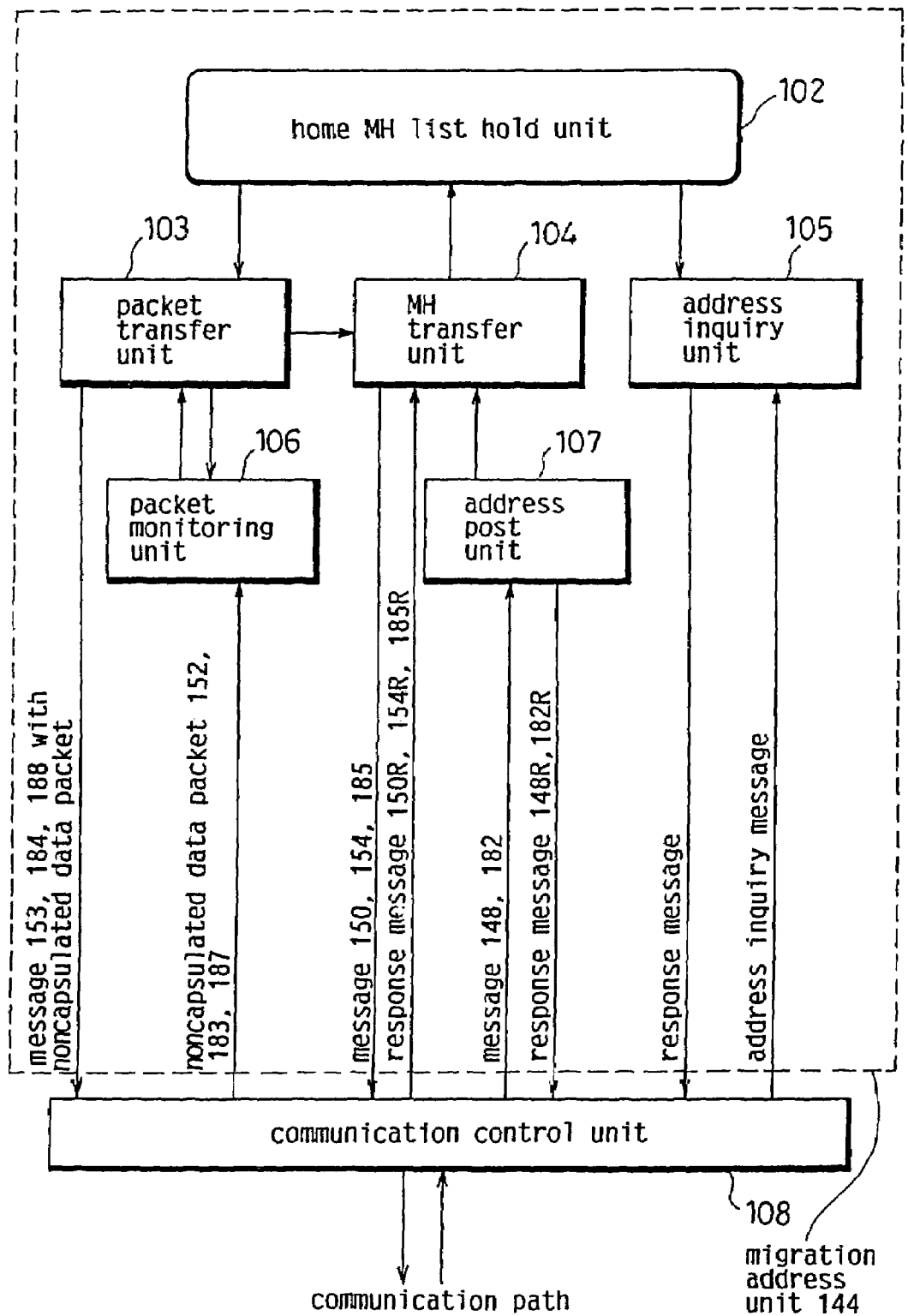
FIG. 16 is a detailed block diagram depicting a home migration communication control device in the second embodiment of the present invention.

As shown in FIG. 16 the home migration communication control device 101 consists of the migration address unit 144 and a communication control unit 108. The migration address unit 144 further comprises a home mobile host (MH) list hold unit 102, a packet transfer unit 103, a mobile host (MH) transfer unit 104, an address inquiry unit 105, a packet monitoring unit 106, an address post unit 107.

Next the function of each component integrating the device 101 will be described. The communication control unit 108 mainly controls the communication of protocols located in lower layers including a physical layer, such as the protocol lower than IP.

Figure 28A:
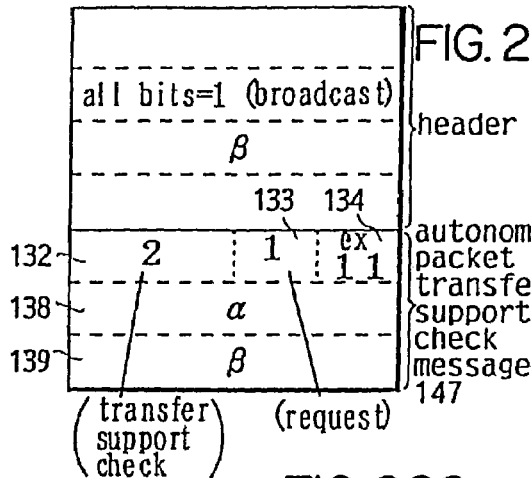
FIGS. 28a-28f are illustrations showing a construction of each data packet in FIG. 26.
Figure 28B:
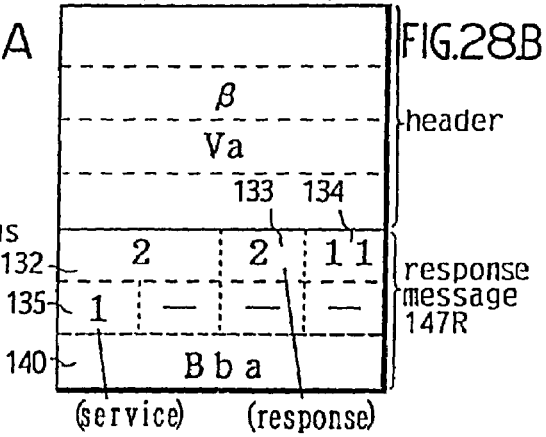
Figure 28C:
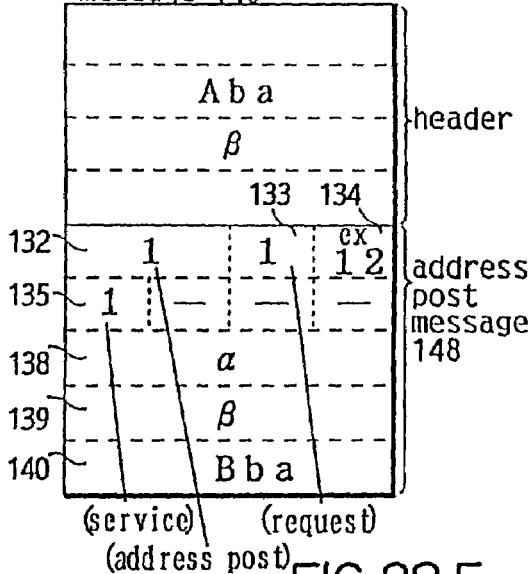
Figure 28D:
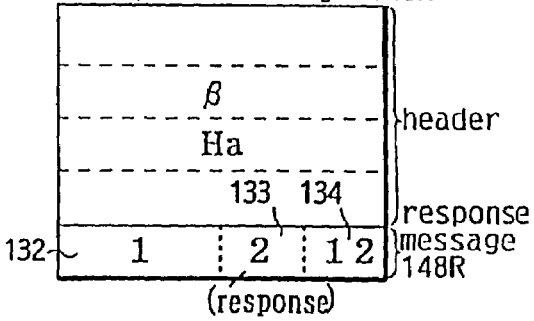

The address post unit 107 receives from the mobile host 146 on a data packet including an address post message. The address post message is generated when the mobile host 146 migrates to the network B or C, and posts the temporary address β or γ of the mobile host to the device 101. The unit 107 sends the address post message to the mobile host transfer unit 104 as well as sends a response message to the mobile host 146. FIG. 28c is an example of the address post message, which includes the home address α as well as the temporary address β or γ of the mobile host 146, a value of an autonomous flag F, and a broadcast address Bba, Cba on the network B, C. The autonomous flag F will be described later. FIG. 28D is an example of the response message.

A mobile host transfer unit 104 stores the address post message into the home mobile host list hold unit 102, notifies the visitor migration communication control device 109 or 109' of the migration of the mobile host 146 by sending thereto a mobile host transfer message, and receives the data packet including the response. Further, according to a direction given by the packet transfer unit 103, the unit 104 transmits the mobile host transfer message both to the stationary host 151 and the device 109 or 109'. The unit 103 gives the direction when the value of the autonomous flag F is 1.

Figure 32A:
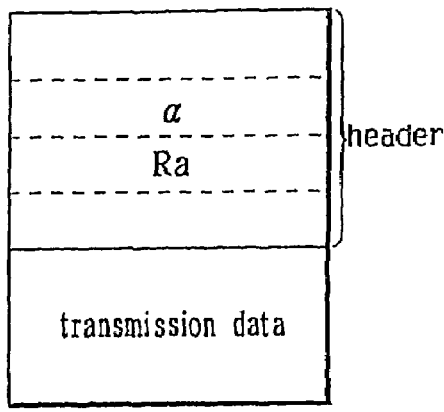
FIGS. 32a-32e are illustrations showing a construction of each data packet in FIG. 30.
Figure 32B:
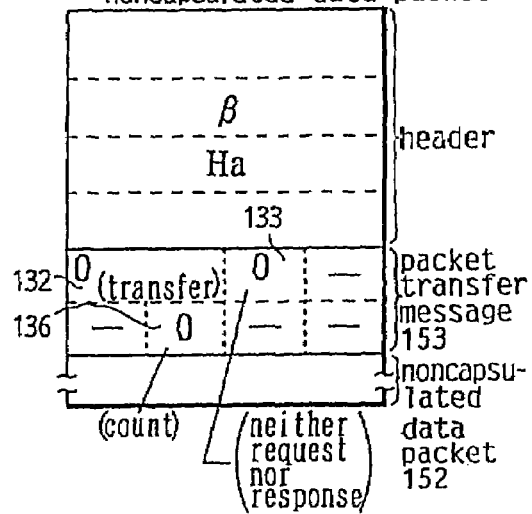
Figure 32C:
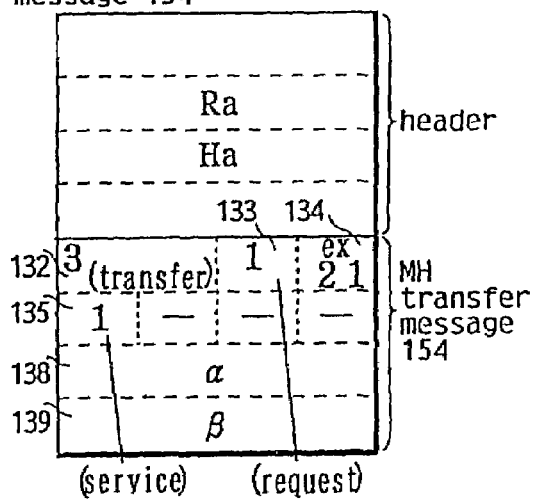
Figure 32D:
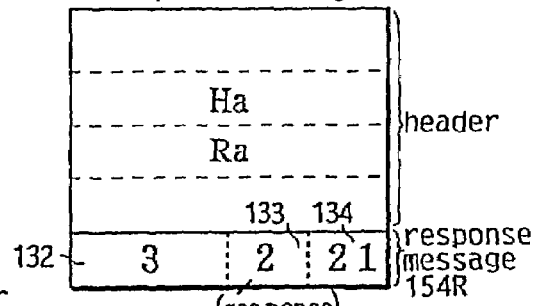
Figure 32E:
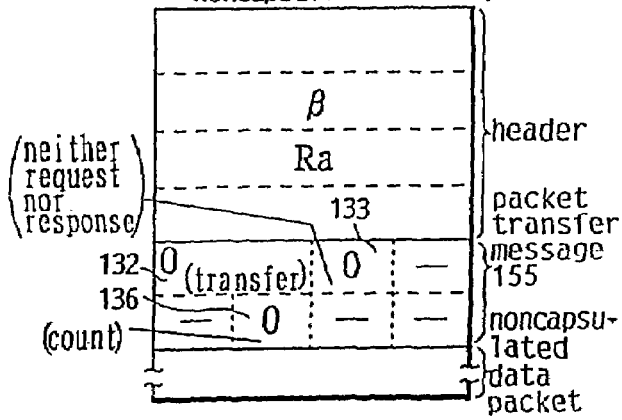
Figure 38:
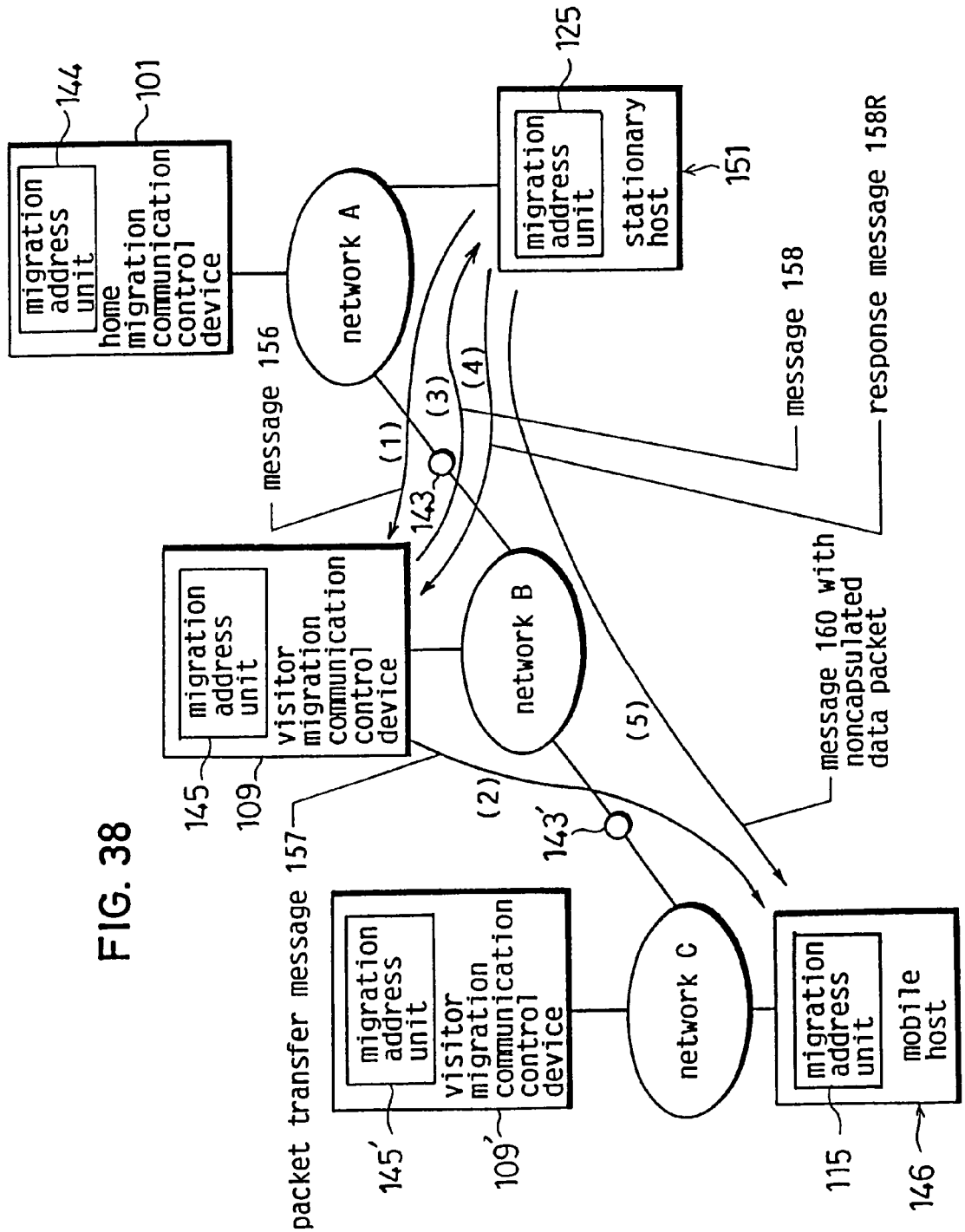
FIG. 38 is an illustration showing a flow of each data packet transmitted between devices at an operation example in the second embodiment of the present invention.

FIG. 32c and FIG. 36e are examples of the mobile host transfer message including the home address a, the temporary address β or γ, and the autonomous flag F. Since the mobile host transfer message is sent to the stationary host 151, it is sent only when the autonomous flag F is 1; therefore, it does not necessarily include the value of the flag F. However, the identical message is sent both to the stationary host 151 and the visitor migration communication control device 109, 109' in this embodiment to simplify the construction of the mobile host transfer unit 104. FIG. 32D is an example of the response message.

As shown in FIG. 17, the home mobile host list hold unit 102 holds the home address α, the temporary address β, γ, the value of the autonomous flag F, and the broadcast address Bba, Cba on the network B, C, all of which are obtained from the mobile host transfer unit 104.

The packet monitoring unit 106 receives the packet destined for the home address α of the mobile host 146, then sends it to the packet transfer unit 103 when the stationary host 151 transmits the packet to the home address α of the mobile host 146 after the mobile host 146 has migrated to another network.

The packet transfer unit 103 has a payload including the noncapsulated data packet and the packet transfer message informing the transfer of the noncapsulated data packet, generates another data packet, and sends it to the temporary address β, γ of the mobile host 146. FIG. 32b is an example of the packet transfer message. As is described above, the packet transfer unit 103 directs the mobile host transfer unit 104 to transmit the mobile host transfer message to the stationary host 151 only when the autonomous flag in the home mobile host list hold unit 102 shows the value of 1. The operation conducted when the flag F is 1 will be described later.

When the stationary host 151 has problems in communicating with the mobile host 146 such as receiving the unusual mobile host transfer message, the address inquiry unit 105 is employed to solve the problems. That is, receiving from the stationary host 151 an address inquiry message, the address inquiry unit 105 transmits to the stationary host 151 a data packet which responds to the address inquiry by showing the address to be used in the communication. The address inquiry message includes a type field 132, a flag field 133, a sequence field 134, and a home address field 138, each of which having value 5, 1, a certain number, and α respectively; while the response message includes a temporary address field 139 filled with the temporary address β, γ at well as the flag field with 2, besides the type field 132, the sequence field 134, and the home address field 138 filled with the same values in the address inquiry message.

[Visitor Migration Communication Control Device 109]

The visitor migration communication control device 109 implements the same function with the home migration communication control device 101. That is, when the stationary host 151 transmits an encapsulated data packet to the temporary address β of the mobile host 146, which is the updated address thereof since the mobile host has migrated to the network C, the visitor migration communication control device 109 transfers that encapsulated data packet from the temporary address β to temporary address γ. Then, the device 109 posts to the stationary host 151 the temporary address γ, so that the stationary host 151 will be able to communicate directly with the mobile host 146. However, whether or not the device 109 provides the above packet transfer service will be determined in accordance with a processing load put on the device 109 or with a initial setting given by a system operator; thus, the packet transfer service of the device 109 is not necessarily an obligation.

Figure 18:
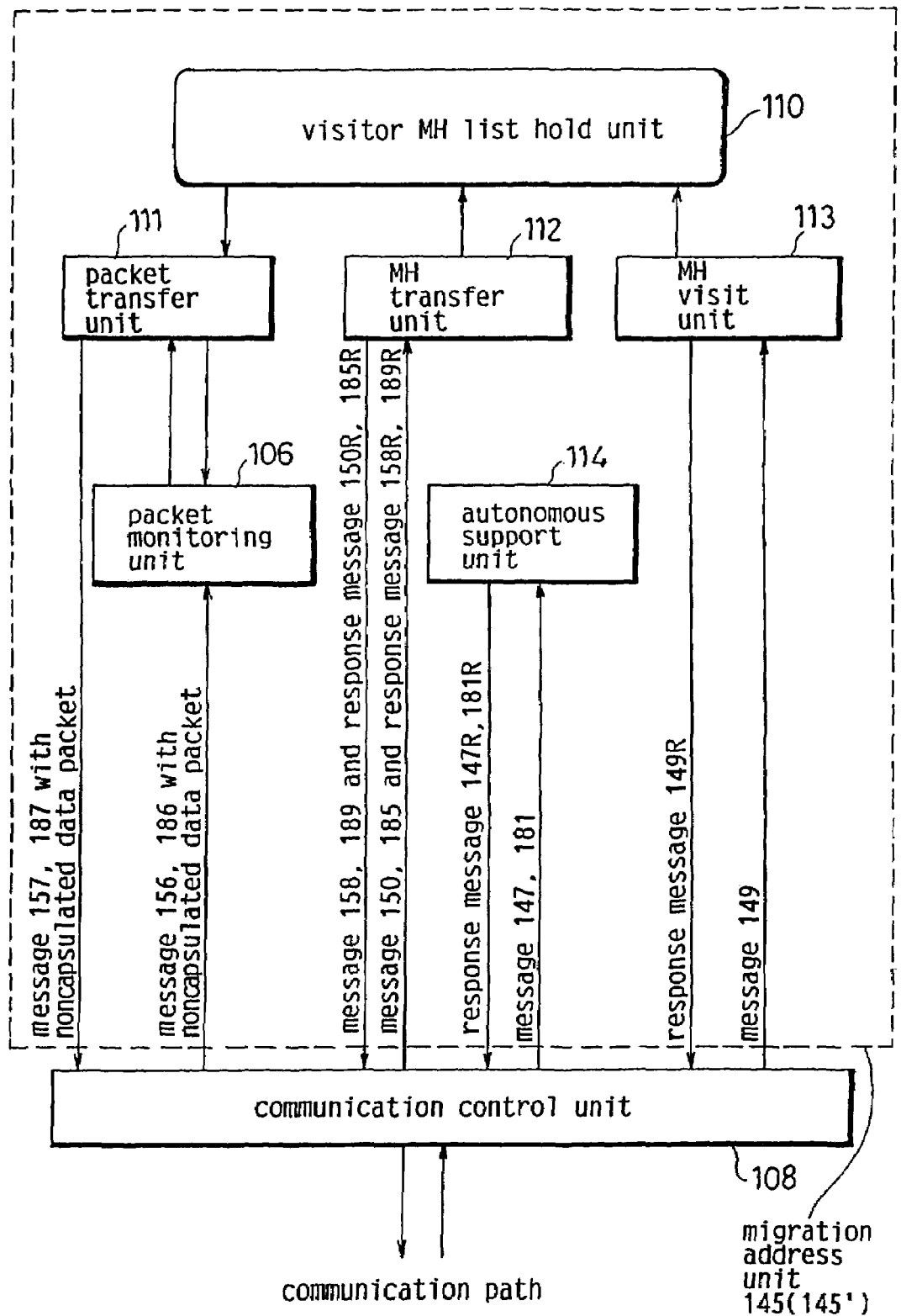
FIG. 18 is a detailed block diagram depicting the visitor migration communication control device in the second embodiment of the present invention.

As shown in FIG. 18, the visitor migration communication control device 109 consists of the migration address unit 145 and the communication control unit 108. The migration address unit 145 further comprises the packet monitoring unit 106, a visitor mobile host list hold unit 110, a packet transfer unit 111, a mobile host transfer unit 112, a mobile host visit unit 113, and an autonomous support unit 114. The unit 106 and the unit 108 function the same as those in the home migration communication control device 101.

Receiving an autonomous packet transfer support check message inquiring if the visitor migration communication control device 109 provides the packet transfer service, the autonomous support unit 114 responds to it with the response message where the autonomous flag F shows 1 when the device 109 provides that service or 0 when it does not provide that service. FIG. 28*a* is an example of the autonomous packet transfer support check message, while FIG. 28*b* is an example of the response message including the autonomous flag F and the broadcast address Bba.

Figure 28E:
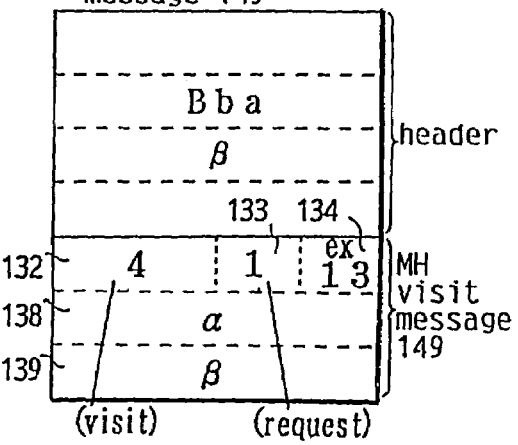
Figure 28F:
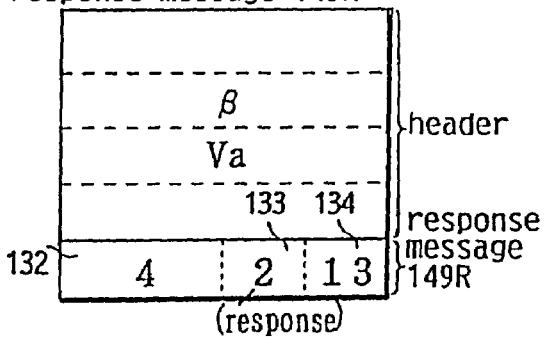
Figure 30:
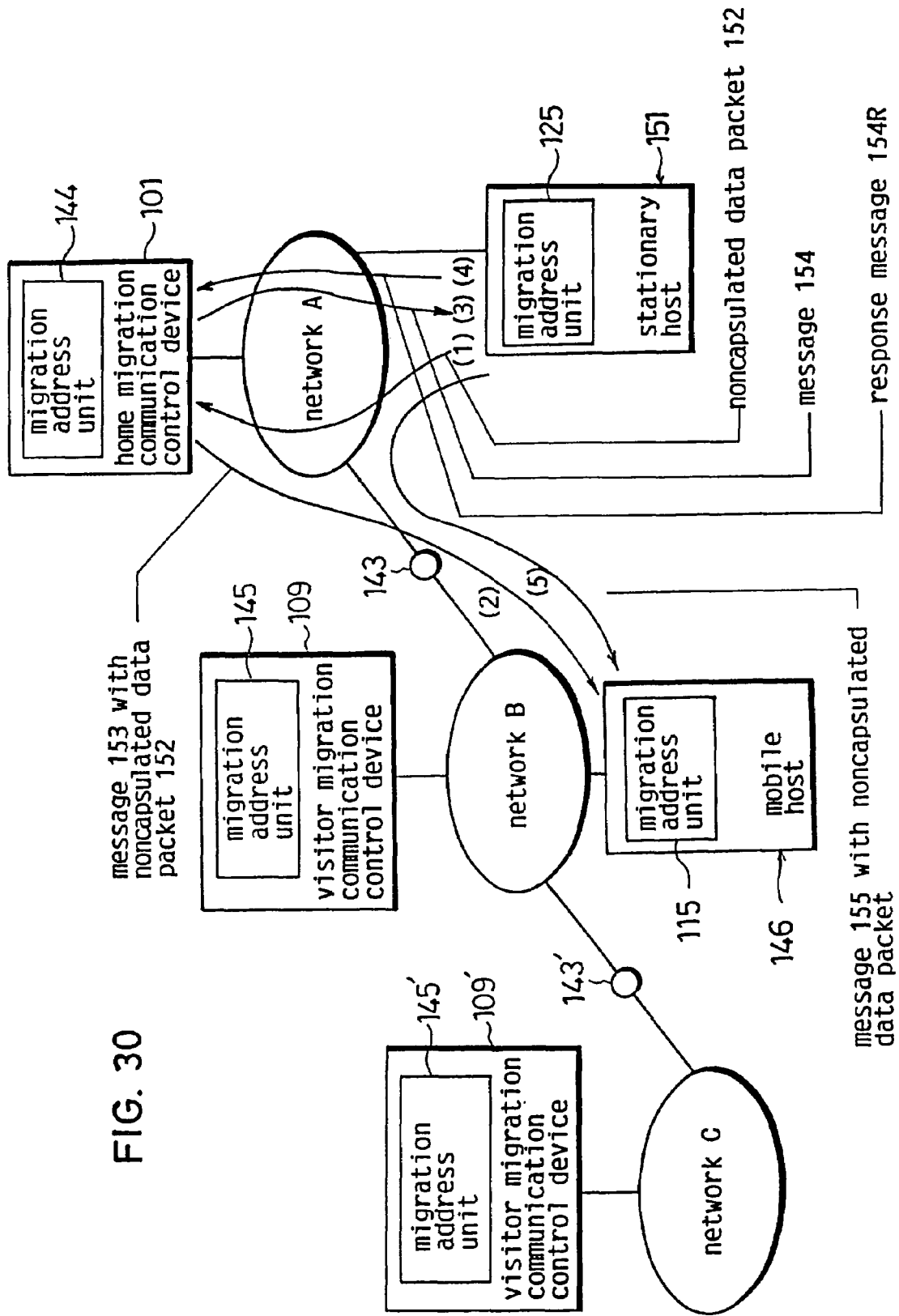
FIG. 30 is an illustration showing a flow of each data packet transmitted between devices at an operation example in the second embodiment of the present invention.

Receiving from the mobile host 146 the mobile host visit message which informs that the mobile host 146 has migrated to the network B, the mobile host unit 113 responds it with the response message after storing the mobile host visit message into the visitor mobile host list hold unit 110. The mobile host visit message includes the home address α and the temporary address β of the mobile host 146. FIG. 28*e* is the format of the mobile host visit message, while the FIG. 28*f* is the format of the response message.

Receiving from the mobile host transfer unit 104 in the device 101 the mobile transfer message informing that the mobile host 146 has migrated to the network C, the mobile host transfer unit 112 stores in the visitor mobile host list hold unit 110 the updated temporary address γ of the mobile host 146 and the value of the autonomous flag F by corresponding them to the home address α. The unit 112 also transmits to the stationary host 151 the mobile host transfer message in accordance with the direction from the packet transfer unit 111, as does the mobile host transfer unit 104 in the device 101.

As shown in FIG. 19, the visitor mobile host list hold unit 110 holds the home address α and the temporary address β on the network B, which are obtained from the mobile host 146 via the mobile host visit unit 113, as well as the temporary address γ and value on the autonomous flag F, which are obtained from the home migration communication control device 101 via the mobile host transfer unit 112.

The packet transfer unit 111, as does the packet transfer unit 103 in the home migration communication control device 101, transmits to the temporary address y the data packet including the transfer message as well as orders the mobile host transfer unit 112 to transmit The mobile host transfer message.

[Mobile Host 146]

Figure 20:
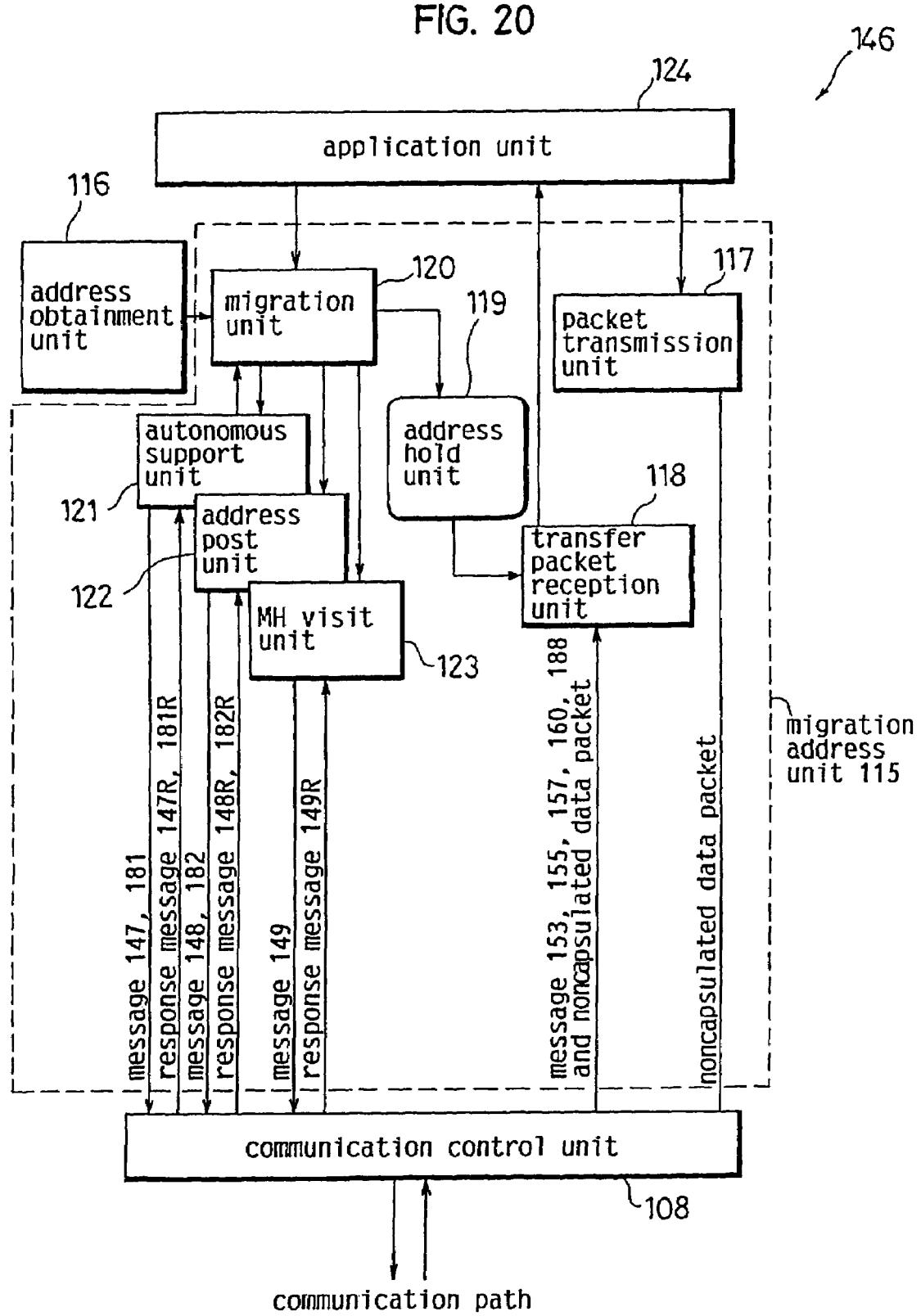
FIG. 20 is a detailed block diagram depicting a migration address unit in the second embodiment of the present invention.

As shown in FIG. 20, the mobile host 146 includes the migration address unit 115, an address obtainment unit 116, the communication control unit 108, and an application processing unit 124 which mainly controls the communication of protocols located in higher layers including an application layer, such as TCP or layers located higher than it.

The migration address unit 115 comprises the a packet transmission unit 117, a transfer packet reception unit 118, an address hold unit 119, a migration unit 120, an autonomous support unit 121, an address post unit 122, a mobile host visit unit 123.

The migration address unit 115 comprising the above units is employed in transfer of data to the temporary address β or γ when the mobile host 146 migrates to the network B or C. Also receiving the data packet destined for the temporary address P or y including the packet transfer message and the noncapsulated data packet, the device 115 transmits the noncapsulated data to the application processing unit 124.

In accordance with the order given by the application processing unit 124 when the mobile host migrates to the network B, C, the migration unit 120 controls the address obtainment unit 116, the autonomous support unit 121, the address post unit 122, the mobile host visit unit 123, and the address hold unit 119.

Directed by the migration processing unit 120, the address obtainment unit 116 obtains the temporary address β of γ the mobile host 146 assigned when it migrates to the network B, C respectively. BOOTP in "Bill Croft and John Gilmore, BOOTSTRAP PROTOCOL RFC951, September, 1985" is an example of obtaining the temporary address; besides employing the BOOTP, the operator may input the temporary address β, γ assigned by a system administrator of the network B, C.

Directed by the migration unit 120, the autonomous support unit 121 sends the autonomous packet transfer support check message to inquire if the visitor migration communication control device 109, 109' attached to the network B, C provides the packet transfer service and receives the response message to the inquiry. The autonomous packet transfer support check message is also sent to obtain the broadcast address Bba and Cba on the network B and C respectively.

Directed by the migration unit 120, the address post unit 122 sends the address post message to notify the home migration communication control device 101 of the temporary address β, γ. The address post message also informs whether or not the device 109, 109' provides the packet transfer service as well as the broadcast address Bba, Cba on the network B, C. If the response message from the visitor migration communication control device 109, 109' has the value 1 of the autonomous flag F, the mobile host visit unit 123 transmits to the visitor migration communication control device 109, 109' the mobile host visit message including the home address α as well as the temporary address β, γ respectively.

As shown in FIG. 21, the address hold unit 119 previously holds the home address α of the mobile host 146 and the broadcast address Aba on the network A. Now, the unit 119 newly holds the temporary address β or γ obtained from the address obtainment unit 116 via the migration unit 120 and the broadcast address Bba or Cba obtained from the autonomous support unit 121 via the migration unit 120.

When the mobile host 146 is attached to the network A and receiving a data packet destined for the home address α, the transfer packet reception unit 118 sends data etc. in the noncapsulated data packet to the application processing unit 124. On the other hand, when the mobile host 146 is attached to the network B and receiving a data packet destined for the temporary address β, the data packet including the packet transfer message and the noncapsulated data packet destined for α, the unit 118 sends to the application processing unit 124 data etc. in the noncapsulated data. Thus, the application processing unit 124 receives the data without being affected by the migration of the mobile across the networks.

Receiving the data to be transmitted and the instruction from the application processing unit 124, the packet transmission unit 117 generates a noncapsulated data packet whose destination address is the home address α and transmits it.

[Stationary Host 151]

Figure 22:
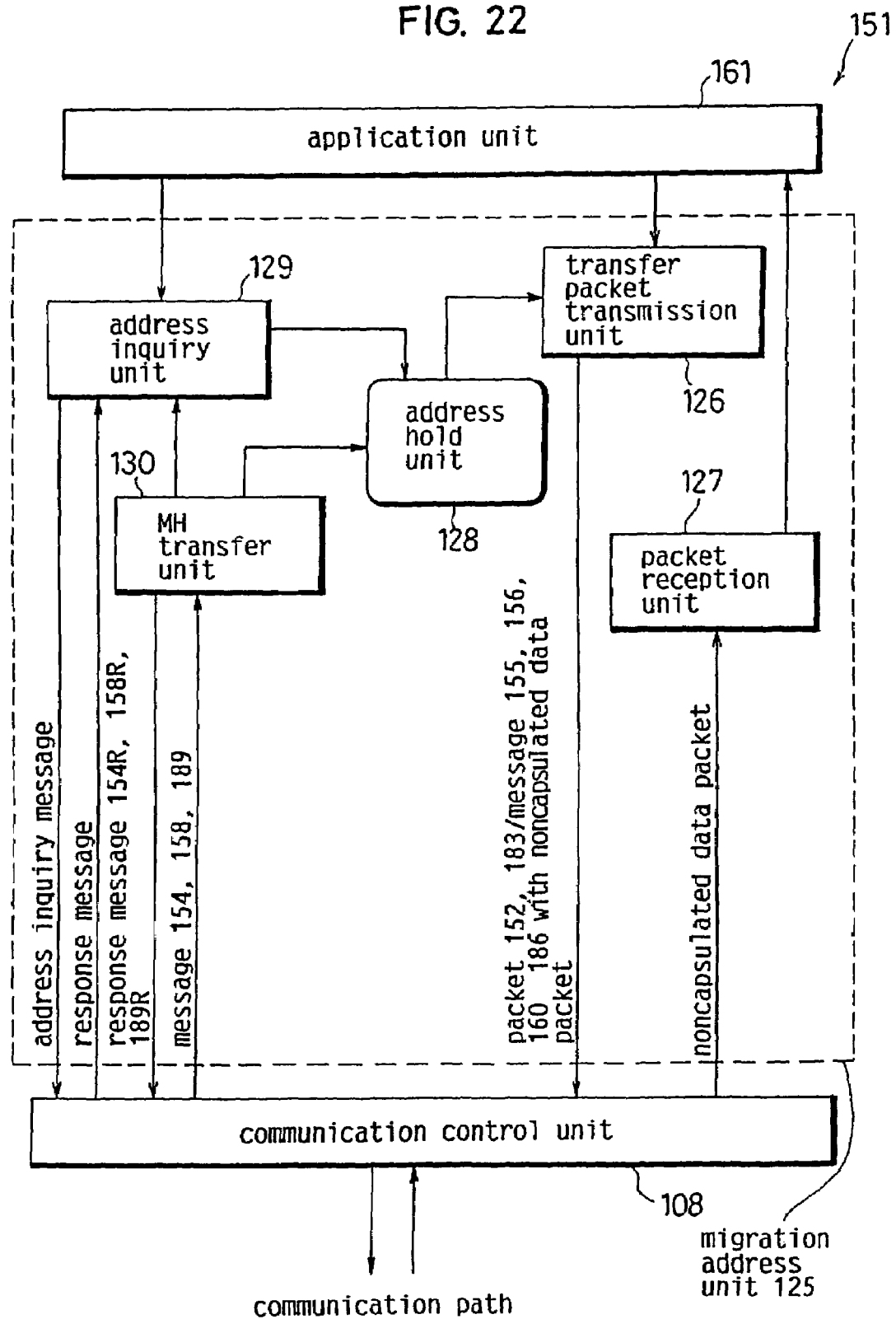
FIG. 22 is a detailed block diagram depicting a migration address unit in the second embodiment of the present invention.

As shown in FIG. 22, the stationary host 151 comprises the migration address unit 125 and the application processing unit 161 which mainly controls the communication of a protocol located in higher layers including application layer, such as TCP or layers located higher than the TCP and the communication control unit 108.

The migration address unit 125 comprises a transfer packet transmission unit 126, a packet reception unit 127, an address hold unit 128, an address inquiry unit 129, and the mobile host transfer unit 130.

The migration address unit 125 comprising the above units generates a noncapsulated data packet and sends it to the home address α when it is not notified that the mobile host 146 migrate to the network B or C and obtained the temporary address β or γ respectively. The unit 125 also generates an encapsulated data packet including as a payload the noncapsulated data packet and a data transfer message, which informs transfer of the noncapsulated data packet and sends it to the temporary address β, γ, when it is notified of the migration.

Receiving from the home migration communication control device 101 and the visitor migration communication control device 109, 109' the data packet including the mobile host transfer message which informs the migration of the mobile host 146, the mobile host transfer unit 130 stores into the address hold unit 128 the home address α and the temporary address β or γ of the mobile host 146 assigned on the network B or C respectively.

As shown in FIG. 23, the address hold unit 128 holds the home address α, the temporary address β or γ by corresponding them.

Directed by the application unit 161, the transfer packet transmission unit 126 generates a data packet destined for the home address α, and transmits it. However, if the address hold unit 128 holds the temporary address β or γ besides the home address α, the unit 126 generates an encapsulated data packet destined for the temporary address β or γ which includes as a payload a noncapsulated data packet and a packet transfer message, which informs transfer of the noncapsulated data packet, and transmits it.

As is described the above, both the home migration communication control device 101 and the visitor migration communication control device 109, 109' generate the encapsulated data packet including the packet transfer message and the noncapsulated data and transmits it to the current temporary address of the mobile host 146. Owing to the device 101 or 109, 109', the stationary host 151 is able to transmit to the mobile host 146 both the noncapsulated data packet destined for the home address α and the encapsulated data packet destined for the temporary address β or γ without failure even when the address hold unit 128 fails to hold the current temporary address β or γ and the stationary host 151 transmits the data packet to the outdated address of the mobile host 146.

The packet reception unit 127 receives a data packet which is sent from the mobile host 146 and has Sa as its destination address, and sends the data etc. in it to the application unit 161.

When the address inquiry unit 129 has problems such as that it received an illegal mobile host transfer message or that it cannot communicate with the mobile host 146 successfully, it transmits a data packet including an address inquiry message in order to inquire of the host migration communication control device 101 the address which is currently used to communicate with the mobile host 146.

[Construction of Data Packet]

Figure 24C:
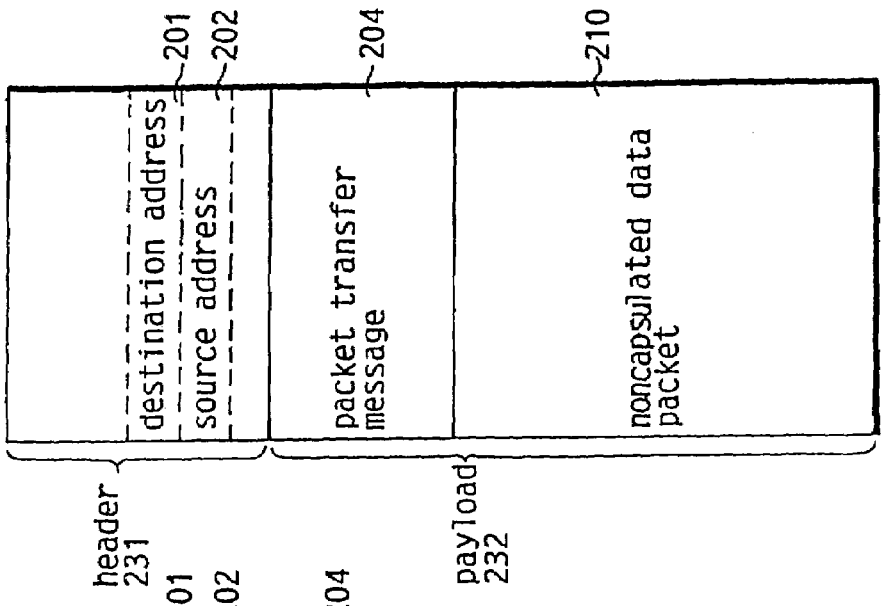
Figure 24B:
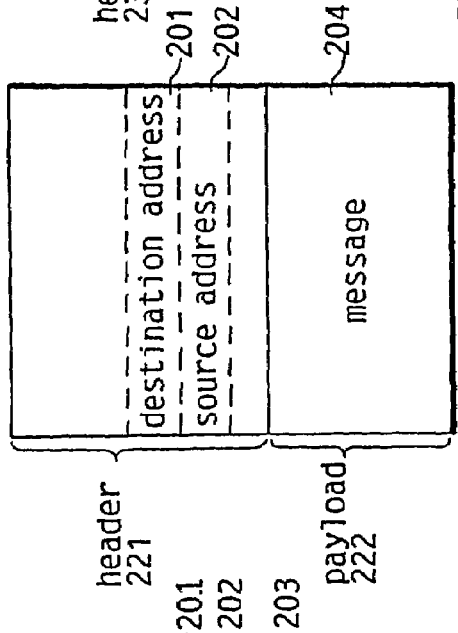
Figure 24A:
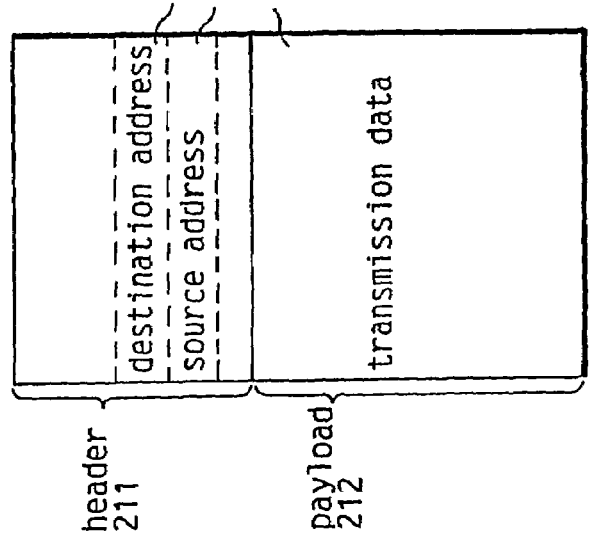

As shown in FIGS. 24(a), (b), (c), there are three kinds of data packets, each data packet 210, 220, 230, includes each of header 211, 221, 231 and payload 212, 222, 232 respectively.

The header 211 of the data packet 210 includes a destination address 201, and a source address 202. Also the payload 212 consists of a transmission data 203.

The header 221 of the data packet 220 includes the destination address 201 and the source address 202. Also the payload 222 consists of a message 204.

The header 231 of the data packet 230 includes the destination address 201 and the source address 202. Also the payload 232 consists of the message 204, which is employed as the packet transfer message, and a noncapsulated data packet 210. Also each header 211, 221, 231 includes information showing presence or absence of the message 204 as a protocol number etc.

The message 204 includes some of the fields in FIG. 25 in accordance with its type.

The type of the message 204 is indicated in the message type field 132. Besides the above types, the message 204 is also employed as an echo message for examining whether or not a host employs an appropriate operation in accordance with the message.

A flag field 133 indicates whether or not the message 204 is a response. When the message 204 is not the response, the field 133 further indicates whether or not the message 204 requests a response.

A sequence field 134 gives a single number both to the request message and its response message, thereby the request message and the response message are corresponded.

An autonomous flag field 135 contains a value of the autonomous flag F indicating whether or not the visit-or migration communication control device 109,109' provide the packet transfer service.

A counter field 136 contains a counter indicating the number of the visitor migration communication control devices employed to transfer the encapsulated data packet consisting of the packet transfer message and the noncapsulated data packet. The visitor migration communication control device increments the counter in the received message packet by 1, and gives it to the message to be transmitted. When the incremented number is greater than the predetermined number, the received message packet is disposed.

A status field 137 of the response message indicates presence or absence of an error in a transmission/reception of the data packet. For example, it indicates an error in authentication information, which will be described later, or the address inquiry message which cannot or should not be responded.

A home address field 138, a temporary address field 139, and a broadcast address field 140 indicates the home address as well as the temporary address of the mobile host 146 or the broadcast address on its home network or on the network it migrates. However, what the broadcast address field 140 indicates depends on type of the message 204. Whether the message 204 is the request or the response also devices the content of the broadcast address field 140.

The authentication information field 141 indicates if a source address coincides with the sender's address.

[Outline of Communication Operation]

The home migration communication control device 101 and the visitor migration communication control device 109, 109', is basically employed to transfer the data packet transmitted by the stationary host 151 as well as post to the stationary host 151 the updated temporary address of the mobile host 146. Understanding of such operations will be helped by the following two points.

1. Transfer of the data packet and posting of the updated temporary address are conducted only when the mobile host 146 migrates from its home network to another network. The home network refers to the one to which the home migration communication control device is attached.

2. Posting of the updated temporary address is conducted only when the autonomous flag F is 1, which indicates the visitor migration communication control device 109, attached to the same network as is the mobile host 146, provides the packet transfer service. Otherwise, the data packet transmitted by the stationary host 151 to the posted temporary address will not be received by the mobile host 146 when the mobile host 146 migrates to another network.

[Communication Operation 1]

An example of the communication operation is described hereunder. In the communication operation 1 the visitor migration communication control device 109,109' provides the packet transfer service when the mobile host 146 migrates from the network A to the network B, further from the network B to the network C.

[Migration from Network A to Network B]

Figure 26:
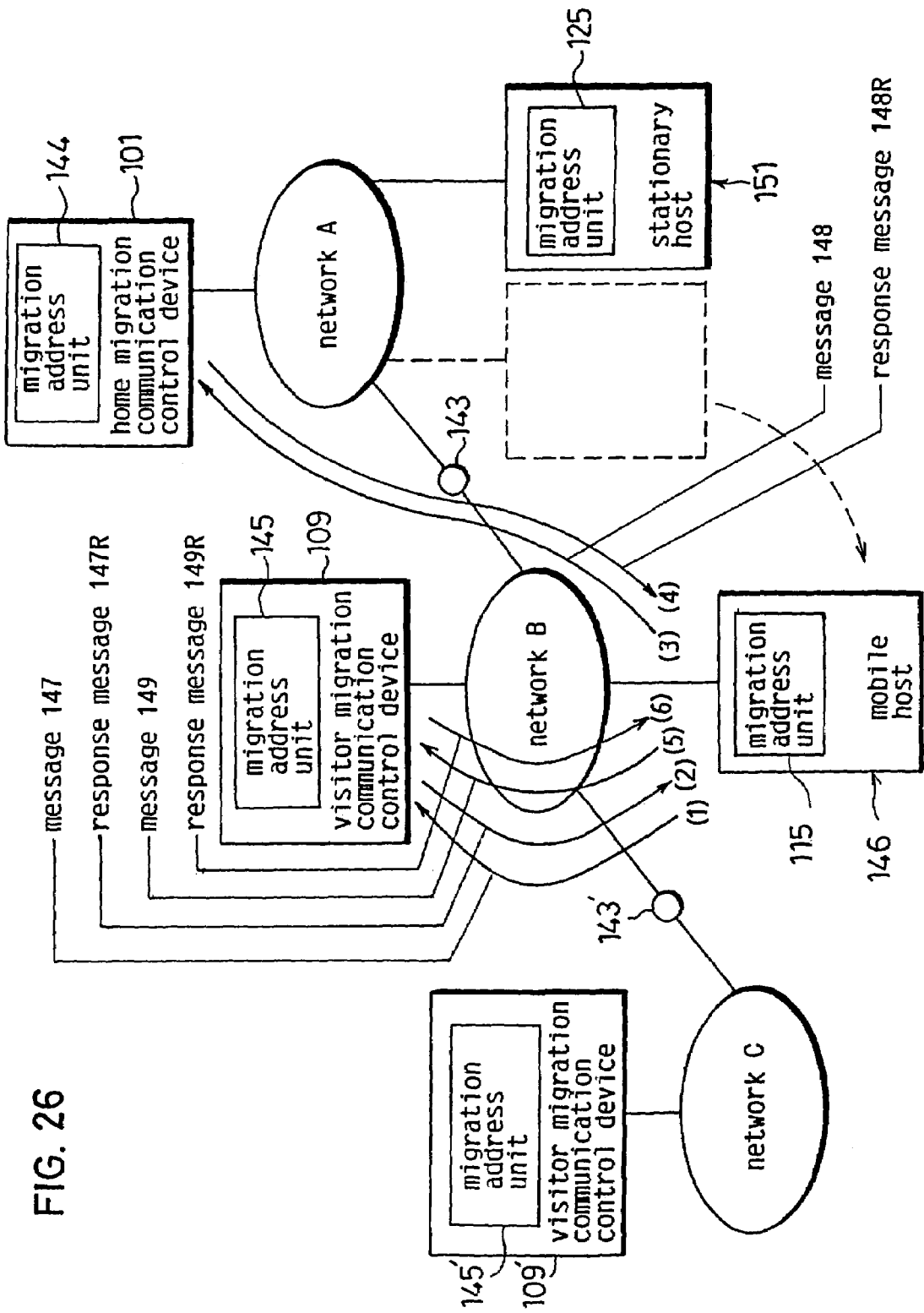
FIG. 26 is an illustration showing a flow of a data packet transmitted between devices in the second embodiment of the present invention.

The operation at the migration of the mobile host 146 from the network A to the network B is described with referring to FIGS. 26-29. FIG. 26 shows a flow of the data packet transmitted between the devices; FIG. 27 shows a communication sequence of the data packet; FIGS. 28a-28f show construction of each data packet; and FIG. 29 shows the content of the address hold unit 119 etc.

When the mobile host 146 is attached to the network A, the home mobile host list hold unit 102 in the home migration communication control device 101 holds the home address α both as the home address and the temporary address of the mobile host 146. Thereby the home migration communication control device 101 detects that the mobile host 146 is attached to the network A.

The address hold unit 119 in the mobile host 146 holds the home address α and the broadcast address Aba on the network A.

When the mobile host 146 migrates to the network B, the application unit 124 orders the operation of the migration unit 120 in accordance with the instruction given by the operator. The temporary address β is assigned to the mobile host 146 on the network B, and the address obtainment unit 116 obtains it. The migration unit 120 stores into the address hold unit 119 the temporary address β together with the home address α and the broadcast address Aba.

(1) The autonomous support unit 121 transmits to the visitor migration communication control device 109, which is attached to the network B, the data packet including the autonomous packet transfer support check message 147 which holds the home address α and the temporary address β. The destination address of the data packet is the broadcast address shared by every network, such as an address where every bit is 1. The message 147 does not necessarily hold the home address α and the temporary address β although they can be used in checking the security of the network if it does. Also the message 147 holding the home address α and the temporary address γ can take the place of a mobile host visit message 146, which will be described later.

(2) The autonomous support unit 114 in the visitor migration communication control device 109 responds to the autonomous support unit 121 with the response message 147R where broadcast address Bba is set and the autonomous flag F in the autonomous flag field 135 indicates 1 to inform that the device 109 provides the packet transfer service.

The mobile host 146 transmits the data packet to the visitor migration communication control device 109. The broadcast address Bba is employed as the destination address of the data packet and it is set in the response message 147R; however, this is not an obligation.

That is, when the response message 147R does not hold the broadcast address Bba, the following means can be employed. First, the broadcast address shared by every network can be employed, which is described in the above. Second, the source address, which is set in the header of the data packet comprising the response message 147R, can be employed. Third, a so called name service can be employed, where a server device on the network system informs the broadcast address Bba. Finally, when the address assigned to each of the devices, which are attached to the network, consists of the network address being unique for the network and a device address being unique for the devices, and the broadcast address on each network consists of such network address and the device address where the value of every bit is 1, the network address Bba can be generated by employing the network address included in the temporary address β of the mobile host 146.

(3) The address post unit 122 transmits to the home migration communication control device 101 the address post message 148. The message 148 includes the value 1 of the autonomous flag F, which is obtained from the response message, home address α, the temporary address β on the network B, and the broadcast: address Bba, and the broadcast address Aba is the destination address of the address post message 148.

When the address post unit 107 in the home migration communication control device 101 receives the address post message 148, the mobile host transfer unit 104 stores in the home mobile host list hold unit 102 the temporary address β, the value 1 of the autonomous flag 1, and the broadcast address Bba by corresponding them to the home address α. Since the home address α had been stored as the temporary address before the temporary address β was stored, the mobile host transfer unit 104 knows that the mobile host 146 has migrated from the network A to the network B; therefore, it does not transmit the mobile host transfer message to the visitor migration communication control device 109, 109'.

That is, the data packet transmitted by the stationary host 151 to the home address α of the mobile host 146 is received by the home migration communication control device 101 and transferred thereby to the temporary address β; therefore, the visitor migration communication control device 109,109' is not employed here.

(4) The address post unit 107 notifies the address post unit 122 that it has received the address post message 148 by sending the response message 148R.

(5) Since the visitor migration communication control device 109 provides the packet transfer service, the mobile host visit unit 123 transmits to the visitor migration communication control device 109 the mobile host visit message 149 including the home address α and the temporary address β, so that the device 109 is notified that the mobile host 146 has migrated to the network B. The mobile host visit message 149 is destined for the broadcast address Bba.

The mobile host visit unit 113 in the visitor migration communication control device 109 receives the mobile host visit message 149 and stores into the visitor mobile host list hold unit 110 the home address α as well as the temporary address β. The temporary address β is stored also as the updated temporary address of the mobile host 146, which will be assigned when the mobile host 146 migrates from the network B to another network; thereby, the visitor migration communication control device 109 detects that the mobile host is currently attached to the network B.

(6) The mobile host visit unit 113 notifies the mobile host visit unit 123 by sending the response message 149R that it has received the mobile host visit message 149.

[Communication Between the Stationary Host 151 and the Mobile Host 146 on the Network B]

The operation at the communication between the stationary host 151 and the mobile host 146 when the mobile host is attached to the network B is described hereunder with referring to FIGS. 30-33, which are relevant for FIGS. 26-29.

(1) The application unit 161 in the stationary host 151 directs the transmission of the noncapsulated data packet, whose destination is the home address a, despite the migration of the mobile host 146. Immediately after the mobile host 146 migrates to the network B, that is, when the address hold unit 128 does not hold the home address a and the temporary address P, the transfer packet transmission unit 126 is not notified of the migration; therefore, it generates the noncapsulated data packet 152 and transmits it to the home address a in accordance with the direction from the application unit 151.

The noncapsulated data packet 152 is not received by the mobile host 146, which is not attached to the network A, but by the packet monitoring unit 106 in the home migration communication control device 101 since the home mobile host list hold unit 102 in the device 101 holds the home address α as well as the temporary address β, which coincides with the destination address of the noncapsulated data packet 152.

(2) The packet transfer unit 103 in the home migration communication control device 101 generates an encapsulated data packet including the noncapsulated data packet 152, which is received by the packet monitoring unit 106, and the packet transfer message 153, which informs the transfer of the noncapsulated data packet 152; and transmits it to the temporary address β. The packet transfer message 153 includes the value 0 in the field 133, which indicates that no response is requested, as well as the value 0 on the counter in the field 136, which indicates that the packet transfer message is the first message added to the noncapsulated data packet 152. As is described, no response is requested by the packet transfer message 153. That is, the application unit 161 of the stationary host 151 and the application unit of the mobile host 146, rather than the home migration communication control device 101 and the migration address unit 115, confirm that the mobile host 146 receives the noncapsulated data packet 152.

The transfer packet reception unit 118 in the mobile host 146 receives the encapsulated data packet including the packet transfer message 153 and the noncapsulated data packet 152, since it is destined for the temporary address β, which is held in the address hold unit 119. The unit 118 then detects that the destination address of the noncapsulated data packet 152 is the home address α, and sends the data etc. in the noncapsulated data packet 152 to the application unit 124.

Thus, the communication between the application unit 124 and the application unit 161 is not affected by the migration of the mobile host 146.

(3) The packet transfer unit 103 transmits the encapsulated data packet including the data packet transfer message. It also directs, after detecting that the autonomous flag F indicates 1, the mobile host transfer unit 104 to transmit to the stationary host 151 the data packet including the mobile host transfer message 154 where the home address α and the temporary address β are set. Finally, the unit 104 transmits the data packet to the stationary host 151.

The mobile host transfer unit 130 in the stationary host 151 receives the mobile host transfer message and stores into the address hold unit 128 the home address α and the temporary address β.

(4) The mobile host transfer unit 130 responds to the mobile host transfer unit 104 with the response message 154R.

(5) When the application unit 161 directs the transmission of the noncapsulated data packet to the home address α after the address hold unit 128 holds the home address α and the temporary address β, the transfer packet transmission unit 126 first generates a noncapsulated data packet destined for the home address a, then generates an encapsulated data packet including it and a packet transfer message 155. The encapsulated data packet is then transmitted to the temporary address. Thus, once the home migration communication control device 101 notifies the stationary host 151 of the home address α and the temporary address β, the stationary host 151 is able to transmit the data packet to the temporary address β of the mobile host 146, and the home migration communication control device 101 is not employed.

On the other hand, when data is transmitted from the mobile host 146 to the stationary host 151, the Sa is employed as the destination address α and the home address is employed as the source address; and the noncapsulated data packet is transmitted from the address α to the address Sa.

Thus, even when all the noncapsulated data transmitted by the stationary host 151 is destined for the home address α, the home migration communication device 101 transfers the data to the updated temporary address of the mobile host; thereby, the communication between the mobile host 146 and the stationary host 151 is implemented, and the conventional device can be employed as the stationary host 151, which broadens a practicability of the network system.

Whereas, when the network system checks the original source address of the data packet or a transfer path of the data packet, the transmission unit may be built in the mobile host 146 like the transfer packet transmission unit 126 in the stationary host 151, and also the reception unit may be built in the stationary host 151 like the transfer packet reception unit 118 in the mobile host 146; and the encapsulated data packet including the packet transfer message and the noncapsulated data packet may be transmitted therebetween.

[Migration from Network B to Network C]

The operation at the migration of the mobile host 146 from the network B to the network C is described hereunder with referring to FIGS. 34-37, relevant for FIGS. 26-29.

(1)-(4) The operation related to transmission of an autonomous packet transfer support check message 147', a response message 147R', an address post message 148', and a response message 148' between the mobile host 146 and the visitor migration communication control device 109', is substantially same as the operation related to transmission of messages between the mobile host 146 and the visitor migration communication control device 109, which is conducted when the mobile host 146 migrates to the network B. However, the operation at the migration from the network A to the network B and the operation at the migration from the network B and the network C are different from each other in part of the operation of the home migration communication control device 101 conducted after it responds to the received address post message 148' with the response message 148R.

(5) When the address post unit 107 receives the address post message 148', the mobile host transfer unit 104 in the home migration communication control device 101 detects that the mobile host been attached to the network B before migrating to the network C since the temporary address β has been stored as the temporary address. Then, the mobile host transfer unit 104 sends to the visitor migration communication control device 109 the data packet including both the home address α and the temporary address γ, so that the device 109 transfers the data packet transmitted by the stationary host 151 from the temporary address β to the temporary address γ. The data packet received by the visitor migration communication control device is destined for the broadcast address Bba.

In accordance with the address post message 148', the mobile host transfer unit 104 stores into the home move host list hold unit 102 the temporary address γ, the value 1 of the autonomous flag F, and the broadcast address Cba by corresponding them to the home address α.

Receiving the data packet including the mobile host transfer message 150, the mobile host transfer unit 112 in the visitor migration communication control device 109 stores into the visitor mobile host list hold unit 110 the temporary address γ newly assigned to the mobile host 146 and the value 1 of the autonomous flag F by corresponding them to the home address α.

(6) The mobile host transfer unit 112 notifies the mobile host transfer unit 104 that it has received the mobile host transfer message 150 by sending thereto the response message. 150R.

(7), (8) The transmission of a mobile host visit message 149' and a response message 149R' between the mobile host 146 and the visitor migration communication control device 109', which is conducted when the device 109' provides the packet transfer service, is substantially same as the transmission of messages between the mobile host 146 and the visitor migration communication control device 109, which is conducted when the mobile host 146 migrates to the network B.

[Communication Between Mobile Host 146 Attached to Network C and Stationary Host 151]

Transmission of the data packet from the stationary host 151 to the mobile host 146 when the mobile host is attached to the network C is described with referring to FIG. 38-41, which are relevant for FIG. 26-29.

The transmission is substantially same as the transmission between the stationary host 151 and the mobile host 146 when the mobile host 146 is attached to the network B, except that the visitor migration communication control device 109 instead of the home migration communication control device 101 is employed.

(1) When the stationary host 151 is not notified that the mobile host 146 has migrated from the network B to the network C, the stationary host 151 generates the encapsulated data packet including the noncapsulated data packet, which is destined for the home address α, and the packet transfer message 156; then transmits it to the temporary address β. This is substantially the same as (5) in the communication between the stationary host 151 and the mobile host 146 attached the network B.

The data packet transmitted by the stationary host is not received by the mobile host 146 since the mobile host is not attached to the network B. The data packet is received by the packet monitoring unit 106 in the visitor migration communication control device 109 since the visitor mobile host list hold list unit thereof holds the temporary address β besides the temporary address γ.

(2) The visitor migration communication control device 109 transmits to the temporary address γ of the mobile host 146 the data packet including the packet transfer message 157, which is substantially same as (2) in the communication between the stationary host 151 and the mobile host 146 on the network B except a difference described hereunder.

The home mobile host migration communication control device 101 receives the noncapsulated data packet 152 and generates an encapsulated data packet comprising the received noncapsulated data packet 152 and the packet transfer message 153. On the other hand, the visitor migration communication control device 109 receives the encapsulated data packet comprising the packet transfer message 156 and the packet transfer unit 111 converts the data packet by changing the destination address from the temporary address β into the temporary address γ as well as converting the packet transfer message 156 into the packet transfer message 157, whose value on the counter is incremented by 1.

(3)-(5) The visitor migration communication control device 109, the stationary host 151, and the mobile host 146 on the network C operate substantially same as the home migration communication control device 101, the stationary host 151, and the mobile host 146 on the network B, which is described the above in (3)-(5); thereby the mobile host transfer message 158 and the response message 158R are transmitted, and the data packet including the packet transfer message 160 is transmitted by the stationary host 151 to the mobile host 146 attached to the network C.

If the stationary host 151 does not transmit any data packet to the mobile host 146, which is attached to the network B, the stationary host is not notified of either the temporary address β or the temporary address γ; therefore, the stationary host 151 transmits the data packet to the home address α even when the mobile host 146 has migrated from the network B to the network C. When this occurs, the home migration communication control device 101, as does the visitor migration communication device 109, transfers the data packet from the home address α to the temporary address γ; then notifies the stationary host 151 of the updated temporary address γ of the mobile host 146 so that the stationary host 151 will be able to directly transmit the data packet, which comprises the packet transfer message, to the mobile host 146 attached to the network C.

Further, when the mobile host 146 migrates to the network, to which the visitor migration communication control device is attached to provide the packet transfer service, the stationary host 151 may transmit the data packet destined for any of the addresses β or γ. When the data packet is transmitted to the home address α or the temporary address γ, the home migration communication control device 101 or the visitor migration communication control device 109', which is notified of the updated temporary address of the mobile host 146, transfers the data packet to the updated temporary address; then it notifies the stationary host 151 of the updated temporary address of the mobile host.

When the data packet is transmitted to the temporary address β of the mobile host 146, the visitor migration communication control device 109 receives it. Since the device 109 is notified of only the temporary address γ, it transmits the data packet comprising the packet transfer message to the temporary address y as well as transmits the mobile host transfer message to notify the stationary host 151 of the temporary address y. The visitor migration communication control device 109' receives the data packet comprising the packet transfer message, which is destined for the temporary address and transmits it to the updated temporary address of the mobile host 146; then transmits the mobile host transfer message to notify the stationary host 151 of the updated temporary address. Also the visitor migration communication control device 1091 obtains the address of the visitor migration communication control device 109 from the source address of data packet transmitted thereby, and transmits the mobile host transfer message to the device 109. Thus, the visitor migration communication control device 109' obtains the updated temporary address of the mobile host 146, and transfers the data packet to the mobile host 146 as well as notifies stationary host 151 of the obtained updated temporary address.

[Communication Operation 2]

Another example of the communication operation is described hereunder. In the communication operation 2 the visitor migration communication control device 109 does not provide the packet transfer service when the mobile host 146 migrates from the network A to the network B, further from the network B to the network C.

Figure 42:
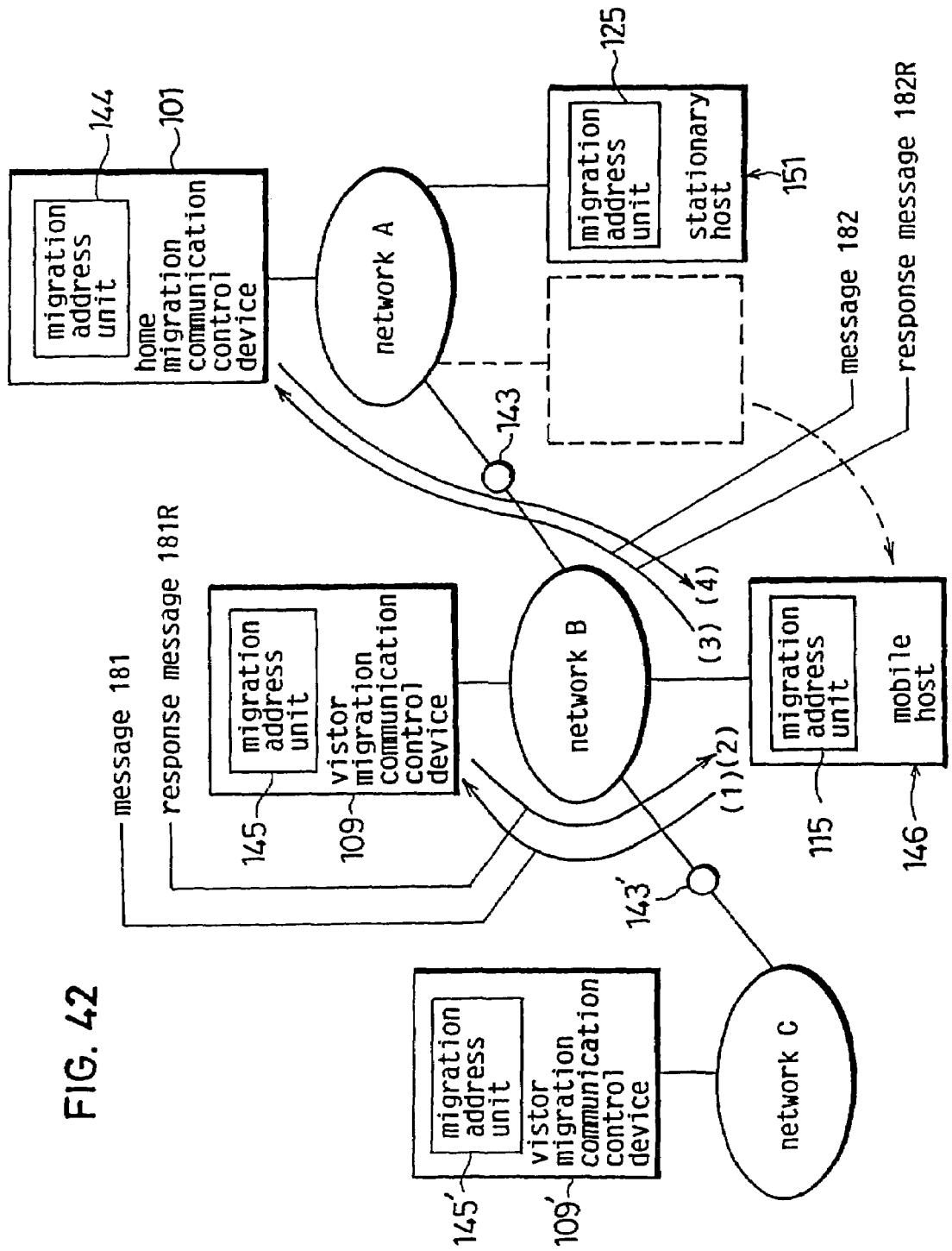
FIG. 42 is an illustration showing a flow of each data packet transmitted between devices in the second embodiment of the present invention.

As shown in FIG. 42, when the device 109 does not provide the packet transfer service, the autonomous packet transfer support check message 181, transmitted by the mobile host 146 which has migrated from the network A to the network B, is responded with the response message 181R where the autonomous flag F in the autonomous flag field 135 indicates 0. Thereby, the autonomous flag field 135 in the address post message 182, which is transmitted by the mobile host 146 to the home migration communication control device 101, obtains the value 0, and the value 0 is held in the home mobile host list hold unit 102 in the device 101. The mobile host 146 does not transmit the mobile host visit message to the visitor migration communication control device 109.

Figure 43:
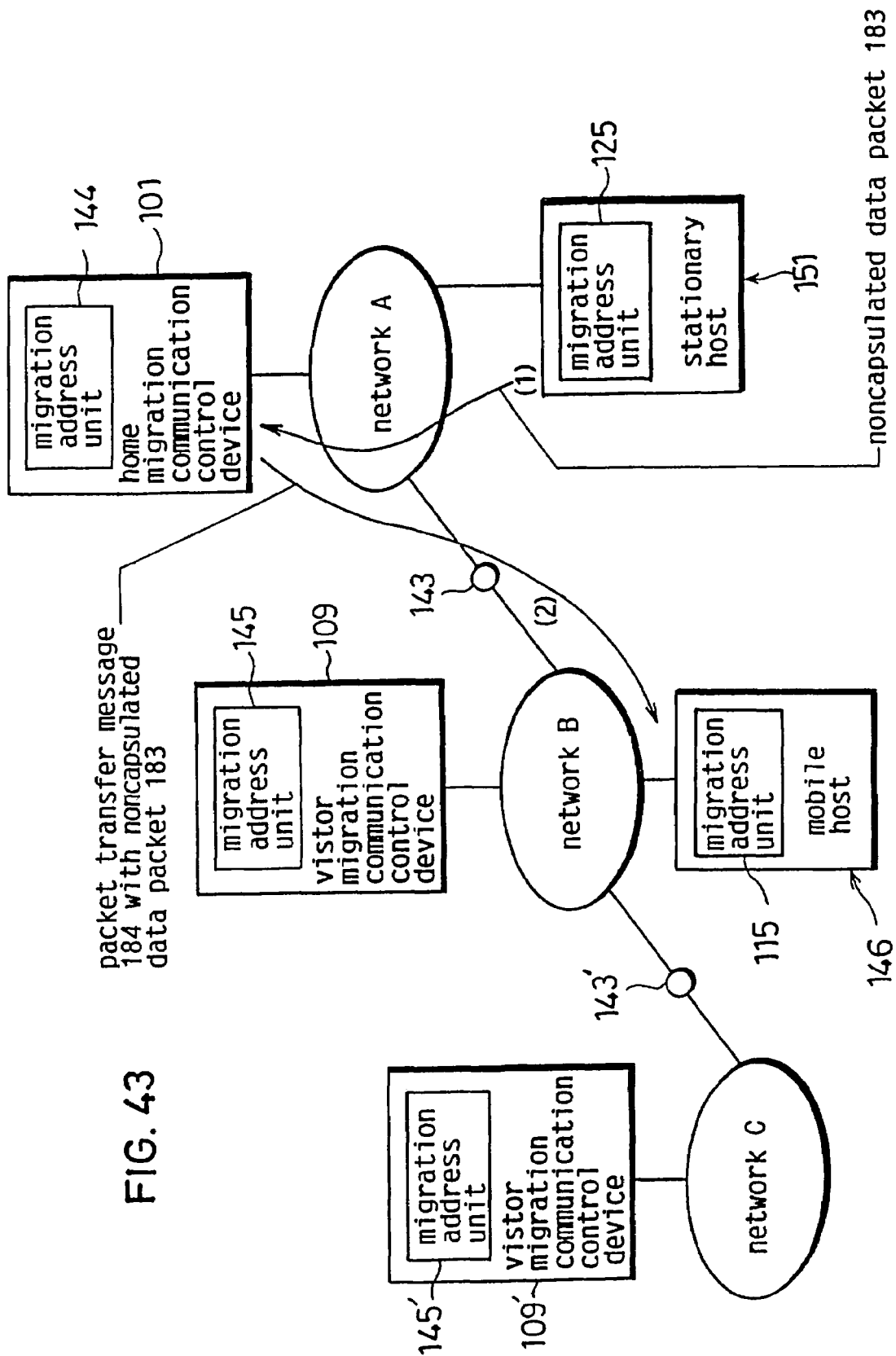
FIG. 43 is an illustration showing a flow of each data packet transmitted between devices in the second embodiment of the present invention.

As shown in FIG. 43, receiving from the stationary host 151 the noncapsulated data packet 183, which is destined for the home address α, the home migration communication control device generates the encapsulated data packet comprising the received noncapsulated data packet 183 and the packet transfer message 184, and transmits it to the temporary address β, as is in the communication operation 1.

However, recognizing the value 0 on the autonomous flag F, which is held in the home mobile host list hold unit 102, the device 101 does not transmit to the stationary host 151 the mobile host transfer message including the temporary address β. Therefore, every data packet transmitted by the stationary host 151 is destined for the home address α, and it is transferred to the mobile host 146 by the home migration communication control device 101. Thus, the stationary host 151 is not notified of the temporary address β since the data packet transmitted to the address other than the home address α is not transferred by the device 109; therefore it is not received by the mobile host 146 when it departs the network B to migrate to the network C.

When the visitor migration communication control device 109', which is attached to the network, provides the packet transfer service, the home migration communication control device 101 notifies the stationary host 151 of the temporary address γ when it transmits the noncapsulated data to the home address α, so that the stationary host 151 is able to directly transmit the data packet comprising the noncapsulated data packet and the packet transfer message to the mobile host 146 on the network C.

When the visitor migration communication control device 109 does not provide the packet transfer service, the home migration communication control device 101 does not necessarily notify the device 109 of the temporary address γ of the mobile host 146 assigned when it has migrated from the network B to the network C. However, the construction of the device 101 will be simplified if it conducts the same operation either or not the packet transfer service is provided since the visitor migration communication control device 109 ignores the mobile host transfer message.

Also the device 109 may respond to the autonomous packet transfer support check message 181 only when it provides the data packet transfer service; therefore, the presence or absence of the response message 181R indicates to the mobile host 146 whether or not the data packet transfer service is provided. In the above, operation the value 0 of the autonomous F also indicates that the packet transfer service is not provided, whereas absence of the response message to the message 181 can indicate the absence of the packet transfer service, which will simplify construction of mobile host 146.

[Communication Operation 3]

The final example of the communication operation is described hereunder. In the communication operation 3 the visitor migration communication control device 109' does not provide the packet transfer service while the visitor migration communication control device 109 does.

Figure 44:
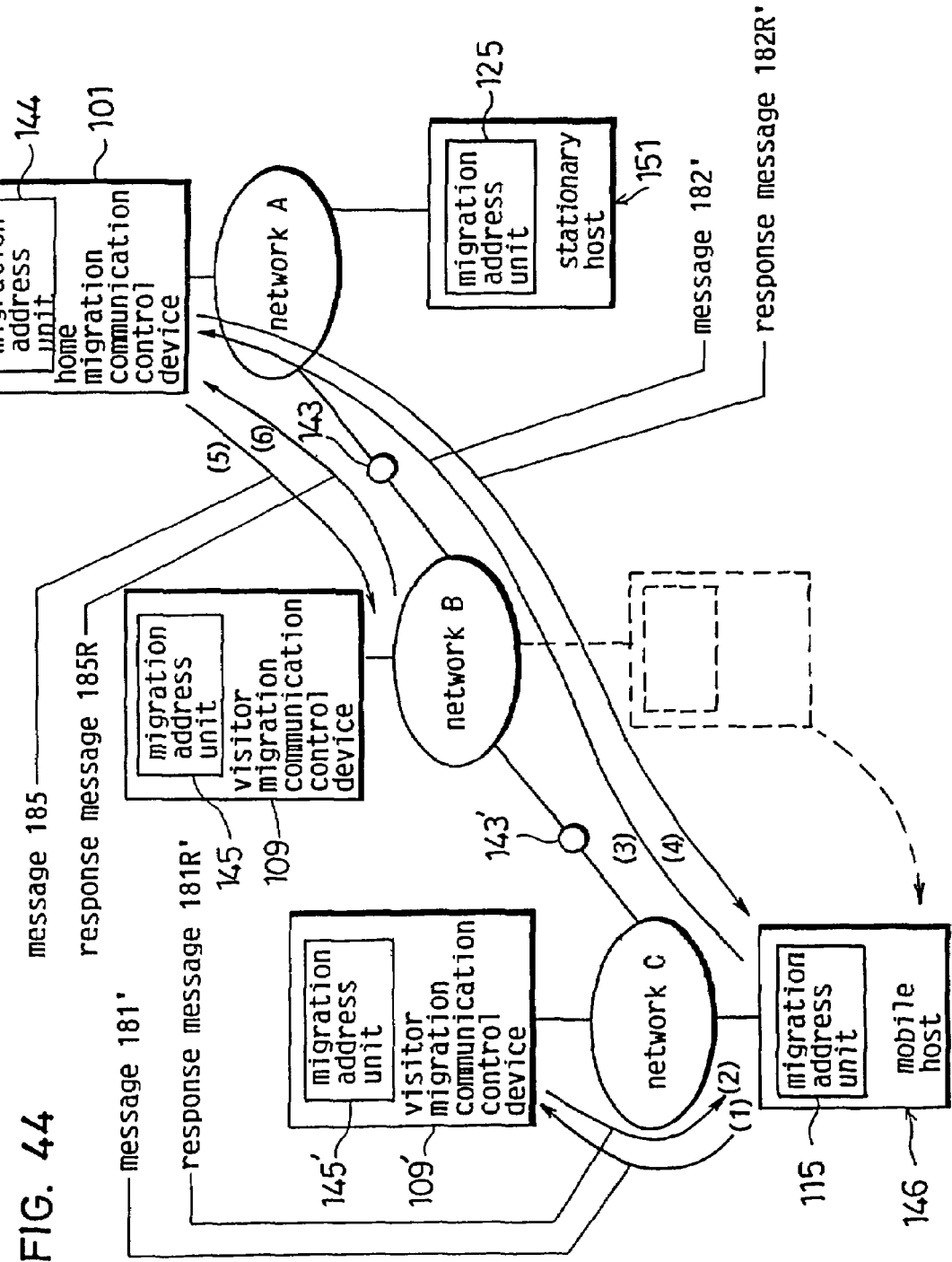
FIG. 44 is an illustration showing a flow of each data packet transmitted between devices in the second embodiment of the present invention.

As shown in FIG. 44, when the packet transfer service is not provided by the visitor migration communication control device 109', the mobile host 146 transmits to the home migration communication control device 101 the address post message 182' where the value 0 is set at the autonomous flag F. Then, the home migration communication control device 101 transmits to the device 109 the mobile host transfer message 185 by setting the value 0 at the autonomous flag F.

When detecting the value 0 at the autonomous flag F, the visitor migration communication control device 109 ceases to provide the packet transfer service.

Figure 45:
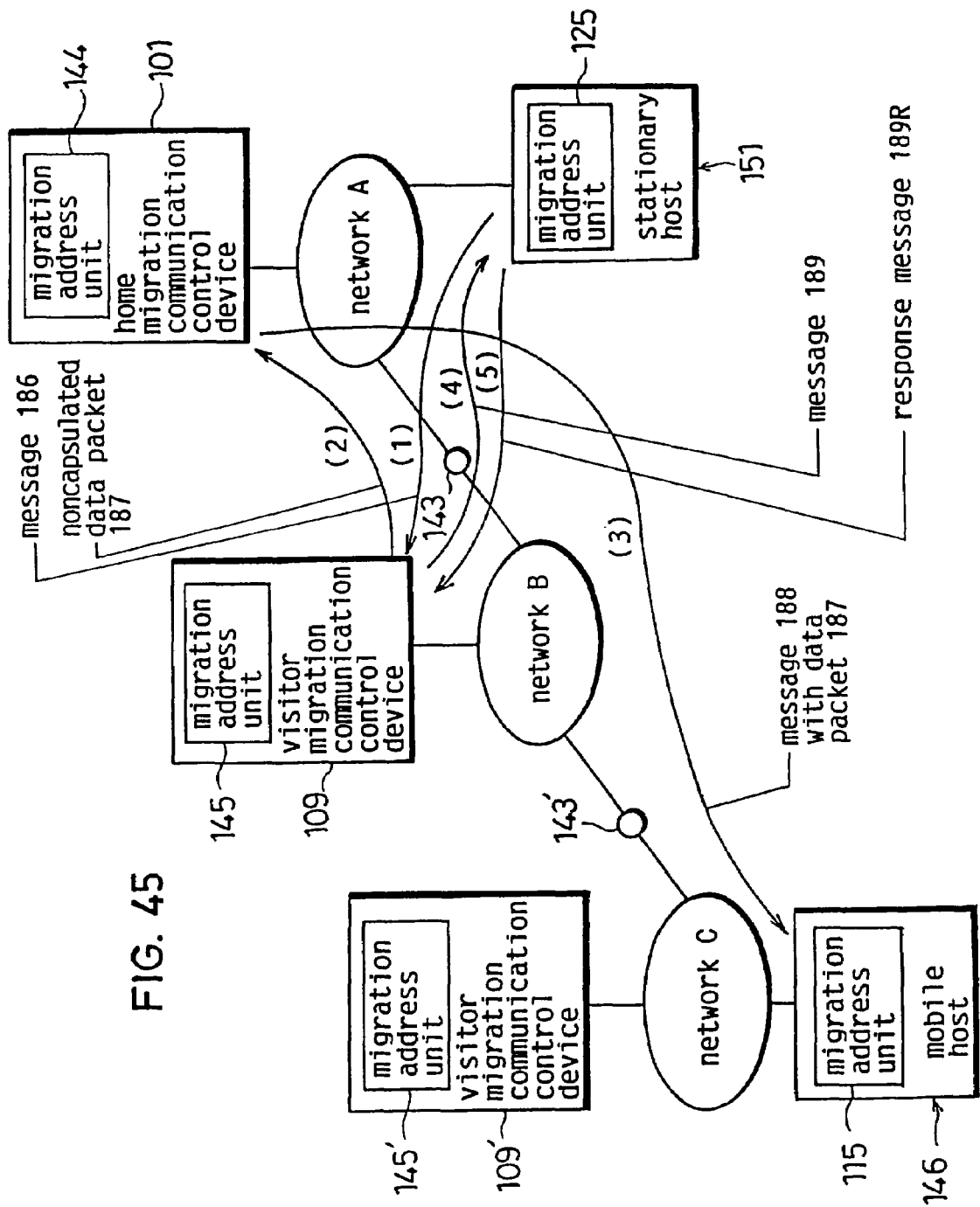
FIG. 45 is an illustration showing a flow of each data packet transmitted between devices in the second embodiment of the present invention.

As shown in FIG. 45, even after cease of the data packet transfer service, the stationary host 151 may transmit to the temporary address the data packet comprising the noncapsulated data packet and the packet transfer message 186.

When this happens, the visitor migration communication control device 109 obtains the noncapsulated data packet 187 from the received encapsulated data packet and transmits it to its destination address, the home address α. The noncapsulated data packet 187 is then received by the home migration communication control device 101, which is attached to the network A. Finally, the home migration communication control device 101 transfers the noncapsulated data packet 187 together with the packet transfer message 188 to the temporary address γ of mobile host 146, which is attached to the network C.

The visitor migration communication control device 109 notifies the stationary host 151 that the mobile host 146 is attached to the network A instead of the network C by sending the mobile host transfer message 189 where the home address α is set in the temporary address field 139. Then, the stationary host 151 transmits the noncapsulated data packet 187 to the home address α, and it is transferred by the home migration communication control device 101, which is employed to take the place of the visitor migration communication control device 109. As another option, the device 109 may send the mobile host transfer message 189 where the invalid address is set, such as the address where every bit is 1. Then, the home migration communication control device 101 may notify the stationary host 151 of the home address α in accordance with the address inquiry obtained from the stationary host 151.

The operation described the above will be employed when the visitor migration communication control device 109 ceases to provide the packet transfer service operation regardless whether or not the device 109' provides the packet transfer service.

On the other hand, the visitor migration communication device 109 may restart the packet transfer service even when the device 109' ceases to provide the service.

In this case, the home migration communication control device 101 needs to provide the visitor migration communication control device 109 with the updated temporary address at every migration of the mobile host 146 unless the mobile host migrates to the network to which another visitor migration communication control device is attached and provides the packet transfer service. To realized it, for example, when the value of the autonomous flag F in the address post message is 0 to indicate that the device 109' does not provide the packet transfer service, the broadcast address Bba as the destination address of the mobile host transfer message, which is transmitted to the device 109, will not be renewed.

Additionally, the broadcast address as the destination address of the data packet, which is transmitted by the mobile host 146, can be replaced with the address Ha, Va, Va', each of which is unique to each device. The address unique to each device will be obtained by detecting the source address of the data packet received from each device, or by employing a so called name service.

Also in the second embodiment, the home migration communication control device 101 detects whether or not the mobile host 146 is attached to the same network from what is held as the temporary address in the address hold unit; to be precise, whether or not the home address α is held as the temporary address. However, this can also be detected by knowing in which table the temporary address is held. For example, when the device 101 and the mobile host 146 are attached to the same network, the first table holds the addresses, such as the home address α; whereas, the second table holds the addresses when the device 101 and the mobile host 146 are attached to the different network from each other. Value of the autonomous flag F 0 or 1, can also be utilized in the same way.

Further, the home migration communication control device 101 and the visitor migration communication control device 109, 109' may be employed as a host such as the mobile host 146 or the stationary host 151.

Finally, the home migration communication control device 101, the visitor migration communication control device 109, the mobile host 146, and the stationary host 156 may be constructed identically and can be replaced with each other.

Although in the embodiment the application unit 124 starts its operation before being notified of updated temporary address β; therefore it always transmits the data packet to the home address α of the mobile host 146, it can transmit the data to the temporary address β if is starts its operation after obtaining the temporary address β.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A mobile node comprising:
   (a) an address obtaining unit that obtains a temporary address that is assigned to the mobile node for each network to which the mobile node migrates;
   (b) an address post processing unit that posts an address post message including the temporary address to a partner node, with which the mobile node communicates;
   (c) an address hold unit that holds the temporary address in correspondence with a home address that is set in advance; and
   (d) an address setting unit that stores the temporary address obtained by the address obtain unit into the address hold unit.

2. The mobile node of claim 1 further comprising:
   a transfer packet reception processing unit that performs a destination address conversion if a destination address of a packet received from the partner node is a temporary address assigned to the mobile node.

3. The mobile node of claim 2 wherein:
   the transfer packet reception processing unit restores, from the received packet, an original packet destined for the home address, and sends data contained in the restored packet to an application processing unit.

4. The mobile node of claim 1 further comprising:
   a packet transmission processing unit that converts a packet whose transmission source address is the home address to a packet whose transmission source address is a temporary address, and transmits the package resulted from the conversion to the general node.

5. A mobile communication method for a mobile node that migrates between networks, the mobile communication method comprising:
   (a) an address obtaining step for obtaining a temporary address that is assigned to the mobile node for each network to which the mobile node migrates; and
   (b) an address post processing step for posting an address post message including the temporary address to a partner node with which the mobile node communicates; and
   (c) an address hold step for holding the temporary address in correspondence with a home address that is set in advance.

6. The mobile communication method of claim 5 further comprising:
   a transfer packet reception processing step for performing a destination address conversion if a destination address of a packet received from the partner node is a temporary address assigned to the mobile node.

7. The mobile communication method of claim 5 further comprising:
   a packet transmission processing step for converting a packet whose transmission source address is the home address to a packet whose transmission source is a temporary address, and transmitting the packet resulted from the conversion to the partner node.

* * * * *